United States Patent
Risser

(10) Patent No.: US 10,776,982 B2
(45) Date of Patent: Sep. 15, 2020

(54) SYSTEMS AND METHODS FOR PROVIDING NON-PARAMETRIC TEXTURE SYNTHESIS OF ARBITRARY SHAPE AND/OR MATERIAL DATA IN A UNIFIED FRAMEWORK

(71) Applicant: Artomatix Ltd., Dublin (IE)

(72) Inventor: Eric Andrew Risser, Sarasota, FL (US)

(73) Assignee: Artomatix Ltd., Dublin (IE)

( * ) Notice: Subject to any disclaimer, the term of this patent is extended or adjusted under 35 U.S.C. 154(b) by 49 days.

(21) Appl. No.: 16/027,091

(22) Filed: Jul. 3, 2018

(65) Prior Publication Data

US 2019/0043242 A1    Feb. 7, 2019

Related U.S. Application Data

(60) Provisional application No. 62/528,372, filed on Jul. 3, 2017.

(51) Int. Cl.
| | | |
|---|---|---|
| *G06T 15/04* | (2011.01) | |
| *G06T 11/00* | (2006.01) | |
| *G06K 9/62* | (2006.01) | |
| *G06T 7/40* | (2017.01) | |
| *G06T 17/20* | (2006.01) | |

(52) U.S. Cl.
CPC ............ *G06T 15/04* (2013.01); *G06K 9/6202* (2013.01); *G06T 7/40* (2013.01); *G06T 11/001* (2013.01); *G06T 17/20* (2013.01); *G06K 9/6212* (2013.01); *G06K 9/6247* (2013.01); *G06T 2207/20016* (2013.01); *G06T 2207/20084* (2013.01)

(58) Field of Classification Search
CPC ......... G06T 15/04; G06T 7/40; G06T 11/001; G06T 2207/20016; G06T 2207/20084
See application file for complete search history.

(56) References Cited

U.S. PATENT DOCUMENTS

| | | |
|---|---|---|
| 7,558,433 B1 | 7/2009 | Georgiev |
| 7,577,313 B1 | 8/2009 | Georgiev |
| 8,041,140 B1 | 10/2011 | Georgiev |
| 8,285,055 B1 | 10/2012 | Barnes et al. |

(Continued)

FOREIGN PATENT DOCUMENTS

| | | |
|---|---|---|
| EP | 3507773 A1 | 7/2019 |
| WO | 2019008519 A1 | 1/2019 |

OTHER PUBLICATIONS

International Search Report and Written Opinion for International Application No. PCT/IB2018/054930, Search completed Sep. 28, 2018, dated Oct. 10, 2018, 11 pgs.

(Continued)

*Primary Examiner* — Antonio A Caschera
(74) *Attorney, Agent, or Firm* — KPPB LLP

(57) ABSTRACT

Systems and methods perform non-parametric texture synthesis of arbitrary shape and/or material data mimicking input exemplar data in accordance with embodiments of the invention. Exemplar data is first analyzed and appearance vectors are generated based on geometric information determined for the exemplar data. Feature vector maps are generated for locations of the exemplar data based on the geometric information and the appearance vectors. Based upon the feature vector maps, outputs can be synthesized.

43 Claims, 41 Drawing Sheets
(32 of 41 Drawing Sheet(s) Filed in Color)

(56) References Cited

U.S. PATENT DOCUMENTS

| | | | |
|---|---|---|---|
| 8,571,328 | B2 | 10/2013 | Shechtman et al. |
| 8,811,749 | B1 | 8/2014 | Barnes et al. |
| 8,818,135 | B1 | 8/2014 | Goldman et al. |
| 8,861,869 | B2 | 10/2014 | Shechtman et al. |
| 9,014,470 | B2 | 4/2015 | Shechtman et al. |
| 9,305,329 | B2 | 4/2016 | Goldman et al. |
| 9,396,530 | B2 | 7/2016 | Amirghodsi et al. |
| 9,536,327 | B2 | 1/2017 | Asente et al. |
| 9,536,377 | B2 | 1/2017 | Hollander et al. |
| 9,576,351 | B1 | 2/2017 | Barzel et al. |
| 9,710,898 | B2 | 7/2017 | Amirghodsi et al. |
| 9,922,432 | B1 | 3/2018 | Risser |
| 10,049,435 | B2 | 8/2018 | Paris et al. |
| 10,290,085 | B2 | 5/2019 | Lin et al. |
| 10,402,948 | B2 | 9/2019 | Paris et al. |
| 10,424,087 | B2 | 9/2019 | Risser |
| 2007/0296730 | A1* | 12/2007 | Lefebvre ............... G06T 11/001 345/582 |
| 2011/0235905 | A1 | 9/2011 | Yokokawa |
| 2013/0120393 | A1 | 5/2013 | Winnemoeller et al. |
| 2014/0019484 | A1 | 1/2014 | Coppin et al. |
| 2018/0068463 | A1 | 3/2018 | Risser |
| 2018/0144490 | A1* | 5/2018 | Huang .................... G06T 15/04 |
| 2018/0144509 | A1 | 5/2018 | Risser |
| 2019/0294931 | A1 | 9/2019 | Risser et al. |
| 2019/0295227 | A1 | 9/2019 | Wang et al. |
| 2019/0333194 | A1 | 10/2019 | Paris et al. |

OTHER PUBLICATIONS

International Search Report for International Application No. PCT/IB2017/055285, filed Sep. 1, 2017, search completed Nov. 17, 2017, dated Jan. 29, 2018, 5 pgs.

Invitation to Pay Add'l Fees and Partial Search Rpt Rcvd for International Application PCT/IB2017/055285, dated Dec. 1, 2017, 10 pgs.

U.S. Appl. No. 62/528,372, entitled Systems and Methods for Providing Convolutional Neural Network Based Non-Parametric Texture Synthesis in Graphic Objects, filed Jul. 3, 2017, 88 pgs.

Written Opinion of the International Searching Authority for International Application No. PCT/IB2017/055285, Opinion completed Nov. 17, 2017, Opinion dated Jan. 29, 2018, 10 pgs.

"Introduction to Wang Tiles", Procedural World, Retrieved from: http://procworld.blogspot.com/2013/01/introduction-to-wang-tiles.html, Jan. 3, 2013, 8 pgs.

Agustsson et al., "NTIRE 2017 Challenge on Single Image Super-Resolution: Dataset and Study", The IEEE Conference on Computer Vision and Pattern Recognition (CVPR) Workshops, vol. 3, 2017, 10 pgs.

Aittala et al., "Reflectance modeling by neural texture synthesis", ACM Transactions on Graphics (TOG), 2016, vol. 35, No. 4, Article 65, 13 pgs.

Almeida et al., "Blind and Semi-Blind Deblurring of Natural Images", IEEE Transactions on Image Processing 19, No. 1, 2010, 18 pgs.

Arjovsky, "Wasserstein GAN," http://github.com/martinarjovsky/WassersteinGAN, 2017, 32 pgs.

Ashikhmin, Michael, "Synthesizing Natural Textures", Proceeding I3D '01 Proceedings of the 2001 symposium on Interactive 3D graphics, Mar. 1, 2001, 10 pgs.

Ba et al., "Layer Normalization", arXiv preprint arXiv: 1607.06450 (2016), 14 pgs.

Balduzzi et al., "The Shattered Gradients Problem: If resnets are the answer, then what is the question?", Proceedings of the 34th International Conference on Machine Learning, Sydney, Australia, PMLR 70, 2017, 14 pgs.

Barnes et al., "PatchMatch: A Randomized Correspondence Algorithm for Structural Image Editing", ACM SIGGRAPH 2009, vol. 28, No. 3, Article No. 24, New Orleans, Louisiana, USA, Aug. 3-7, 2009, 10 pgs.

Barnes et al., "PatchTable: Efficient Patch Queries for Large Datasets and Applications", ACM Transactions of Graphics (TOG), 2015, vol. 4, No. 4, Article 97, 10 pgs.

Bellini et al., "Time-varying weathering in texture space", ACM Trans. Graph., Jul. 2016, vol. 35, No. 4, 11 pgs.

Berger et al., "Incorporating long-range consistency in CNN-based texture generation", Jun. 3, 2016, arXiv: 1606.01286v1, 17 pgs.

Burt et al., "The Laplacian Pyramid as a Compact Image Code", IEEE Transactions on Communications, Apr. 1983, vol. Com-31, No. 4, pp. 532-540.

Cai et al, "DehazeNet: An End-to-End System for Single Image Haze Removal", IEEE Transactions on Image Processing 25, No. 11, 2016, 13 pgs.

Chakrabarti, "A Neural Approach to Blind Motion Deblurring", European Conference on Computer Vision, Springer, Cham, 2016, 15 pgs.

Champandard, "Semantic Style Transfer and Turning Two-Bit Doodles into Fine Artworks", Cornell University Library, Mar. 5, 2016, 7 pgs.

Chang et al., "Automatic Triage for a Photo Series", ACM Transactions on Graphics (TOG), Jul. 2016, 10 pgs.

Chen et al., "Fast Image Processing with Fully-Convolutional Networks", International Conference on Computer Vision (ICCV 2017), arXiv:1709.00643, Sep. 2, 2017, 16 pgs.

Chen et al., "Fast Image Processing with Fully-Convolutional Networks", Retrieved from: https://web.stanford.edu/~cqf/papers/Fast_Image_Processing_ICCV2017.pdf, Aug. 12, 2017, 10 pgs.

Chen et al., "Fast Patch-based Style Transfer of Arbitrary Style", Dec. 13, 2016, arXiv:1612.04337, 10 pgs.

Choy et al., "3D-R2N2: A Unified Approach for Single and Multi-view 3D Object Reconstruction", arXiv:1604.00449v1 [cs.CV] Apr. 2, 2016, 17 pgs.

Dar et al., "Postprocessing of Compressed Images via Sequential Denoising", IEEE Transactions on Image Processing 25, No. 7 (2016), 14 pgs.

Darabi et al., "Image Melding: Combining Inconsistent Images Using Patch-Based Synthesis", ACM Transactions of Graphics (TOG), Jul. 2012, vol. 31, No. 4, Article 82-1, 10 pgs.

Diamanti et al., "Synthesis of Complex Image Appearance from Limited Exemplars", ACM Transactions of Graphics, Feb. 2015, vol. 34, No. 2, Article 22, 13 pgs.

Dong et al., "Image Super-Resolution Using Deep Convolutional Networks", arXiv:1501.00092v3 [cs.CV] Jul. 31, 2015, 14 pgs.

Efros et al., "Image Quilting for Texture Synthesis and Transfer", In Proceedings of the 28th Annual Conference on Computer Graphics and Interactive Techniques, 20001, ACM, 6 pgs.

Efros et al., "Texture Synthesis by Non-Parametric Sampling", IEEE International Conference on Computer Vision, 1999, vol. 2, 6 pgs.

Eisenacher, et al., "Texture Synthesis From Photographs", Eurographics, 2008, vol. 27, No. 2, 10 pgs.

Fiser et al., "StyLit: Illumination-Guided Example-Based Stylization of 3D Renderings", ACM Transactions on Graphics, 2016, vol. 35, No. 4, Article 92, 11 pgs.

Foi et al., "Pointwise Shape-Adaptive DCT for High-Quality Denoising and Deblocking of Grayscale and Color Images", IEEE Transactions on Image Processing, vol. 16, No. 5, May 2007, 17 pgs.

Galteri et al., "Deep Generative Adversarial Compression Artifact Removal", arXiv preprint arXiv:1704.02518 (2017), 10 pgs.

Gatys, et al., "Image Style Transfer Using Convolutional Neural Networks", In Proceedings of the IEEE Conference on Computer Vision and Pattern Recognition, 2016, 10 pgs.

Gatys et al., "Texture Synthesis Using Convolutional Neural Networks", In Advances in Neural Information Processing Systems, 2015, 9 pgs.

Girshick et al., "Deformable Part Models are Convolutional Neural Networks", 2015 IEEE Conference on Computer Vision and Pattern Recognition (CVPR), Jun. 7-12, 2015, Boston, MA, USA, 10 pgs.

Goodfellow et al., "Explaining and Harnessing adversarial examples", Published as a conference paper at ICLR 2015, arXiv:1412.6572, 11 pgs.

Griffin, Joe, "Creating 'world's first' artificial intelligence with imagination", The Irish Times, Retrieved from: https://www.irishtimes.

(56) References Cited

OTHER PUBLICATIONS com/business/technology/creating-world-s-first-artificial-intelligence-with-imagination-1.2171794, Apr. 13, 2015, 3 pgs.
Gulrajani et al., "Improved Training of Wasserstein GANs", In Advances in Neural Information Processing Systems, 2017, 11 pgs.
Hacohen et al., "Non-Rigid Dense Correspondence with Applications for Image Enhancement", ACM Transactions on Graphics, vol. 30, No. 4, Aug. 7, 2011, 9 pgs.
Han et al., "Multiscale Texture Synthesis", Journal ACM Transactions on Graphics (TOG)—Proceedings of ACM SIGGRAPH 2008, vol. 27, Issue 3, Aug. 2008, Article No. 51, New York, NY, 8 pgs.
Hansen et al., "Deblurring images: matrices, spectra, and filtering", vol. 3. Siam, 2006, 8 pgs.
He et al., "Deep residual learning for image recognition", arXiv:1512.03385 [cs.CV], in 2016 IEEE Conference on Computer Vision and Pattern Recognition, Dec. 10, 2015, 12 pgs.
Heeger et al., "Pyramid-Based Texture Analysis/Synthesis", In Proceedings of the 22nd Annual Conference on Computer Graphics and Interactive Techniques, ACM, 2016, 10 pgs.
Hello Tomorrow, "HT 2015—Eric Risser, Artomatix—IT & Security Startup Pitch", YouTube, Retrieved from: https://www.youtube.com/watch?v=fwvLFcKVMF8, Nov. 17, 2015, 1 page.
Hertzmann et al., "Image Analogies", In Proceedings of the 28th Annual Conference on Computer Graphics and Interactive Techniques ACM, 2001, 14 pgs.
Ignatov et al., "DSLR-Quality Photos on Mobile Devices with Deep Convolutional Networks", In the IEEE Int. Conf. on Computer Vision (ICCV). 2017, 9 pgs.
Ioffe et al., "Batch Normalization: Accelerating Deep Network Training by Reducing Internal Covariate Shift", Proceedings of the 32nd International Conference on Machine Learning, 2015; arXif: 1502.03167, 11 pgs.
Johnson, "Neural-Style", https://github.com/jcjohnson/neural-style, Sep. 1, 2015, 10 pgs.
Johnson et al., "Perceptual Losses for Real-Time Style Transfer and Super-Resolution", arXiv: 1603.08155 [cs.CV], Mar. 27, 2016, 18 pgs.
Joshi et al., "Image Deblurring using Inertial Measurement Sensors", ACM Transactions on Graphics (TOG) 29, No. 4, 2010, 8 pgs.
Kalantari et al., "Learning-Based View Synthesis for Light Field Cameras", ACM Transactions on Graphics (TOG), 2016, vol. 35, No. 6, Article 193, 10 pgs.
Kaspar et al., "Self Tuning Texture Optimization", EUROGRAPHICS 2015, vol. 34, No. 2, 2015, 11 pgs.
Kawase, Masaki, "Frame Buffer Postprocessing Effects in DOUBLE-S.T.E.A.L (Wreckless)", Bunkasha Games, Bunkasha Publishing Co.,Ltd, Presentation from Game Developer's Conference 2003, Mar. 4-8, 2003, 52 pgs.
Krizhevsky et al., "ImageNet Classification with Deep Convolutional Neural Networks", Advances in Neural Information Processing Systems (NIPS 2012), vol. 25, 2012, 9 pgs.
Kwatra et al., "Graphcut Textures: Image and Video Synthesis Using Graph Cuts", ACM Transactions on Graphics (TOG), 2003, vol. 22, 10 pgs.
Kwatra et al., "Texture Optimization for Example-Based Synthesis", Journal ACM Transactions on Graphics (TOG)—Proceedings of ACM SIGGRAPH 2005, vol. 24, Issue 3, Jul. 2005, New York, NY, 8 pgs.
Larsson et al., "Fractalnet: Ultra-deep neural networks without residuals", arXiv preprint arXiv: 1605.07648 (2016), 11 pgs.
Ledig et al, "Photo-Realistic Single Image Super-Resolution Using a Generative Adversarial Network", In CVPR, vol. 2, No. 3, 2017, 10 pgs.
Lefebvre et al., "Appearance-Space Texture Synthesis", ACM Transactions on Graphics (TOG), 2006, vol. 25, No. 3, 8 pgs.
Lefebvre et al., "Parallel Controllable Texture Synthesis", Journal ACM Transactions on Graphics (TOG)—Proceedings of ACM SIGGRAPH 2005, vol. 24, Issue 3, Jul. 2005, New York, NY, 10 pgs.

Li et al., "Combining Markov Random Fields and Convolutional Neural Networks for Image Synthesis", Jan. 18, 2016, arXiv: 1601.04589 [cs.CV], 9 pgs.
Li et al., "Universal Style Transfer via Feature Transforms", Advances in Neural Information Processing Systems (NIPS), 2017, 11 pgs.
Liang et al., "Real-Time Texture Synthesis by Patch-Based Sampling", ACM Transactions on Graphics, vol. 20, No. 3, Jul. 2001, pp. 127-150.
Liu et al., "Near-Regular Texture Analysis and Manipulation", Proceeding SIGGRAPH '04 ACM SIGGRAPH 2004 Papers, Los Angeles, California, Aug. 8-12, 2004, 9 pgs.
Lomas, Natasha, "Prisma uses AI to turn your photos into graphic novel fodder double quick", TechCrunch, Oath Tech Network, Jun. 24, 2016, Retrieved from: https://techcrunch.com/2016/06/24/prisma-uses-ai-to-turn-your-photos-into-graphic-novel-fodder-double-quick/, 13 pgs.
Lukac et al., "Brushables: Example-based Edge=Aware Directional Texture Painting", In Computer Graphics Forum, 2015, vol. 34, No. 7, 11 pgs.
Lukac et al., "Painting by Feature: Texture Boundaries for Example-Based Image Creation", ACM Transactions of Graphics (TOG). 2013, vol. 32, No. 4, Article 116, 8 pgs.
Mahendran et al., "Understanding Deep Image Representations by Inverting Them", 2015 IEEE Conference on Computer Vision and Pattern Recognition (CVPR), Jun. 7-12, 2015, Boston, MA, USA, 9 pgs.
Matusik et al., "Texture Design Using a Simplicial Complex of Morphable Textures", Proceeding SIGGRAPH '05, ACM SIGGRAPH 2005 Papers, Los Angeles, California, Jul. 31-Aug. 4, 2005, 8 pgs.
Nguyen et al., "Deep Neural Networks are Easily Fooled: High Confidence Predictions for Unrecognizable Images", In Computer Vision and Pattern Recognition (CVPR '15), IEEE, 2015, 20 pgs.
Nikulin et al., "Exploring the Neural Algorithm of Artistic Style", arXiv: 1602.07188v2 [cs.CV] Mar. 13, 2016, 15 pgs.
Pathak et al., "Context Encoders: Feature Learning by Inpainting", Nov. 21, 2016, arXiv: 1604.07379, 12 pgs.
Portilla et al., "A Parametric Texture Model Based on Joint Statistics of Complex Wavelet Coefficients", International Journal of Computer Vision, 2000, vol. 40, No. 1, pp. 49-71.
Ren et al., "Single Image Dehazing via Multi-Scale Convolutional Neural Networks", In European conference on computer vision, Springer, Cham, 2016, 16 pgs.
Risser, Eric, "Rendering 3D Volumes Using Per-Pixel Displacement Mapping", Sandbox 2007, Proceedings of the 2007 ACM SIGGRAPH symposium on Video games, San Diego, California, Aug. 4-5, 2007, 7 pgs.
Risser, Eric, "Texture Synthesis Based Hybridisation for Images and Geometry", Thesis, Trinity College Dublin, Oct. 31, 2012, 217 pgs.
Risser, Eric, "The Artomatix Startup Story: Bringing A.I. to the Art World", Vimeo, Retrieved from: https://vimeo.com/209401909, Mar. 16, 2017, 2 pgs.
Risser er al., "Stable and Controllable Neural Texture Synthesis and Style Transfer Using Histogram Losses", Arxiv, Retrieved from: https://arxiv.org/pdf/1701.08893v1.pdf, Jan. 31, 2017, 14 pgs.
Risser et al., "Faster Relief Mapping Using the Secant Method", J. Graphics Tools, 12, DOI: 10.1080/2151237X.2007.10129244, Jan. 2007, 4 pgs.
Risser et al., "Synthesizing Structured Image Hybrids", Journal ACM Transactions on Graphics (TOG)—Proceedings of ACM SIGGRAPH 2010, vol. 29, Issue 4, Jul. 2010, Article No. 85, New York, NY, 6 pgs.
Ritter et al., "Painting with Texture", Eurographics Symposium on Rendering, 2006, 7 pgs.
Rong et al., "Jump Flooding in GPU with Applications to Voronoi Diagram and Distance Transform", 2006 ACM Symposium on Interactive 3D Graphics and Games, Mar. 14-17, 2006, Redwood City, CA, USA, 8 pgs.
Salazar et al., "Fully Automatic Expression-Invariant Face Correspondence", Machine Vision and Applications 25, No. 4, 2014, 27 pgs.

(56) References Cited

OTHER PUBLICATIONS

Selim et al., "Painting style transfer for head portraits using convolutional neural networks", ACM Transactions on Graphics (TOG), 2016, vol. 35, No. 4, Article 129, 18 pgs.
Shi et al., "Real-Time Single Image and Video Super-Resolution Using an Efficient Sub-Pixel Convolutional Neural Network", 2016 IEEE Conference on Computer Vision and Pattern Recognition (CVPR), Dec. 12, 2016, Las Vegas, NV, USA, 10 pgs.
Siddiqui et al., "Hierarchical Color Correction for Camera Cell Phone Images", IEEE Transactions on Image Processing, 2008, vol. 17, No. 11, 33 pgs.
Simonyan et al., "Deep Inside Convolutional Networks: Visualising Image Classification Models and Saliency Maps", arXiv preprint arXiv: 1312.6034, 2013, 8 pgs.
Simonyan et al., "Very Deep Convolutional Networks for Large-Scale Image Recognition", Computer Vision and Pattern Recognition, Apr. 10, 2015, retrieved from https://arxiv.org/abs/1409.1556, 14 pgs.
Spasojevic et al, "Identifying Actionable Messages on Social Media", In Big Data (Big Data), 2015 IEEE International Conference on (pp. 2273-2281). IEEE, Oct. 2015, 9 pgs.
Springenberger et al., "Striving for Simplicity: The All Convolutional Net", arXiv: 1412.6806v3 [cs.LG], Apr. 13, 2015, pp. 1-14.
Sun et al., "Edge-based Blur Kernel Estimation Using Patch Priors", Computational Photography (ICCP), 2013 IEEE International Conference on, IEEE, 2013, pp. 1-8.
Svoboda et al, "Compression Artifacts Removal Using Convolutional Neural Networks", arXiv preprint arXiv: 1605.00366 (2016), 10 pgs.
Telea, Alexandru, "An Image Inpainting Technique Based on the Fast Marching Method", Journal of Graphics Tools, vol. 9, Issue No. 1, 2004, Published online Apr. 6, 2012, pp. 25-36.
Tsai et al., "Sky is Not the Limit: Semantic-Aware Sky Replacement", ACM Transactions on Graphics (TOG), 2016, vol. 35, No. 4, Article 149, 11 pgs.
Ulyanov et al., "Instance Normalization: The Missing Ingredient for Fast Stylization", arXiv: 1607.08022v2 [cs.CV] Sep. 20, 2016, 6 pgs.
Ulyanov et al., "Texture Networks: Feed-forward Synthesis of Textures and Stylized Images", Mar. 10, 2016, arXiv: 1603.03417, 16 pgs.
Ulyanov et al., "Texture Networks: Feed-forward Synthesis of Textures and Stylized Images", Proceedings of the 33rd International Conference on Machine Learning, New York, NY, USA, 2016, 9 pgs.
Ustyuzhaninov et al., "Texture Synthesis Using Shallow Convolutional Networks with Random Filters", arXiv:1606.00021v1 [cs.CV] May 31, 2016, 9 pgs.
Veit et al, "Residual Networks Behave Like Ensembles of Relatively Shallow Networks", In Advances in Neural Information Processing Systems, 2016, 9 pgs.
Wei, Li-Yi, "Deterministic Texture Analysis and Synthesis using Tree Structure Vector Quantization", Proceedings XII Brazilian Symposium on Computer Graphics and Image Processing, 1999, Oct. 17-20, 1999, Campinas, Brazil, Brazil, 7 pgs.
Wei, Li-Yi, "Tile-Based Texture Mapping on Graphics Hardware", Graphics Hardware (2004), The Eurographics Association 2004, 10 pgs.
Wei et al., "Fast Texture Synthesis using Tree-structured Vector Quantization", Proceeding SIGGRAPH '00 Proceedings of the 27th Annual Conference on Computer Graphics and Interactive Techniques, Jul. 2000, New York, NY, 10 pgs.
Wei et al., "Inverse Texture Synthesis", Proceeding SIGGRAPH '08 ACM SIGGRAPH 2008 papers, Article No. 52 , Los Angeles, California, Aug. 11-15, 2008 , 14 pgs.
Wei et al., "Order-Independent Texture Synthesis", Stanford Computer Science TR-2002-01, 2002, 9 pgs.
Wei et al., "State of the Art in Example-based Texture Synthesis", EUROGRAPHICS 2009, STAR, State of the Art Report, 25 pgs.
Wei et al., "Texture Synthesis over Arbitrary Manifold Surfaces", Proceeding SIGGRAPH '01 Proceedings of the 28th annual conference on Computer graphics and interactive techniques, Aug. 2001, New York, NY, 6 pgs.
Wikipedia, "Histogram matching—wikipedia, the free encyclopedia", https://en.wikipedia.org/w/index.php?title=Histogram_matching &oldid=723048018, edited May 31, 2016, Printed on Nov. 30, 2017, 2 pgs.
Wong et al., "A document image model and estimation algorithm for optimized JPEG decompression", IEEE Transactions on image processing 18, No. 11 (2009), 19 pgs.
Wu et al., "Feature Matching and Deformation for Texture Synthesis", Journal ACM Transactions on Graphics (TOG)—Proceedings of ACM, SIGGRAPH 2004, vol. 23, Issue No. 3, Aug. 2004, 4 pgs.
Yan et al., "Automatic Photo Adjustment Using Deep Neural Networks", arXiv: 1412.7725v2 [cs.CV] May 16, 2015, 15 pgs.
Yang et al., "High-Resolution Image Inpainting Using Multi-Scale Neural Patch Synthesis", Apr. 13, 2017, arXiv: 1611.09969, 9 pgs.
Ying et al., "Texture and Shape Synthesis on Surfaces", Rendering Techniques 2001, pp. 301-312, 13 pgs.
Yosinski et al., "Understanding Neural Networks Through Deep Visualization", Published in the Deep Learning Workshop, 31st International Conference on Machine Learning, Lille, France, 2015, 12 pgs.
Yu et al., "Multi-Scale Context Aggregation by Dilated Convolutions", ICLR 2016 Conference Paper, arXiv: 1511.07122v3, submitted Nov. 23, 2015, last revised Apr. 30, 2016, 13 pgs.
Zagoruyko et al., "Learning to Compare Image Patches via Convolutional Neural Networks", 2015 IEEE Conference on Computer Vision and Pattern Recognition (CVPR), Jun. 7-12, 2015, Boston, MA, USA, 9 pgs.
Zeiler et al., "Visualizing and Understanding Convolutional Networks", ECCV 2014, Part I, LNCS 8689, 2014, pp. 818-833.
Zelinka et al., "Jump Map-Based Interactive Texture Synthesis", ACM Transactions on Graphics, vol. 23, No. 4, Oct. 2004, pp. 930-962.
Zelinka et al., "Towards Real-Time Texture Synthesis with the Jump Map", Thirteenth Eurographics Workshop on Rendering (2002), The Eurographics Association, 2002, 7 pgs.
Zhang et al., "CrescendoNet: A New Deep Convolutional Neural Network with Ensemble Behavior", arXiv preprint arXiv: 1710. 11176 (2017), 10 pgs.
Zhang et al., "Image Restoration Using Joint Statistical Modeling in Space-Transform Domain", IEEE Trans. Circuits Syst. Video Techn. 24, No. 6 (2014), 14 pgs.
Zhang et al., "Synthesis of Progressively-Variant Textures on Arbitrary Surfaces", Journal ACM Transactions on Graphics (TOG)—Proceedings of ACM SIGGRAPH 2003, vol. 22, Issue 3, Jul. 2003, pp. 295-302.
Zhao et al., "Loss Functions for Neural Networks for Image Processing", arXiv: 1511.08861v2 [cs.CV] Jun. 14, 2016, 16 pgs.
Zhu et al., "Generative Visual Manipulation on the Natural Image Manifold", European Conference on Computer Vision, 2016, 16 pgs.
Goodfellow, "NIPS 2016 Tutorial: Generative Adversarial Networks", arXiv preprint arXiv:1701.00160, Dec. 31, 2016, 57 pgs.
Zhang et al., "Compression artifact reduction by overlapped-block transform coefficient estimation with block similarity", IEEE Transactions on Image Processing, 22 (12), Dec. 2013, pp. 4613-4626.
International Preliminary Report on Patentability for International Application PCT/IB2017/055285, Report issued Mar. 5, 2019, dated Mar. 14, 2019, 11 pgs.
Barnes et al., "The Generalized PatchMatch Correspondence Algorithm", European Conference on Computer Vision, Springer, Berlin, Heidelberg, 2010, 14 pgs.
Goodfellow, "NIPS 2016 Tutorial: Generative Adversarial Networks", arXiv preprint arXiv:1701.00160, 57 pgs.
International Preliminary Report on Patentability for International Application PCT/IB2018/054930, Report issued Jan. 7, 2020, dated Jan. 16, 2020, 6 pgs.
Olszewski et al., "High-Fidelity Facial and Speech Animation for VR HMDs", ACM Transactions on Graphics (TOG), vol. 35, No. 6, Article 221, Nov. 2016, 14 pgs.

(56) References Cited

OTHER PUBLICATIONS

Zhang et al., "Compression artifact reduction by overlapped-block transform coefficient estimation with block similarity", IEEE Transactions on Image Processing, vol. 22, No. 12, Dec. 2013, pp. 4613-4626.

* cited by examiner

SYSTEMS AND METHODS FOR PROVIDING NON-PARAMETRIC TEXTURE SYNTHESIS OF ARBITRARY SHAPE AND/OR MATERIAL DATA IN A UNIFIED FRAMEWORK

CROSS-REFERENCE TO RELATED APPLICATIONS

The current application claims priority to U.S. Provisional Patent Application No. 62/528,372, filed Jul. 3, 2017, the disclosure of which is hereby incorporated by reference in its entirety for all purposes.

FIELD OF THE INVENTION

This invention relates to generating a new graphic object using texture synthesis on a first graphic object with texture from a second graphic object.

BACKGROUND

With the advent of social media and mass availability of digital cameras, users are capturing more digital images. To set their captured images apart, users often want to pass their images through a filter or to otherwise modify their image to make the image unique. Furthermore, users often use an avatar or some other graphic display during interaction with other users via a social media, gaming, or other communication platform to distinguish themselves from others. To modify the avatar or other graphic display, users often use sophisticated software either installed on their device or accessible via a connection with another device to make the desired modifications.

SUMMARY

Systems and methods for performing non-parametric texture synthesis of arbitrary shape and/or material data taken from an exemplar object in accordance with embodiments of the invention are illustrated. Systems in accordance with some embodiments of the invention receive an exemplar set comprising one or more graphical elements that each contain a pixel at a same index that contributes to an overall appearance vector at the index. The exemplar object in many embodiments comprises a set of one or more meshes represented in parametrized UV space, from which geometric information is "baked" into the pixels of additional images that contribute to the overall "appearance" vector at different locations. In some embodiments, the exemplar object is a 3D tensor, or a 2D array of appearance vectors where the plurality of these vectors define a desired texture. The system builds a multi-scale representation of the exemplar object where coarser scales encode the lower frequencies of the exemplar object. The system in accordance with many embodiments generates a feature vector for each pixel in a portion of the plurality of pixels of the exemplar graphic object by combining a patch of appearance vectors surrounding that pixel and optionally transforming them through a CNN and/or dimensionality reduction process. Systems in accordance with some embodiments of the invention determine a list of nearest neighbor candidates for each particular pixel in the portion of the plurality of pixels of the exemplar graphic object from the pixels in the portion of the plurality of pixels of the same or different exemplar graphic object using the feature vectors of the pixels from the portion of the plurality of pixels of the exemplar graphic object(s), wherein a nearest neighbor is a pixel from the exemplar graphic that closely matches the particular pixel in the other exemplar object and the list of nearest neighbor candidates includes one or more pixels from the exemplar graphic object that closely match the particular pixel. In certain embodiments, each appearance vector in the exemplar object is given a "uniqueness" value. Systems synthesize the synthesized graphic object by modifying each particular pixel in a portion of a plurality of pixels of the synthesized graphic object to mimic a pixel from the exemplar graphic object.

In another embodiment, any shape information from a mesh containing UV coordinates is rendered onto a 2D array as a pre-process. This shape information can include any combination of: global normal, curvature, ambient occlusion and/or Gaussian Mixture Models (GMM).

In a further embodiment, the volumetric 3D shape of the mesh is modeled as a 2D manifold of Gaussian functions at each point along the surface of the mesh where these GMMs can be averaged together to form a multiscale representation and patches of Gaussians can be used as a feature vector.

In still another embodiment, systems generate a hybrid stack for the exemplar graphic object wherein the object hybrid stack encodes a multiscale representation of the exemplar object where different scale levels encode different frequencies of the exemplar data. The hybrid stack modulates between the characteristics of a Gaussian stack and a Gaussian pyramid at different scale ranges of the hybrid stack.

In a still further embodiment, individual 2D arrays making up the different appearance and shape characteristics at a pixel location for each level of a hybrid stack are combined into an "appearance vector" and a patch of appearance vectors are combined into a "feature vector" where this feature vector can be used directly to represent a local feature, or transformed into a lower dimensional summary feature vector using a dimensionality reduction algorithm such as Principle Component Analysis (PCA). E.g., Principle Component Analysis is performed on each of the feature vectors, or some fraction of the feature vectors, for each pixel in the portion of the plurality of pixels of the source object and each pixel in the portion of the plurality of pixels in the exemplar graphic object to reduce the dimensionality of the feature vectors.

In yet another embodiment, individual 2D arrays making up the different appearance and shape characteristics at a pixel location for each level of a hybrid stack are either combined into a single unified "appearance vector" or left as a collection of partial appearance vectors. One or more of these appearance vectors are transformed through one or more Convolutional Neural Network(s) (CNN) which generates a feature vector for each pixel location. The feature vector can then optionally be summarized through a dimensionality reduction process.

In a yet further embodiment, determine the locations of the K most similar feature vectors (a feature vector is a descriptor of a neighborhood of pixels) for each particular pixel location in the portion of the plurality of pixels of the exemplar graphic object, where the k most similar feature vectors of each particular pixel includes a plurality of pixels from the same or another exemplar graphic object that closely match the particular pixel through some distance metric including but not limited to L0 distance, L1 distance, L2 distance, Bregman divergence, Kullback-Leibler divergence, Hellinger distane, cross entropy or a-divergence, perform an Approximate Nearest Neighbor Search (ANNS) on the pixels in the portion of the plurality of pixels of the first exemplar object to determine a candidate nearest neighbor pixel in the second exemplar graphic object, and add the candidate nearest neighbor pixel location of each particular pixel in portion of the plurality of pixels of the exemplar graphic object and the plurality of pixels in the K most similar neighborhoods of the candidate pixel to the list nearest neighbor candidates of the particular pixel.

In another additional embodiment, systems initialize a Nearest Neighbor Field (NNF) for the pixels of the portion of the plurality of pixels of the source graphic objects, and replace one or more pixels in the NNF by performing an iterative nearest neighbor candidate improvement process with a better nearest neighbor that more closely match the corresponding pixel in the portion of the plurality of pixels of the source graphic object.

In a further additional embodiment, systems perform an initial ANNS to bootstrap a NNF through a histogram matching process, which: builds a histogram for each element of the feature vector where the bins cover the full range of values that each element can have, where each particular bin in the histogram may contain links to the pixels that contributed to the particular bin. When finding a match for an arbitrary pixel, the value of each channel may be used as an index into the corresponding histogram. If no values exist in a bin being indexed by a channel value, the next closest bin that contains values may be used in accordance with a number of embodiments. In accordance with several embodiments, a pixel link may be selected at random from the next closest bin. If an ANNS is being performed internal to an image, there may be an additional constraint that any link selected using the histogram strategy must also be 5% away from any other nearest neighbors that have previously been determined in accordance with a few embodiments.

In another embodiment again, the plurality of nearest neighboring pixel locations are determined using a uniquely modified jump flooding process that operates in parallel on a GPU.

In a further embodiment again, the modified jump flooding process follows the same searching and ordering strategies as the original jump flooding process where the 8 surrounding pixels are checked in power of two increments going from farther away to closer, but rather than applying a translation and then checking the pixel location values directly, the modified approach samples the current NNF pointer at the location identified by translation, updates the location of interest to that of the pointer sampled and then applies the inverse of the translation. The feature vector at the resulting pixel location is tested as a new potential nearest neighbor candidate by finding the distance between the current best feature vector and this candidate.

In still yet another embodiment, the plurality of nearest neighboring pixel locations are tested against a semi-random sampling determined using a uniquely modified jump flooding process. In a still yet further embodiment, an iterative nearest neighbor candidate improvement process checks several semi-random new links for each pixel location. This algorithm randomly selects among the 8 pixels surrounding the link stored in the NNF some power of two distance away from the location that the link points to, where one or more of these new link locations can be selected to test against the current link as a new potential better nearest neighbor candidate. Using this search strategy, the iterative nearest neighbor candidate improvement process may be able to escape local minimums in the optimization process.

In still another additional embodiment, a set of multiscale NNFs are computed for some continuous set of scale levels of a multiscale data structure. The coarsest level is bootstrapped and refined. The coarsest level is referred to as the "current level" and the next finer level is referred to as the "next level". An upscaling process is applied to the current level in order to bootstrap the NNF of the next level. The "current level" is then updated to point to the NNF of the "next level" and the new "next level" is then ready for the process to start again, moving up the multiscale exemplar object. The upscaling process involves providing a nearest neighbor match from a pixel in the current level to each finer descendant pixel in the next level, then determining the neighboring pixels for each descendant pixel, comparing the nearest neighbor of each decendent pixel to the nearest neighbor of each neighbor pixel and selecting a best fit for the nearest neighbor. The NNF of the current level is upscaled to the next finest level, capturing the similarity of large scale structures and propagating them to finer scale levels in order to refine the local similarity, keeping the greater context of the nearest neighbor candidate.

In a still further additional embodiment, a set of multiscale NNFs are computed for some continuous set of layers within a CNN. This could include a hybrid stack where each level is then processed through a CNN and a NNFs is computed for each CNN at each level.

In still another embodiment again, a unique feature map is computed for each exemplar object.

In a still further embodiment again, a system synthesizes the synthesized graphic object by generating a set of synthesis object pyramids for the synthesized graphic object based upon the exemplar graphic object and an additional NNF field linking each synthesis feature with its exemplar archetype. Object pyramid(s) are a plurality of graphic objects arranged in levels of ascending resolutions where a finer level of the object pyramid has a higher resolution then a courser level of the object pyramid and a plurality of pixels in a finer level have a common ancestor pixel in a courser level and at least one level of the object pyramid is based on the source graphic object. The process for synthesizing a synthesis object proceeds iteratively in a coarse-to-fine manner, where each scale level is synthesized using three basic operations, upscale, jitter and correction.

In yet another additional embodiment, "upscaling" one synthesis object level to the next involves both a scale and pixel location dependent offset of the lower scale NNF in order to populate the finer scale NNF, and each synthesis pyramid in the plurality of graphic objects in the synthesis object must also be "upscaled" by taking the current synthesis feature vector at the coarse scale and adding an offset calculated as the NNF exemplar pointer in the finer scale minus the NNF exemplar pointer taken from the coarser scale, i.e., the scale dependent difference between corresponding exemplar features is added to the coarse scale synthesis feature.

In a yet further additional embodiment, systems add randomness into the NNF at each level of the synthesis pyramid through a "structure-preserving jitter" process by using the synthesis pyramid NNF to gather a collection of exemplar candidate locations for each synthesis location that have a similar feature to that of the synthesis feature, and using a "jitter" value to choose where in the range of candidates from the current exemplar feature to the worst matching feature the new link should be updated to.

In yet another embodiment again, synthesizing the synthesized graphic object includes dividing the pixels of the synthesized graphic object into a plurality of groups, and iteratively performing a correction process on each of the plurality of groups to determine a new nearest neighbor for each of the pixels in a group for a predetermined number of iterations, such that the iterative performance of the correction process is performed using a first buffer having a size of the number of pixels in the portion of the plurality of pixels of the synthesized graphic object and a second buffer the size of one of the plurality of groups of pixels wherein the first buffer stores pixel information for each pixels in the portion of the plurality pixels of the synthesized graphic object and second buffer stores the pixel information for a current one of the plurality of groups of pixels upon which the correction process is being performed. The order of the performance of the correction process on the plurality of groups in an iteration is determined by a Hilbert curve.

In a yet further embodiment again, finding a more optimal exemplar link for each synthesis location includes optimizing the synthesis pyramid objects NNF into the exemplar object using a semi-random jump flooding strategy, and performing a jump flood-like propagation pass similar to structure-preserving jitter where a set of potentially better candidates is gathered from a patch in the NNF and the NNF synthesis location is updated to the best matching exemplar object candidate location.

In another additional embodiment again, iteratively performing the correction process includes maintaining an optimization mask that indicates each pixel in the portion of the plurality of pixels in the synthesized graphic object that have reached an optimal value, determining whether each pixel in the portion of the plurality of pixels in the synthesized graphic object has reached an optimal value, changing a status in the optimization mask of each pixel in the portion of the plurality of pixels in the synthesized graphic object determined to have reached an optimal value, and reading the optimization mask during each iteration of the correction process and perform the correction process on only the pixels not indicated to be optimal.

In a further additional embodiment again, systems maintain an occurrence map that indicates a number of times a pixel in the exemplar graphic object is selected as one of a nearest neighbor and a candidate for a nearest neighbor in one of the nearest neighbor fields. An occurrence map is a 2D histogram having a bin for each pixel in the portion of the plurality of pixels of the exemplar graphic object. Systems maintain a 2D histogram that indicates a number of times each pixel in the portion of plurality pixels of the exemplar graphic object are selected as one of a nearest neighbor candidate for the collection of nearest neighbor candidate sets when doing NNS during analysis.

In still yet another additional embodiment, systems maintain an occurrence map that indicates a number of times a pixel in the exemplar graphic object is pointed to by the synthesis pyramid. The data structure for synthesis is a pyramid and the data structure for the exemplar is a hybrid stack. The synthesis image pyramid and exemplar hybrid stack have the same relative scale at the upper levels where they are both pyramids. However for a level, L, below the stack to pyramid border B, the scaling factor is $2^{(B-L)}$. When using an exemplar link of a pixel in the synthesis pyramid as an index into the occurrence map the scale factor may be determined by dividing the value of the exemplar link by the scale factor. This can be thought of as creating a "coarse" version of the occurrence map specifically for synthesis.

In another embodiment, systems maintain a minimum distance between exemplar links in adjacent synthesis NNF locations to compare nearest neighbors of adjacent pixels in the synthesized pyramid object to determine whether the nearest neighbors are within a predetermined distance of each other, and adjust an error factor in response to a determination that the nearest neighbor pixels of the adjacent pixels are within the predetermined distance. It is desirable to have larger neighborhoods for lower levels and decrement the neighborhood at each level as the process progresses up the pyramid capping the neighborhood at a minimum of three pixels so that the pixels immediately surrounding the pixel of interest are always included in a neighborhood.

In a further embodiment, systems synthesize a displacement map where local gradients are the dominant features to be synthesized such that the process computes the difference between the local gradients of the synthesizing displacement map and the corresponding local gradients from the exemplar object links. The process is broken up into several passes where the difference between synthesis and exemplar gradients is divided by the number of optimization passes and then added to the synthesis displacement value. This is done to all synthesis object locations in parallel for each level of the synthesis pyramid. Levels are synthesized in sequence from coarse to fine.

In still another embodiment, systems maintain a flow field and jump maps across an input mesh's UV space and extends this approach for on-model synthesis to support a CNN type architecture wherein the vector field directs the local orientation of the convolution and these processes bi-linearly interpolate sampling of neural activations from the previous layer. The convolution kernel extends beyond the scope of an atlas chart the jump map redirects the process to another chart. During a back-propagation process, inverse mapping can be used in a manner similar to the that of convolution. The inverse mapping allows these processes to perform CNN texture synthesis (and style transfer) directly in the UV space of a mesh.

In a still further embodiment, systems encode a volumetric shape representation of a 3D mesh baked onto a 2D plane through its parameterized UV space whereby the relationship between texture features and the underlying geometric shape upon which the texture feature exists through a parameterization of the model in UV space (i.e. the geometric shape of a mesh is projected onto an image). Geometric shape information for each point on a mesh that is projected onto each pixel of an image set include: global normal direction, local curvature, Ambient Occlusion and a Gaussian function. The collection of Gaussian functions (one for each pixel) or Gaussian Mixture Model (GMM) can be downscaled through a pyramid or hybrid stack process whereby the other shape properties are recomputed from the resulting positions of the GMM. The GMM acts as a volumetric shape descriptor that can be compared along with other appearance information such as surface color, surface deformation and reflectance properties. Feature distances between two points on a 3D mesh can be measured as a total variation distance between GMMs that are comprised of some neighborhood of Gaussian functions around a point (a pixel in texture space). This geometric shape descriptor can be combined with arbitrary appearance information (such as a material) into a single unified vector so that arbitrary shape and material data can be synthesized in a single unified framework.

In yet another embodiment, systems allow a user to supply a fully textured mesh as an input exemplar and apply the texture from the exemplar onto a different untextured model. A mapping is computed through NNS from the untextured models shape and the textured models shape. This mapping bootstraps and guides the material synthesis process.

In a yet further embodiment, systems synthesize geometry in the form of a 3D mesh wherein the mean of each Gaussian function comprising a GMM is allowed to change through the upscale, randomization and correction process defined for image synthesis. 3D model synthesis shares an additional step in common with displacement map synthesis, where a new position is found for a pixel based on relative position of the pixel as compared to neighboring pixels, this concept is extended from a 1-element vector to a 3-element vector.

In another additional embodiment, systems synthesize a 4×4 16-element Wang Tile set wherein a red tile is first synthesized without constraints, other than that it must tile with itself, and a blue tile is then synthesized to conform to the corners of a red tile while also tiling with itself. 14 additional tiles are synthesized, one for each combination of the red and blue tile borders along the top, bottom, left and right sides of the tile to be synthesized. A unique feature map is utilized so that highly unique features do not synthesize along border regions between tiles when generating the red and blue tiles and a correction influence weight map is used to incentivize features along the border to propagate inwards towards the center of the tile.

In a further additional embodiment, systems synthesize an in-painting process whereby a mask is supplied which directs the area to be "in-painted" and the area to remain unchanged. A distance field is automatically generated from the border pixels of the mask going inwards. This mask acts as a correction influence weight map which is used to incentivize features along the border to propagate inwards towards the center of the area to be "in-painted".

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
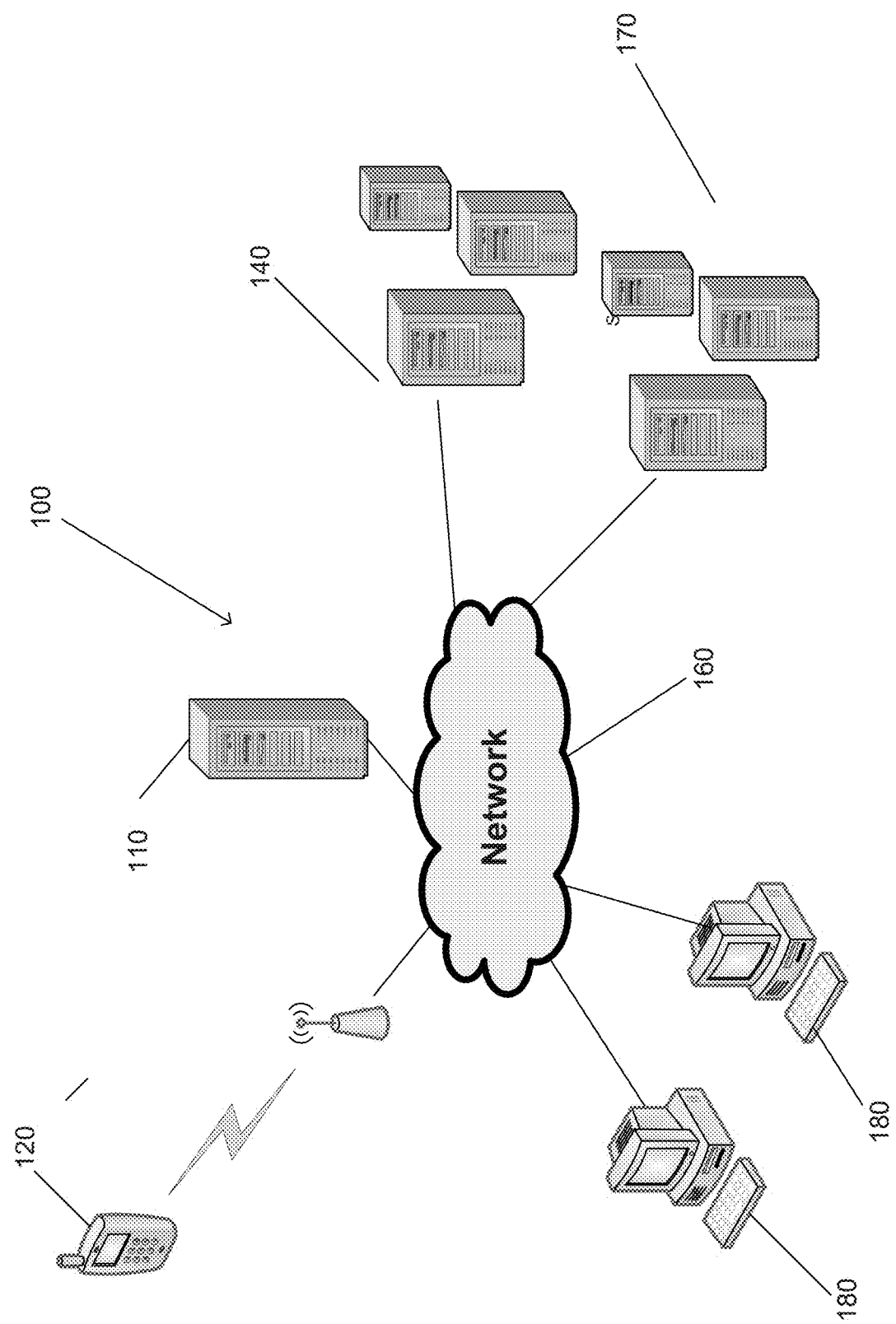
FIG. 1 is an illustration of various devices that may perform one or more processes to provide texture synthesis of arbitrary shape and/or material data in accordance with various embodiments of the invention.

Turning now to the drawings, systems and methods for performing texture synthesis for use in image processing, computer animation, and/or other computer graphics applications in accordance with various embodiments of the invention are illustrated. Texture synthesis is the creation of a graphic object that mimics the statistical and appearance characteristics, or the "texture", of an exemplar set. Exemplar sets can include one or more elements, that may include (but are not limited to) images, meshes, and/or any other data structures that are used in generating a portion of an image. Exemplar sets can include data structures such as (but not limited to) collections of images and/or meshes that encode specific appearance features and/or shape features of complex surfaces.

The field of texture synthesis began in the 1980's as a computer vision problem where statistical models of textured regions of images (such as brick walls, asphalt, etc.) were built for the purpose of image feature identification. Computer graphics repurposed this line of research for synthesis. In synthesis, a statistical model for a texture can be generated, but rather than using the model for identification, the model is used for generation of similar but unique textures on or in a graphic object.

Accordingly, systems and methods in accordance with many embodiments of the invention can incorporate enhancements to some or all aspects of conventional texture synthesis processes. Various unconventional graphic processing innovations can be utilized to enhance the performance of texture synthesis processes and improve the appearance of the resulting synthesized texture are described below. As can readily be appreciated, any combination of these improvements can be incorporated within texture synthesis systems and methods as appropriate to the operating parameters of the particular systems and processes in accordance with the various embodiments of the invention.

In accordance with some embodiments of the invention, texture synthesis for a graphic object (e.g., an image or a 3D model) involves adding a texture from an exemplar set to a synthesis object to generate a synthesized output. Texture synthesis in accordance with many embodiments of the invention include an analysis process of the exemplar set to build a set of exemplar objects, followed by a synthesis process that utilizes additional analysis data generated during the analysis process to direct the synthesis process. In accordance with many embodiments of the invention, analysis processes include processes that generate one or more of: image stacks (or exemplar objects) forming a multiscale representation of a received exemplar set, a feature vector map for each level of the multiscale representation, and a nearest neighbor candidate list for each pixel at each multiscale level indicating possible nearest neighbors between pixels. In some embodiments, nearest neighboring pixels can be found within the same image stack of the same exemplar element. Nearest neighbor candidate lists in accordance with a number of embodiments can include links pointing to nearest neighbors sampled from other exemplar objects. In certain embodiments, analysis of an exemplar object can include the generation of a "unique feature map", a 2D histogram that identifies the degree of feature redundancy for each feature vector within a feature vector map(s) of an exemplar object.

The synthesis portion in accordance with some embodiments of the invention uses the analysis data to perform one or more of the following processes: injecting randomization into the texture synthesis, preventing local repeats of a feature of the exemplar set in the resulting image, preventing global repeats of features from the exemplar set in the resulting image, and preventing local minima from being reached during a convolution process. In addition, the synthesis process in accordance with several embodiments of the invention can be directed by various automatically generated or manually authored "control" maps. Control maps in accordance with many embodiments of the invention define areas of the image that should be affected. In many embodiments, control maps can include (but are not limited to) masks that define regions to be re-created, regions to be preserved, and Control maps in accordance with a number of embodiments of the invention are generated based on user input that identifies or highlights particular areas of an exemplar element.

In accordance with some embodiments of the invention, image stacks can be a combination of a Gaussian Pyramid and a Gaussian Stack herein referred to as a pyramid-stack hybrid. In accordance with many embodiments, a pyramid-stack hybrid is a subset of Gaussian Pyramid levels concatenated with a subset of Gaussian Stack levels. In accordance with a number of embodiments, the pyramid-stack hybrid can exhibit the properties of a Gaussian Stack to a specified level and then switch to the properties of a Gaussian Pyramid in the remaining levels.

Feature vector maps in accordance with several embodiments of the invention are extracted from the input exemplar object at each scale level by gathering a neighborhood set of pixels surrounding each pixel and combining them into a single "feature vector". Feature vector maps in accordance with several embodiments of this invention are extracted from the exemplar object using a Convolutional Neural Network (CNN). In a number of embodiments, a 19 layer VGG, pre-trained neural network is used. In several embodiments, the CNN contains a set of filters that are convolved over the image as well as layers that have already been filtered where the filter process operates progressively from shallow layers to deeper layers. Each filter process can extract out features that are meaningful in terms of human perception. As filter processes go deeper into the CNN, the filters can become more semantically meaningful.

In many embodiments, feature vectors can be distilled into smaller vectors through dimensionality reduction processes such as (but not limited to) Principle Component Analysis (PCA), although other dimensionality reduction algorithms are equally viable. Such dimensionality reduction processes may be used as a post process, after feature vector extraction, in order to accelerate remaining processes.

In accordance with many embodiments, a nearest neighbor search (or approximate nearest neighbor search (ANNS)) is performed for an exemplar object and a nearest neighbor candidate list for each of the pixels and/or groups of pixels for each scale level of the exemplar object is generated and stored. In some embodiments, an additional operation analyzes the exemplar object for feature "uniqueness" and generates a 2D histogram where each element quantifies the degree of uniqueness for a patch of the exemplar object.

In the synthesis portion of the texture synthesis process, synthesis processes in accordance with several embodiments of the invention use the results generated by the processes of the analysis portion to generate textured images. In accordance with some embodiments, a multiscale coarse-to-fine synthesis pyramid is utilized to generate a synthesized graphic object. Randomness is injected during the generation of each pyramid level in accordance with many embodiments of the invention. The randomness may be injected using a structure-preserving jitter strategy in accordance with a number of embodiments of the invention.

In the synthesis portion in accordance with many embodiments of the invention, synthesized graphic objects are iteratively optimized to globally reproduce the statistical feature distribution of the exemplar object through a "correction" process. Correction processes may be performed over the image using a Hilbert Curve ordering of the pixels in accordance with some embodiments. To do so, processes in accordance with many embodiments use different sized ping-pong buffers to store and replace data in the image during one or more of the correction processes. In accordance with some embodiments, an adaptive corrective process is used in which a distance map between iterations of the pixels is maintained and used to determine whether convolution should continue on a pixel and/or group of pixels. In some embodiments, correction is run in two passes where the first pass performs a search strategy (e.g., jump flooding) through the exemplar object and then the second pass uses the pre-computed list of nearest neighbor candidates generated for the exemplar object to refine the matching of synthesis features with exemplar features.

A histogram of exemplar usage or an "occurrence map" may be used in accordance with some embodiments of the invention to prevent local and/or global repeat artifacts. In accordance with many embodiments, occurrence maps are two-dimensional histograms containing a bin for each pixel (or patch of pixels) in the exemplar set. In some embodiments, every time an exemplar pixel or patch of pixels is referenced by a process of the synthesis portion, the corresponding bin in the occurrence map is incremented. Global repeat artifacts may be revealed in the occurrence map as a small set of bins that contain a much higher value than the average (i.e., spikes in the histogram). In accordance with some embodiments, occurrence maps can be used as feedback during other synthesis processes in order to dissuade the mapping between pixels in the image and exemplar references that are already overrepresented relative to an average number of representations of all the references monitored by the occurrence map. In accordance with some embodiments, the synthesis process uses the occurrence map value of an exemplar pixel (or patch of pixels) as an additional error term when performing matching during a nearest neighbor search. In accordance with many embodiments, the synthesis process may use thresholding provided by occurrence map values to prevent pixels and/or patches of pixels from the exemplar set from becoming overrepresented.

In a number of embodiments, local repeats are avoided by maintaining a minimum distance between exemplar links in adjacent synthesis Nearest Neighbor Field (NNF) locations. During synthesis, nearest neighbors of adjacent pixels can be compared to determine whether the nearest neighbors are within a predetermined distance of each other in accordance with several embodiments of the invention. In some embodiments, an error factor is adjusted in response to two adjacent synthesis locations linking to two adjacent locations in the exemplar object. In accordance with many embodiments, correction processes may be performed on a per level basis of an image pyramid to prevent convolution of the pixels from being stuck in a local minima.

In accordance with a number embodiments, one or more of the analysis and synthesis processes for texture synthesis in an image may be applied to texture synthesis processes for other graphical objects including, but not limited to, displacement map synthesis, on-model synthesis, In-Painting, and Wang tile sets. Systems and methods for providing texture synthesis of arbitrary shape and/or material data within a unified framework are described in more detail below.

Systems for Providing Texture Synthesis of Arbitrary Shape and/or Material Data within a Unified Framework A system that provides texture synthesis of arbitrary shape and/or material data within a unified framework in accordance with some embodiments of the invention is shown in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 is a group of one or more server computer systems communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers connected via an internal network. However, the server systems 110, 140 and 170 may include any number of servers and any additional number of server systems may be connected to the network 160 to provide cloud services including, but not limited to, virtualized server systems. In accordance with various embodiments of this invention, processes for providing convolutional neural network based image synthesis are provided by one or more software applications executing on a single server system and/or a group of server systems communicating over network 160.

Users may use personal devices 180 and 120 that connect to the network 160 to perform processes for providing convolutional neural network based image synthesis in accordance with various embodiments of the invention. In the illustrated embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" or "wireless" network connection. The mobile device 120 connects to network 160 using a wireless connection. A wireless connection is a connection that uses Radio Frequency (RF) signals, Infrared signals, or any other form of wireless signaling to connect to the network 160. In FIG. 1, the mobile device 120 is a mobile telephone. However, mobile device 120 may be a mobile phone, Personal Digital Assistant (PDA), a tablet, a smartphone, a virtual reality headset, an augmented reality headset, a mixed reality headset or any other type of device that connects to network 160 via wireless connection without departing from this invention. In accordance with some embodiments of the invention, the processes for providing convolutional neural network based image synthesis are performed by the user device. In several other embodiments, an application being executed by the user device may capture or obtain the two or more input images and transmit the captured image(s) to a server system that performs the processes for providing convolutional neural network based image synthesis. In accordance with a number of embodiments where one or more of the images is captured by the user device, the user device may include a camera or some other image capture device that captures the image.

As can readily be appreciated the specific computing system used to capture images and/or processing images to perform material and/or shape synthesis is largely dependent upon the requirements of a given application and should not be considered as limited to any specific computing system(s) implementation. Computing systems and processes for performing arbitrary material and/or shape synthesis are discussed further below.

Figure 2:
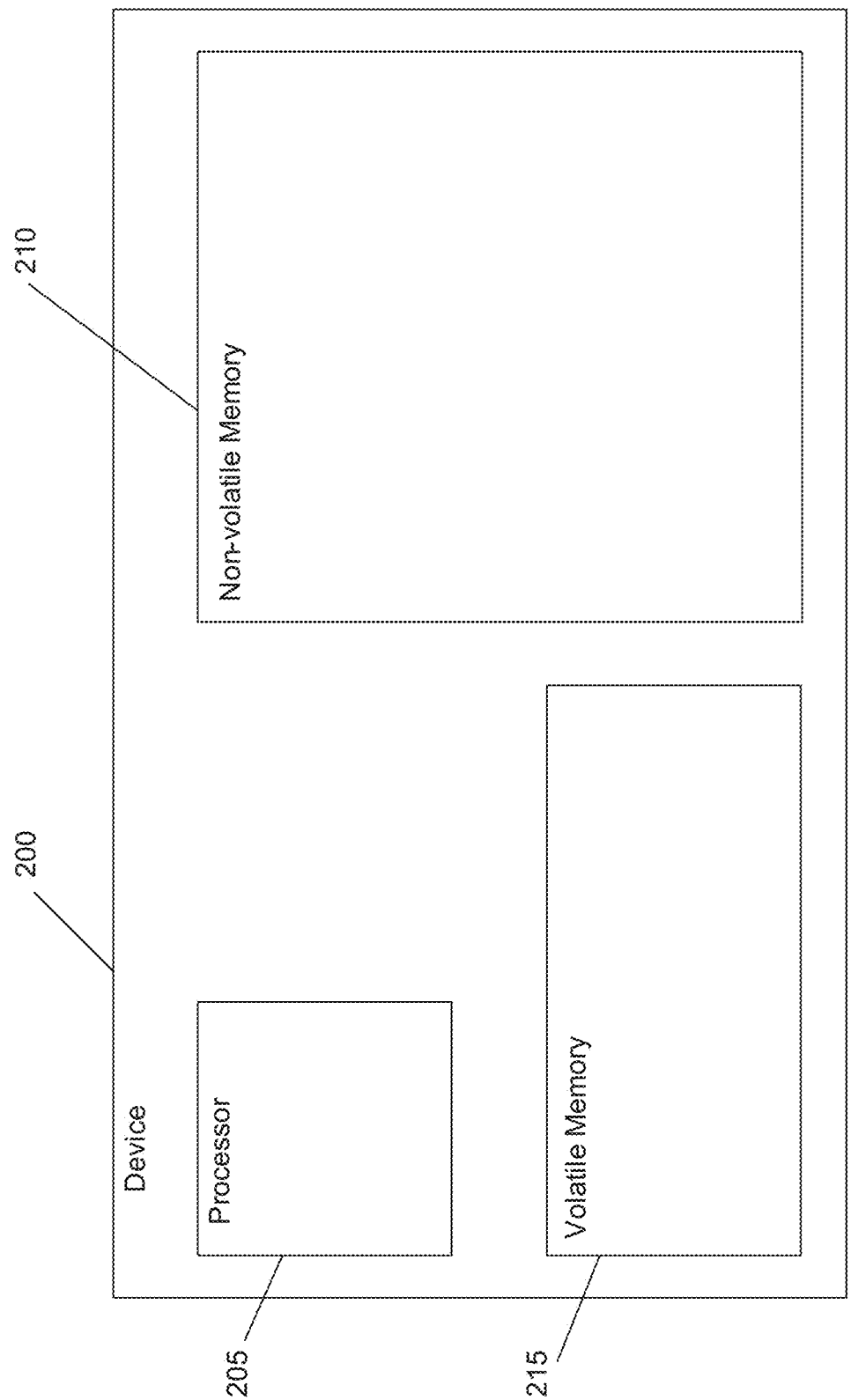
FIG. 2 is an illustration of components of a processing system in a device that executes one or more processes to provide arbitrary shape and/or material synthesis in accordance with various embodiments of the invention.

An example of a processing system in a device that executes instructions to perform processes that provide interaction with other devices connected to the network as shown in FIG. 1 and/or for providing convolutional neural network example based texture synthesis in accordance with various embodiments of the invention is shown in FIG. 2. One skilled in the art will recognize that a particular processing system may include other components that are omitted for brevity without departing from this invention. The processing device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or the non-volatile memory 210 to manipulate data stored in the memory. The non-volatile memory 210 can store the processor instructions utilized to configure the processing system 200 to perform processes including processes in accordance with embodiments of the invention and/or data for the processes being utilized. In other embodiments, the processing system software and/or firmware can be stored in any of a variety of non-transient computer readable media appropriate to a specific application. A network interface is a device that allows processing system 200 to transmit and receive data over a network based upon the instructions performed by processor 205. Although a processing system 200 is illustrated in FIG. 2, any of a variety of processing systems in the various devices can be configured to provide the methods and systems in accordance with various embodiments of the invention.

Arbitrary Shape and/or Material Texture Synthesis

In accordance with some embodiments of the invention, texture synthesis processes for arbitrary shape and or material data include an analysis portion and a synthesis portion. The analysis portion in accordance with several embodiments of the invention generates the needed analysis data by analyzing exemplar objects to determine similarities and/or relationships within and between the exemplar elements, which can be used in providing an appropriate texture to the various portions of a synthesis object during the synthesis portion of the process. In accordance with some embodiments of the invention, the analysis portion includes one or more of the following processes: a multi-resolution stack generation process, an extraction process, a feature extraction process, a dimensionality reduction process, a nearest neighbor search process and/or a unique feature identification process.

Synthesis in accordance with many embodiments of the invention uses the similarities and/or relationships determined in the analysis portion to apply the appropriate textures to portions of the synthesis object to produce a new object. In many embodiments, the new object is the result of applying the synthesis processes to an input synthesis object. In accordance with several embodiments, the synthesis portion includes one or more of the following processes: an up-ressing process, a randomness adding process, a correction process and a CNN inversion process; and/or a Poisson blending process. CNN inversion processes in accordance with many embodiments of the invention allow the "mixing" of different feature vectors during a synthesis process. CNN inversions and their use in synthesis is described in U.S. Pat. No. 9,922,432, entitled "Systems and Methods for Providing Convolutional Neural Network Based Image Synthesis Using Stable and Controllable Parametric Models, a Multi-scale Synthesis Framework and Novel Network Architectures," the disclosure of which is hereby incorporated by reference in its entirety. The various processes that can be used in the analysis and synthesis portions in accordance with various embodiments of the invention are described further below.

Analysis

Figure 3:
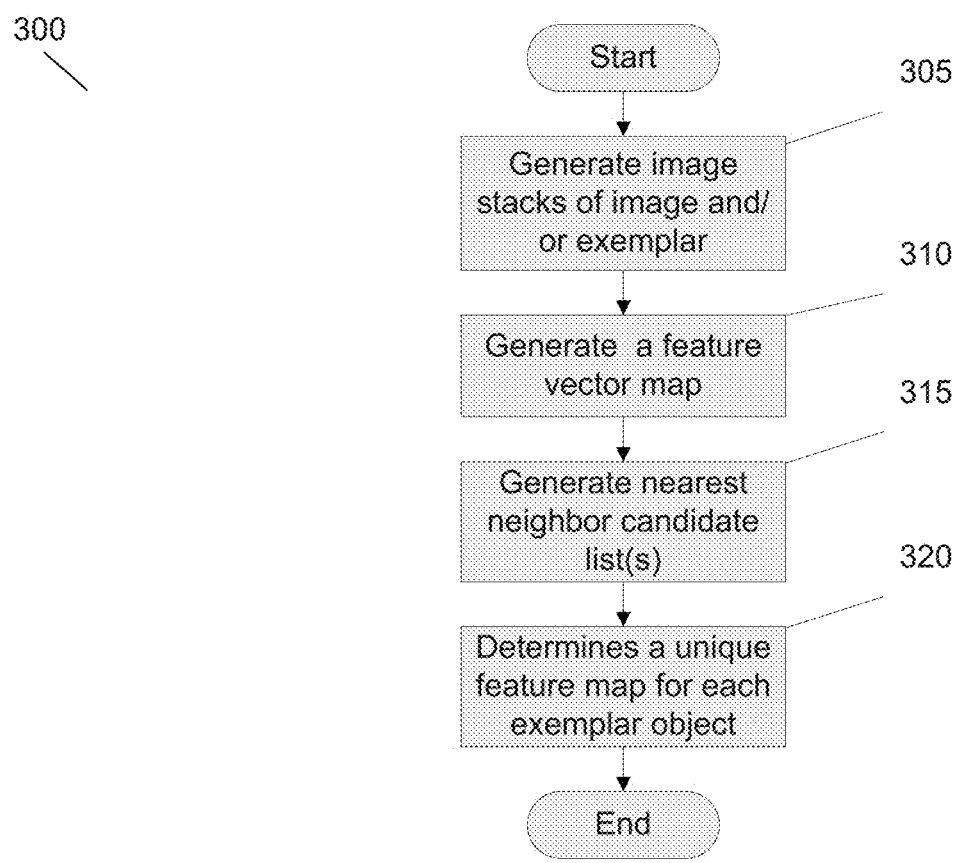
FIG. 3 is an illustration of a flow diagram of an analysis portion of a texture synthesis process in accordance with an embodiment of the invention.

In accordance with many embodiments, the analysis portion analyzes one or more exemplar elements of the exemplar set to determine similarities and/or relationships between the objects and generates analysis data such as, but not limited to, image stacks, feature vector maps, nearest neighbor candidate lists, unique feature maps, and various other data structures that are used to generate a new graphic object. A flow diagram of a process performed in an analysis portion of a texture synthesis process in accordance with an embodiment of the invention is shown in FIG. 3. Process 300 generates (305) one or more image stacks from the received image and/or exemplar set, generates (310) a feature vector map(s) of various visible features in the image, generates (315) a nearest neighbor candidate list(s) indicating possible nearest neighbors between pixels in the image stacks of the received image and/or the exemplar objects, and determines (320) a unique feature map for each exemplar object. Processes for analyzing graphic objects and generating the various data structures and/or other analysis data for use in the synthesis portion of texture synthesis processes in accordance with many embodiments of the invention are described below.

Multi-Resolution Image Stack Generation

Figure 4:
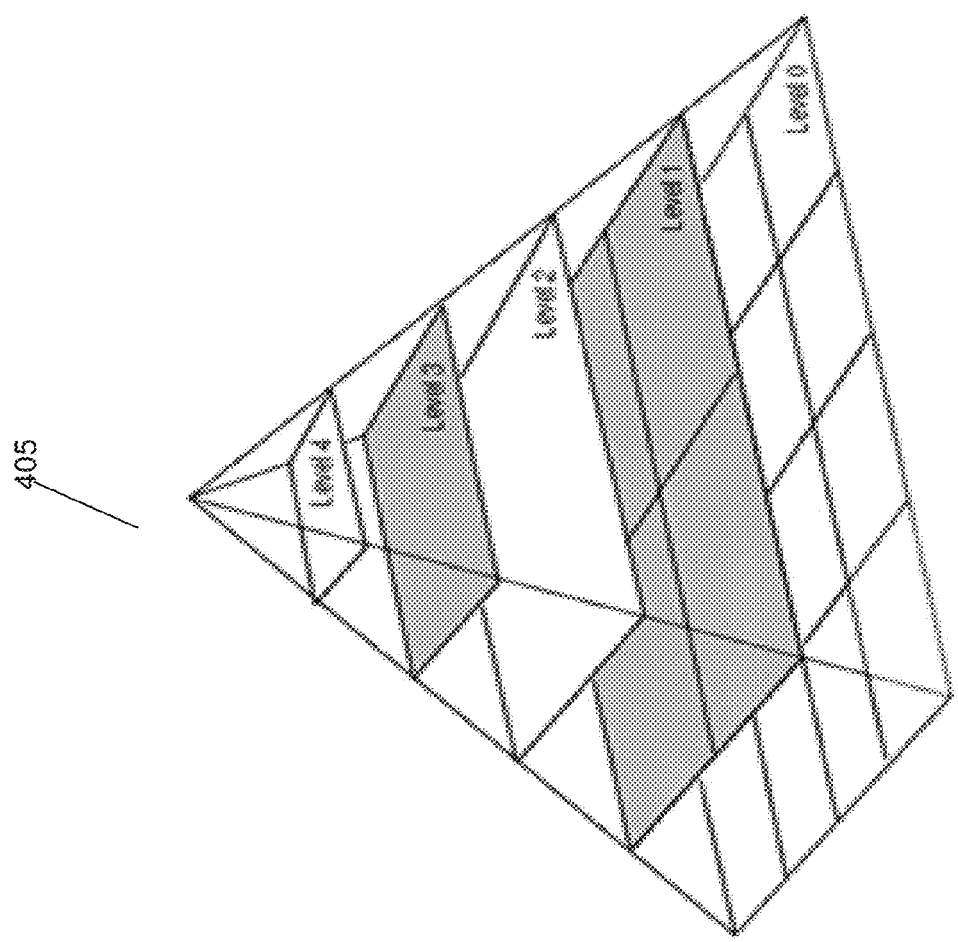
FIG. 4 is an illustration of resolution image pyramids representing an image in accordance with a conventional filter process.
Figure 4:
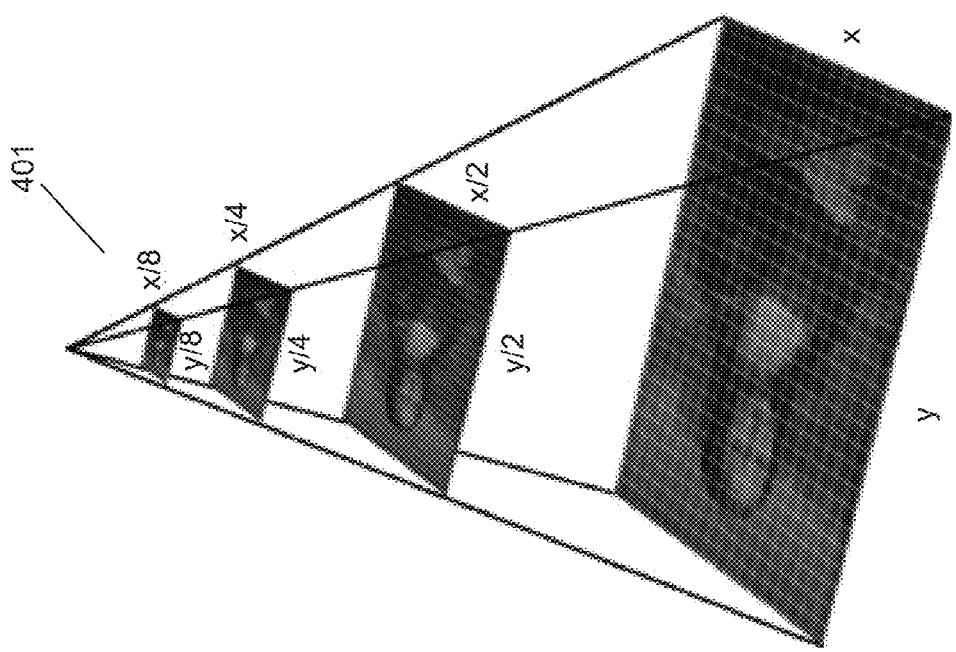

It is common practice in texture synthesis to convert input exemplar sets into a multi-resolution image pyramid as first introduced by Fast Texture Synthesis Using Tree-structured Vector Quantization, Wei & Levoy 2000. A typical image pyramid is shown in FIG. 4 where pyramid 401 shows the different versions of an image in a pyramid and pyramid 405 shows the different sizes of the images at the different levels of the pyramid. Multi-resolution image pyramids can be used to extract high to low frequency information out of images. Image features in a texture can vary in size, so larger features will appear lower in the pyramid while small features will appear at the top of the pyramid. In an example, an image has a feature that is 9 pixels×9 pixels. In order to sample the 9×9 pixel feature in a single full resolution image, a process would require 81 samples. Alternatively, one could sample 5×5, 3×3 and 1×1 (i.e., 35 pixels) from the image pyramid and achieve a feature of similar description.

Figure 5:
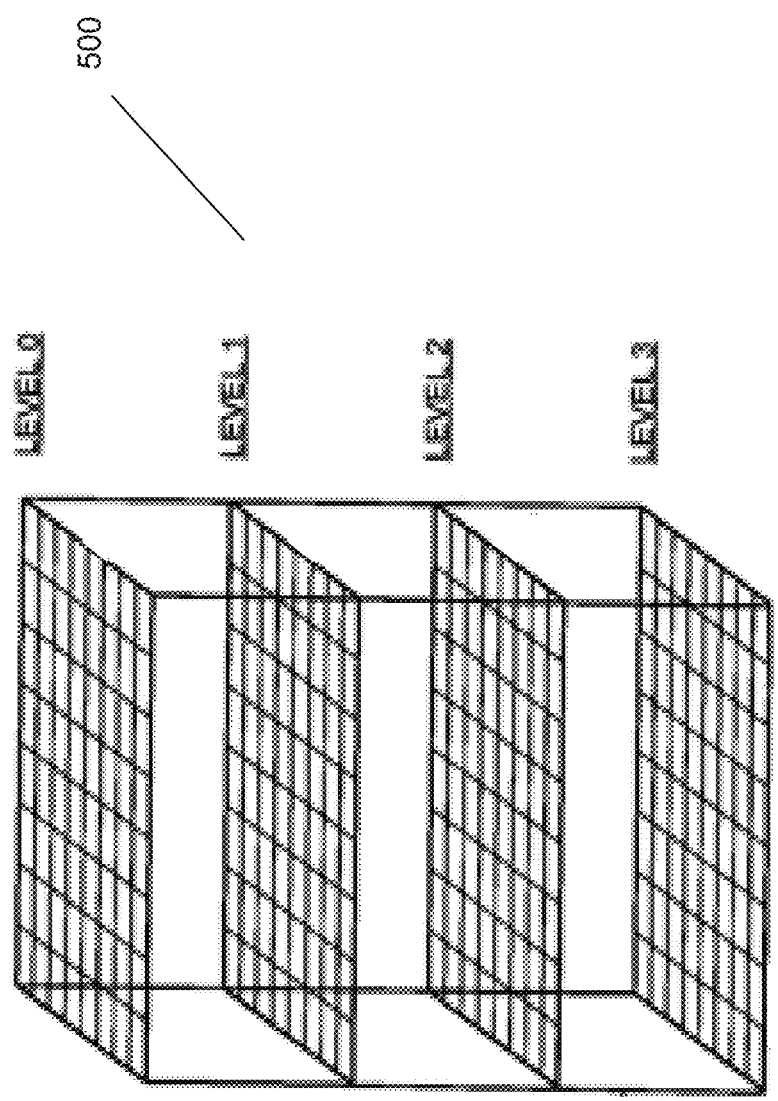
FIG. 5 is an illustration of a Gaussian Stack representing an image in accordance with a conventional filter process.

One specific type of image pyramid is a Gaussian pyramid. A Gaussian pyramid is generated using a Gaussian filter to build the image pyramid. The idea of using a Gaussian pyramid can be extended to a Gaussian "stack" illustrated in FIG. 6. Gaussian stacks are based on a premise that a pyramid data structure leads to synthesized features aligning with a coarser "grid" because ancestor coordinates in the synthesis pyramid are snapped to the quantized positions of the exemplar pyramid. Other solutions to this problem include, but are not limited to, using a collection of image pyramids at different locations in the exemplar object. A Gaussian stack extends this concept to the most extreme conclusion where every possible Gaussian pyramid configuration is extracted from the original image, and then packed together efficiently so all redundant data is removed. The efficient packing can be achieved using a "quad tree pyramid" 500 shown in FIG. 5. Quad tree pyramids in accordance with some embodiments of the invention can enable acceleration of an approximate nearest neighbor search (ANNS) utilizing KD-Trees. Furthermore, Gaussian stacks in accordance with a number of embodiments of the invention re-order the data into a tightly packed image, where features remain coherent across scale levels.

Figure 6:
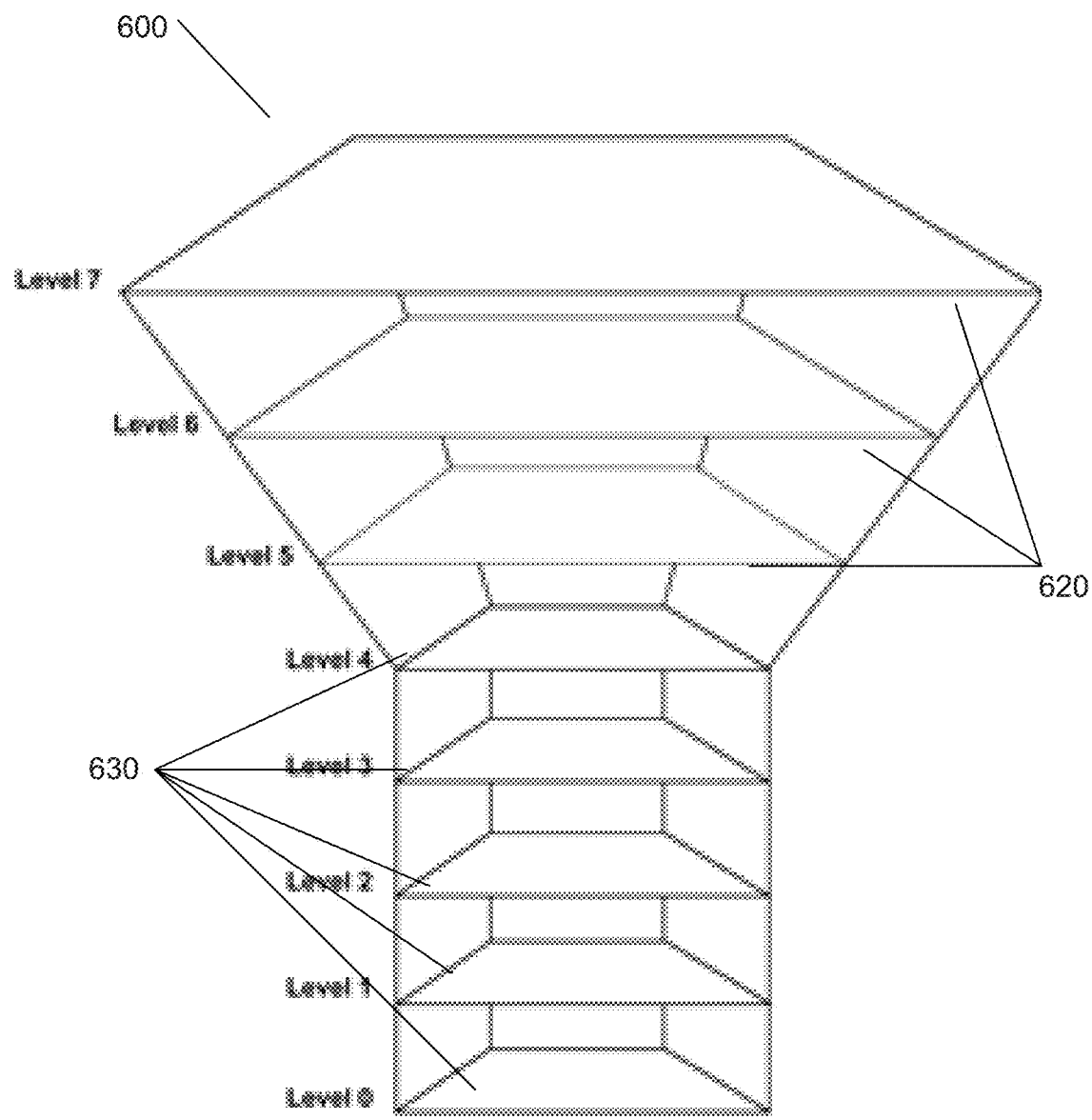
FIG. 6 is an illustration a pyramid/stack hybrid for representing an image in a filter process in accordance with an embodiment of the invention.

Gaussian stack can be a very memory inefficient way to encode data, especially at lower stack levels. Previous texture synthesis approaches utilizing Gaussian stacks were generally limited to 256×256 pixels in resolution due to the high memory demands. However, conventional images may have much higher pixel resolutions. The size of these images can make Gaussian stack representations too memory demanding. Instead, processes in accordance with some embodiments of the invention use a collection of Gaussian pyramids, or a subset of the pyramids represented by the Gaussian stack. These processes may sample pyramids at regular intervals along both dimensions of the axes and effectively constitute a pyramid-stack hybrid approach. This data structure exhibits the properties of the Gaussian stack up to a specified level and then switches to a pyramid. A conceptual illustration of a pyramid-stack hybrid used in accordance with some embodiments of the invention is shown in FIG. 6. In FIG. 6, levels 630 of a pyramid-stack hybrid 600 are similar to a Gaussian stack and levels 620 are similar to a Gaussian pyramid, such that the pyramid-stack hybrid 600 is a Gaussian stack with a Gaussian pyramid sitting on top of the stack.

In a number of embodiments, this stack→pyramid strategy can be repeated multiple times across the wide range of scales that can exist when building a multiscale representation. For example, a stack→pyramid→stack→pyramid structure could also be used.

Although a specific pyramid-stack hybrid used for texture synthesis in accordance with an embodiment of the invention is discussed above, the pyramid-stack hybrid may be modified, by adding, removing, and/or combining components of the stack in accordance with other embodiments of the inventions.

Dimensionality Reduction

In many embodiments, dimensionality reduction can be used to both reduce the data needed to compare image patches for the purposes of acceleration, while arguably distilling the information into a more descriptive form. In certain embodiments, dimensionality reduction can include (but is not limited to) Principal Component Analysis (PCA) and linear discriminant analysis (LDA). Patches of pixels (e.g., 5×5 patches) can be gathered around each pixel location and transformed into their principle components for each feature vector map at each scale level of an exemplar object. Although a PCA process for texture synthesis in accordance with an embodiment of the invention is discussed above, any of a number of processes that involve adding removing, and/or combining steps of the process described above as appropriate to refinements of a specific application in accordance with other embodiments of the application are possible.

Feature Extraction

Previous texture synthesis approaches create feature vectors at each pixel location by gathering patches of pixels, e.g., 5×5 or 7×7 patches. In some cases, the created feature vectors are transformed using dimensionality reduction to produce more compact feature vectors. In either case, the L2 distance between the created feature vectors is used as a similarity metric. This similarity metric is often not very good at describing similarity between patches in terms of human perception.

Instead, processes in accordance with some embodiments of the invention learn the feature vector using a Convolutional Neural Network (CNN), as CNNs also take in a patch of pixels and calculate a vector that summarizes their appearance, or "features". In accordance with a number of embodiments, a 19 layer VGG, pre-trained CNN is used. The 19-layer VGG network, once trained, contains a set of filters that are convolved over the image. Each filter extracts out a feature that is meaningful in terms of human perception. As filters go deeper into the network, the filters become more semantically meaningful. Processes in accordance with many embodiments of the invention concatenate filter responses at each pixel into feature vectors that are based on perception. The feature vectors are then compared using the L2 distances.

In accordance with some embodiments of the invention, PCA is used on feature vectors produced by a CNN in order to reduce the dimensionality of the vectors, speeding up neighborhood matching. An exemplar object contains material data that is comprised of one or more bitmaps, as well as mesh data that can be projected into a collection of one or more bitmaps. Each bitmap can be projected through a CNN to form feature vectors or the bitmaps can be concatenated and the resulting appearance vector can be projected through a CNN to form a more complex feature vector. In either case, PCA can then be used as a data-reduction technique for a more compact representation of the feature vector. During comparison, L2 distances of each PCA map for each bitmap included in the material data or shape data may be computed independent of each other. A final distance value may be formed by a weighted average of the individual distance values (the weights can be predetermined and/or chosen by the user).

Although a CNN feature extraction process for convolutional neural network based texture synthesis in accordance with an embodiment of the invention is discussed above, any of a number of processes that involve adding removing, and/or combining steps of the process described above as appropriate to refinements of a specific application in accordance with other embodiments of the application are possible.

Pre-Computed Nearest Neighbor Candidate Search

Many texture synthesis processes require a nearest neighbor search (or ANNS) to synthesize a desired output. However, the ANNS is often the most costly part of the entire image synthesis process. There are several strategies for accelerating the ANNS in texture synthesis processes in accordance with various embodiments of the invention.

During a texture synthesis process in accordance with some embodiments of the invention, a ANNS strategy is used where each synthesized pixel maintains a link to an exemplar pixel that the synthesized pixel was modeled from. In many embodiments, each exemplar pixel contains a pre-computed list of K nearest neighborhoods (KNN) in the exemplar element and/or other exemplar elements of the exemplar set. Computing the KNN may involve running an Approximate Nearest Neighbor search (ANNS) during analysis and storing the results. The rest of this process is discussed below with regards to synthesis, adding randomness, and correcting the result.

In accordance with some embodiments, ANNS's are fast, parallelizable, and specifically designed to take advantage of a CNN architecture. ANNS's in accordance with many embodiments of the invention can search for features layer-by-layer in a CNN using a deep to shallow order. Deeper layers of the CNN can encode the more semantically meaningful characteristics of an input layer. ANNS's in accordance with several embodiments of the invention can find deep correspondences in order to match semantically similar structures. The correspondences can be propagated backwards through the CNN and can be refined at each layer in order to find better matches based on local appearances embedded within similar higher order structures.

Figure 7:
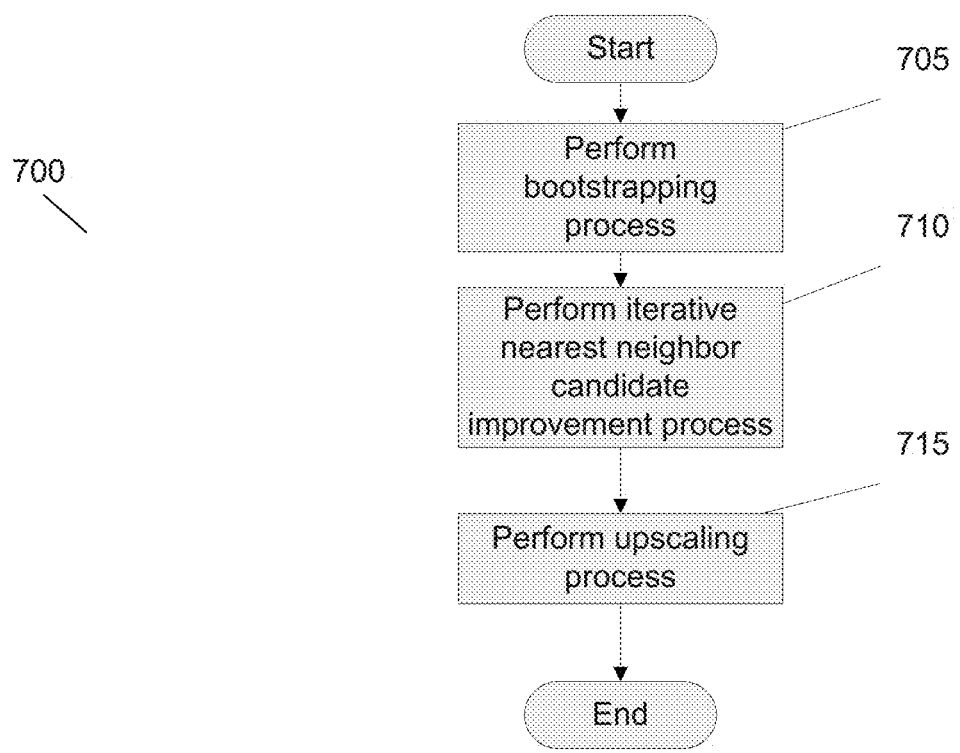
FIG. 7 is an illustration of a flow diagram of an Approximate Nearest Neighbor Search (ANNS) process in accordance with an embodiment of the invention.

An ANNS process in accordance with an embodiment of the invention is shown in FIG. 7. ANNS process 700 includes performing (705) a bootstrapping process, performing (710) an iterative nearest neighbor candidate improvement process, and performing (715) an upscaling process. The bootstrapping process can be performed (705) in accordance with some embodiments to generate approximate guesses for each pixel to start the nearest neighbor search. An iterative nearest neighbor candidate improvement process is performed (710) in accordance with many embodiments to improve all nearest neighbor candidates for an entire layer of the network in parallel using an image coherence principle as explained in "Synthesizing Natural Textures", Ashikmin 2001 as the theoretical foundation along with a customized version of a jump flooding process as discussed in "Jump Flooding in GPU with Applications to Voronoi Diagram and Distance Transform", Rong and Tan 2005 in order to propagate good matches to surrounding pixels, the disclosures of which are hereby incorporated by reference in their entirety.

An upscaling process is performed (715) in accordance with a number of embodiments to propagate best matches of a layer to the next layer and to refine the matches to take local features into account. Using these processes, the ANNS process 800 progresses in the following order: bootstrap the nearest neighbor search deep in the network, for each layer, propagate the best matches from one layer deeper, and propagate the good matches to surrounding pixels. The processes performed in an ANNS process in accordance with some embodiments are described below.

Figure 8:
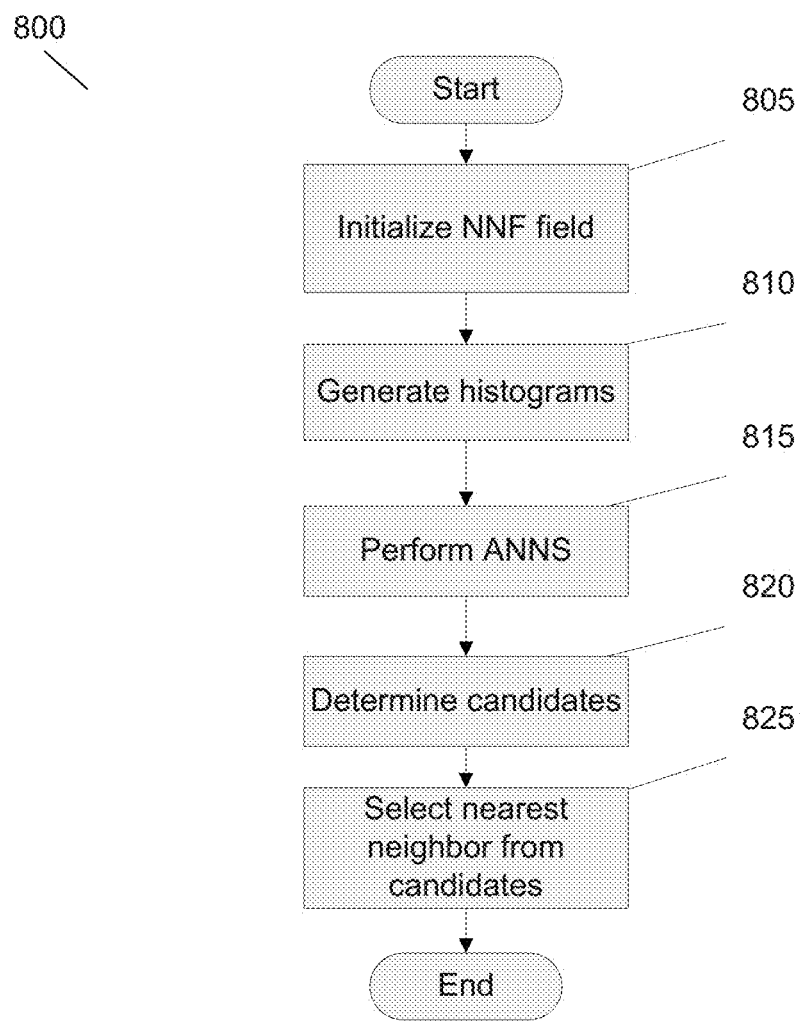
FIG. 8 is an illustration of a flow diagram of a bootstrapping process performed in an ANNS process in accordance with an embodiment of the invention.

The ANNS process 700 performs (705) a bootstrap process to determine an initial step of nearest neighbors. A bootstrapping process performed by an ANNS process in accordance with an embodiment is shown in FIG. 8. A bootstrapping process 800 initializes (805) a Nearest Neighbor Field (NNF) with a minimal ANNS. For each of the feature maps that comprise the deep convolution layer where the synthesis begins, a histogram representation of that channel is generated (810). For example, a synthesis processing in accordance with an embodiment of the uses an Relu4_1 in a VGG that has a deep convolutional layer with 512 channels. As such, a histogram of 512 bins is generated having one bin for each of the channels.

The bootstrap process 800 performs (815) an ANNS from a first exemplar object linking to a second exemplar object, to generate (820) a set of nearest neighbor candidates in the histogram. In accordance with some embodiments, only a histogram for the second exemplar object that is being linked to by the first exemplar object may be generated. In accordance with many embodiments, each particular bin in the histogram may contain links to the pixels that contributed to the particular bin. When finding a match for an arbitrary pixel, the value of each channel may be used as an index into the corresponding histogram. If no values exist in a bin being indexed by a channel value, the next closest bin that contains values may be used in accordance with a number of embodiments. In accordance with several embodiments, a pixel link may be selected at random from the next closest bin.

If an ANNS is being performed internal to an image (i.e., the second exemplar object is a copy of the first), there may be an additional constraint that any link selected using the above strategy must also be a particular distance (e.g., 5% of the image width or height) away from the pixel doing the search as well as a distance away from any other nearest neighbors that have previously been determined in accordance with a few embodiments. This constraint can be added by performing a distance check and by continuing to randomly select candidates.

Although specific methods for randomly initializing an NNF (e.g., completely random links) in accordance with various embodiments of the invention are described above, any of a number of processes as appropriate to refinements of a specific application in accordance with other embodiments of the application are possible.

After a set of nearest neighbor candidates is gathered (820) for each channel, a nearest neighbor is chosen by selecting (825) one of the links from the candidate set. In accordance with some embodiments, the nearest neighbor can be selected by finding the L2 distance between the feature vectors as a whole. The logic behind this selection method is that if there is a similar feature in one channel, it is probable that the feature vector as a whole will be similar across all channels.

Although various embodiments of a bootstrapping process performed in ANNS processes in accordance with various embodiments of the invention are described above, any of a number of processes that involve adding removing, and/or combining steps of the bootstrapping processes described above as appropriate to refinements of a specific application in accordance with other embodiments of the application are possible.

The bootstrapping process 800 cannot guarantee that a good match is found for every pixel, due to the approximate nature of the bootstrapping process. However, the bootstrapping process will most likely find a few good matches in the entire NNF. Thus, an ANNS process in accordance with many embodiments must propagate these few good matches to the surrounding area. To do so, the ANNS process performs an iterative nearest neighbor candidate improvement process. In accordance with some embodiments, the iterative nearest neighbor candidate improvement process may be based on the premise that a single good match in an ANNS can influence its neighbors and help the neighbors find good matches as well. Therefore, only a few good initial matches may need to be found in an ANNS and these matches can be propagated to the surrounding areas.

Figure 10:
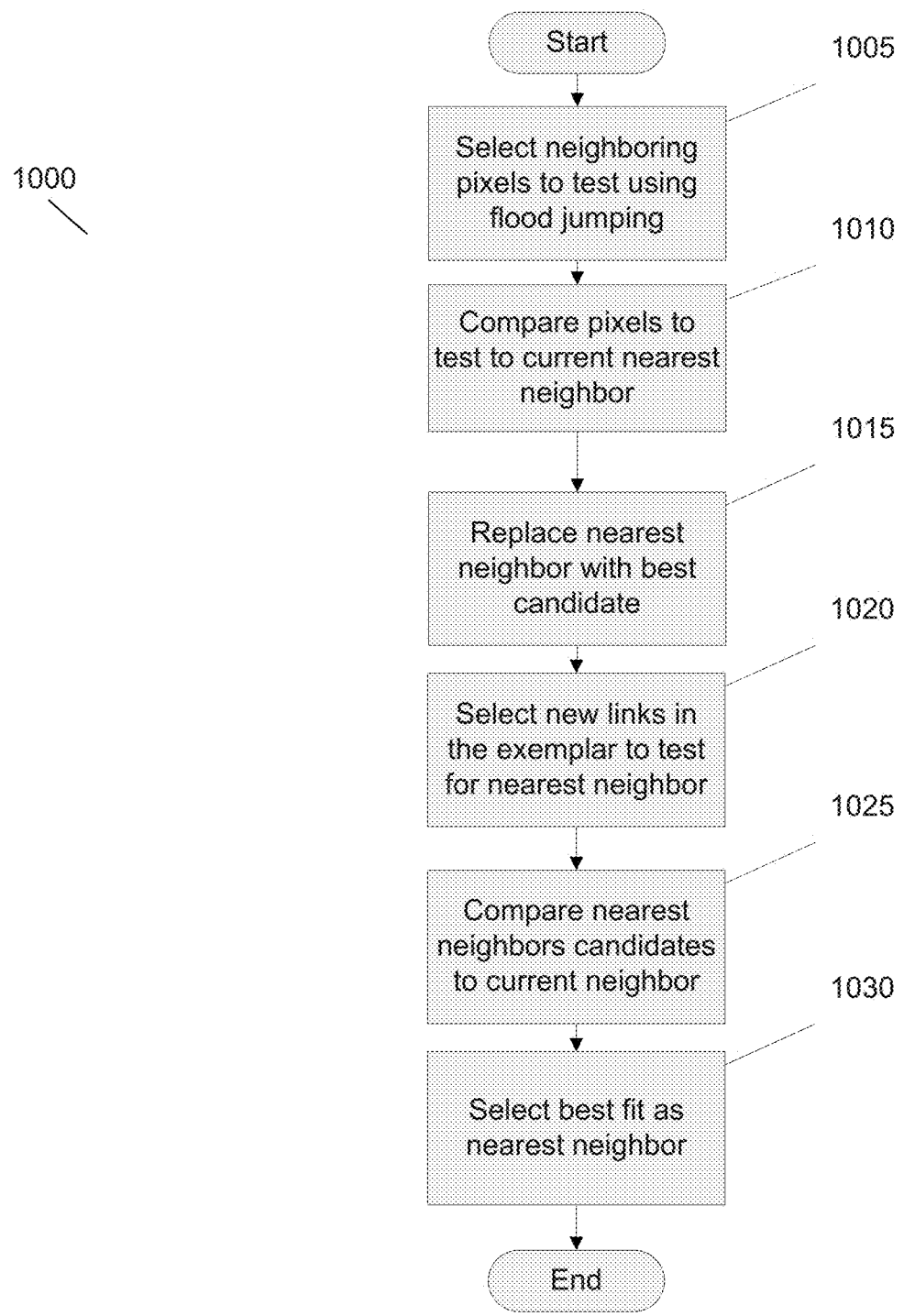
FIG. 10 is an illustration of a flow diagram of an iterative nearest neighbor candidate improvement process in accordance with an embodiment of the invention.

In accordance with many embodiments of the invention, an iterative nearest neighbor candidate improvement process is performed through a modified version of a jump flooding process. In the original jump flooding process, Voronoii diagrams and signed distance fields, two historically sequential processes that operate on 2D arrays were made parallel for real-time computation using GPUs. The theory behind a jump flooding process is to sequentially check each of the 8 surrounding neighbors of a pixel multiplied by some power of 2 away from the pixel of interest going from higher numbers to lower numbers. For example, if 6 passes of the jump flooding process were performed, the first pass would check the up, down, left, right directions 64 pixels away along with the four diagonals that are 64 pixels away along both the x and y directions. If these 8 neighbors contain useful information that warrants updating the current pixels state, the next iteration of the process is bootstrapped. The fifth pass checks 32 pixels away for the pixel and the remaining passes check 16, 8, 4, 2, and 1 pixels away respectively. By operating in this order, information can propagate up to 64 pixels away using only log (64)=6 parallel passes. An example of images showing performance of a jump flooding process is shown in FIG. 10.

Figure 9:
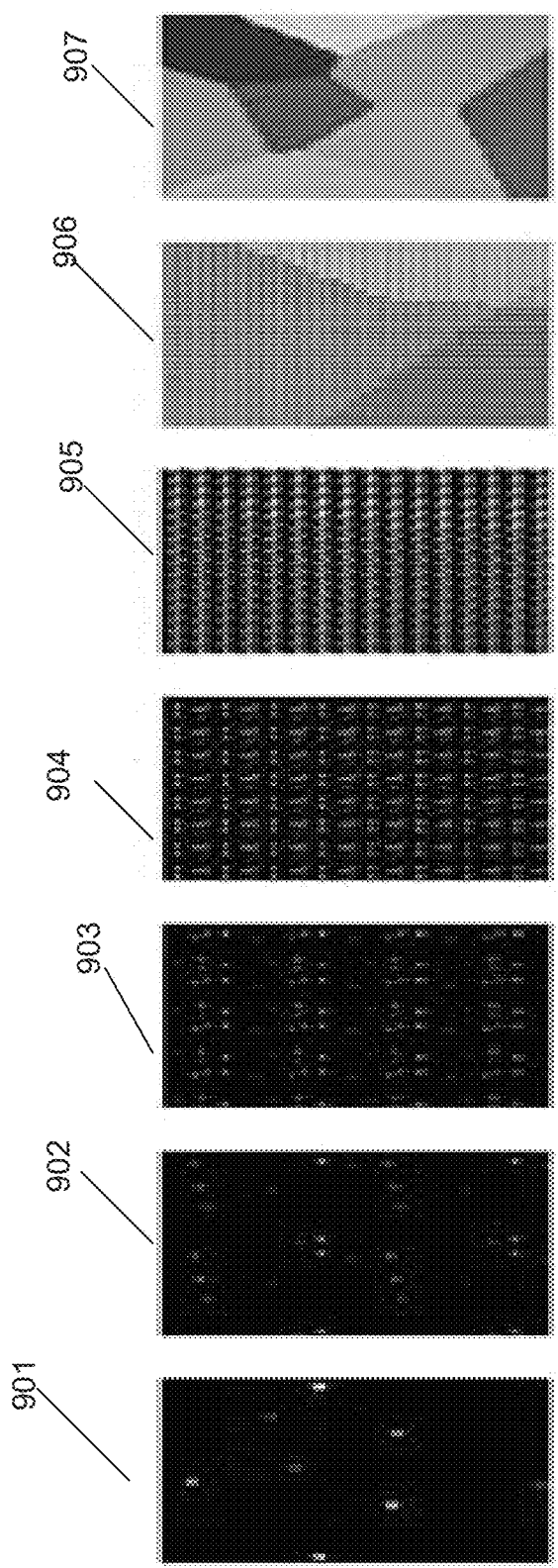
FIG. 9 is an illustration of images of the pixels under consideration during steps of a jump flooding process.

In FIG. 9, the jump flooding process iteratively jumps from 32 pixels (shown in image 901) away, to 16 pixels away (shown in image 902), to 8 pixels away (shown in image 903), to 4 pixels away (shown in image 904), to 2 pixels away (shown in image 905) and finally to 1 pixel away (shown in image 906). The result of the jumps is a finalized Voronoii diagram (shown in image 907) that is generated by updating the distance and ID of a pixel to the distance and pixel ID of one of the neighbors under consideration in a pass that has the lowest distance to the pixel.

In accordance with many embodiments, jump flooding processes are extended in order to propagate best nearest neighbor matches to fill the same purpose as the propagation pass in a patchmatch process. A patchmatch process is described in "PatchMatch: A Randomized Correspondence Algorithm for Structural Image Editing", Barnes et al. (2009), which is hereby incorporated by reference in its entirety. However, rather than performing the propagation in sequence on a CPU, the iterative nearest neighbor candidate improvement process in accordance with a number of embodiments uses a jump flooding process that leads to faster performance, different levels of algorithmic complexity and can allow propagation to be performed in parallel on a GPU.

An iterative nearest neighbor candidate improvement process in accordance with some embodiments follows the same searching and ordering strategies as the jump flooding process described above, where the surrounding pixels are checked in increments (e.g., powers of two) going from farther away to closer. The difference between the iterative process and the jump flooding process is that, rather than checking pixel values directly, processes in accordance with several embodiments of the invention can follow the current NNF pointer to some location in the exemplar and apply an inverse translation of the translation used to sample the surrounding pixels. In many embodiments, the resulting pixel can then be tested as a new potential nearest neighbor match.

The operation of an iterative nearest neighbor candidate improvement process in accordance with an embodiment of the invention is illustrated in FIG. 10. An iterative nearest neighbor candidate improvement process 1000 selects (1005) neighboring pixels to test for a nearest neighbor match using a jump flooding process. The nearest neighbors of the selected pixels are compared (1010) to the current nearest neighbor. The best candidate between the selected pixels and the current nearest neighbor is selected (1015) as the new current nearest neighbor. The process 1100 also selects (1020) random links in the exemplar object to test as nearest neighbor candidates. The selected random links are compared (1025) to the current nearest neighbor to determine a best fit, and the best fit is selected (1030) as the new nearest neighbor.

Figure 11:
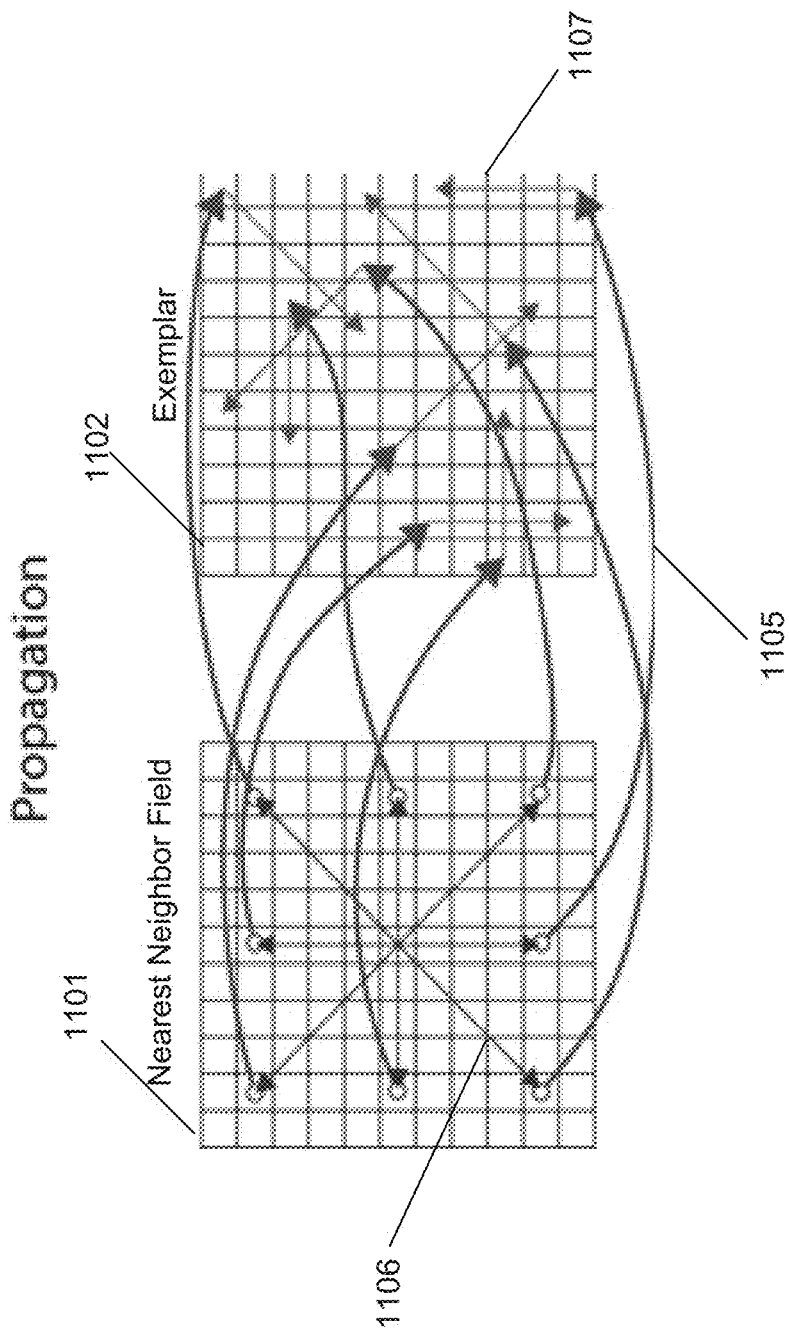
FIG. 11 is an illustration of the use of jump flooding to determine pixels to test in an iterative nearest neighbor candidate improvement process in accordance with an embodiment of the invention.

An illustration of selecting of the neighboring pixels to test using a jump flooding process in accordance with an embodiment of the invention is shown in FIG. 11. In FIG. 11, blue arrows 1106 point to the 8 surrounding pixels of a considered pixel. Red lines 1105 represent the nearest neighbor links into the exemplar from a nearest neighbor field 1101 to an exemplar 1102. Green lines 1107 are the inverse of the blue lines 1106. The principle for this process is based on the coherence principle that states if two pixels in an image have a similar appearance, the two pixels adjacent to the two similar pixels in any random direction will also have a similar appearance to each other.

Figure 12:
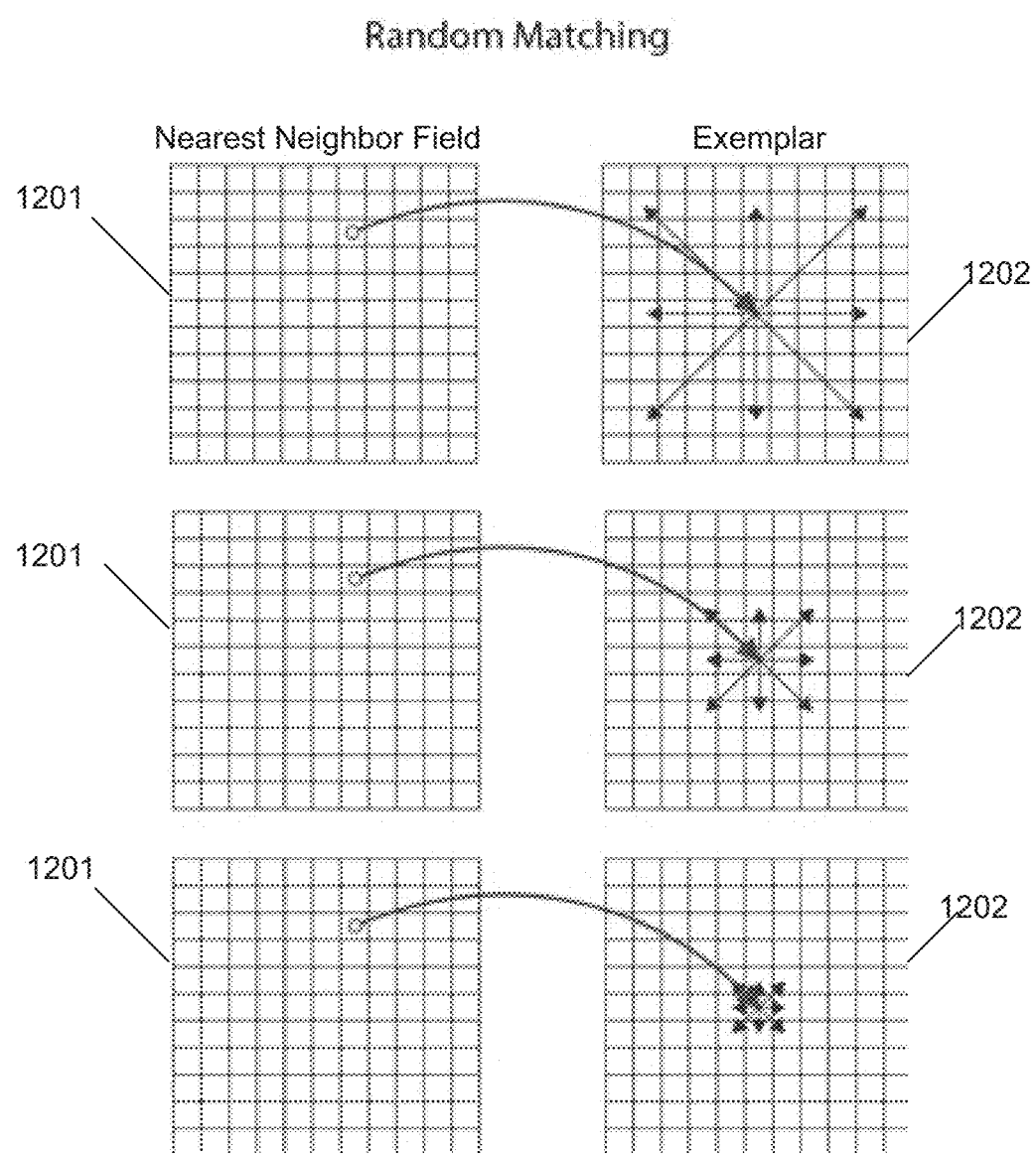
FIG. 12 is an illustration of the use of jump flooding to determine random new links in an exemplar object to test as a nearest neighbor candidate in an iterative nearest neighbor candidate improvement process in accordance with an embodiment of the invention.

In order to further increase a probability of finding acceptable matches, processes in accordance with some embodiments of the invention can optionally perform an iterative nearest neighbor candidate improvement process to check several random new links for each pixel. In accordance with some embodiments, the new links may be selected using a strategy similar to the jump flooding process. An illustration of determining random new links using a jump flooding process in accordance with an embodiment of the invention is show in FIG. 12. As illustrated in FIG. 12, a link for a pixel in the NNF 1201 into the exemplar 1202 is followed. A jump flooding process search strategy is used to determine a number of pixels (e.g., 8) surrounding the link in the exemplar some power of two distance away from the link. One or more of these potential candidates (8*log(n) candidates) can be selected to test against the current link as a new, potentially better nearest neighbor. Using this search strategy, the iterative nearest neighbor candidate improvement process can escape local minimums in the optimization process. While the probability of each individual pixel finding a new global minimum is very low, the probability of some pixel in the NNF finding a good match becomes reasonably high due to the great number of pixels. Upscaling steps in accordance with many embodiments of the invention then distributes these good matches to the rest of the NNF.

Although various embodiments of an iterative nearest neighbor candidate improvement process performed in ANNS processes in accordance with various embodiments of the invention are described above, any of a number of processes that involve adding removing, and/or combining steps of the iterative nearest neighbor candidate improvement process described above as appropriate to refinements of a specific application in accordance with other embodiments of the invention are possible.

The ANNS process 700 performs an upscale process (715) to propagate good matches at a coarse layer deeper in the pyramid to finer layers in the pyramid so that finer feature matches are guided by the coarser matches to give the finer feature matches the context that they currently lack. As is discussed in more detail below, each pixel in a coarser layer may be created by pooling a patch (e.g., a 2×2 patch) of pixels in a finer layer. Pooling in accordance with some embodiments of the invention is performed in any of a variety of ways, such as (but not limited to) through a pooling layer or through a strided convolution approach. Systems in accordance with some embodiments of the invention can "upscale" a coarse layer match to four finer descendants of the coarser ancestor pixel by performing a simple coordinate offset. It can be a problem that the upscaled pixel may not be optimal. However, one of the pixel's immediate neighbors may be optimal. Therefore, an upscale process in accordance with some embodiments may also check the 8 surrounding pixels to find a better match.

Figure 13:
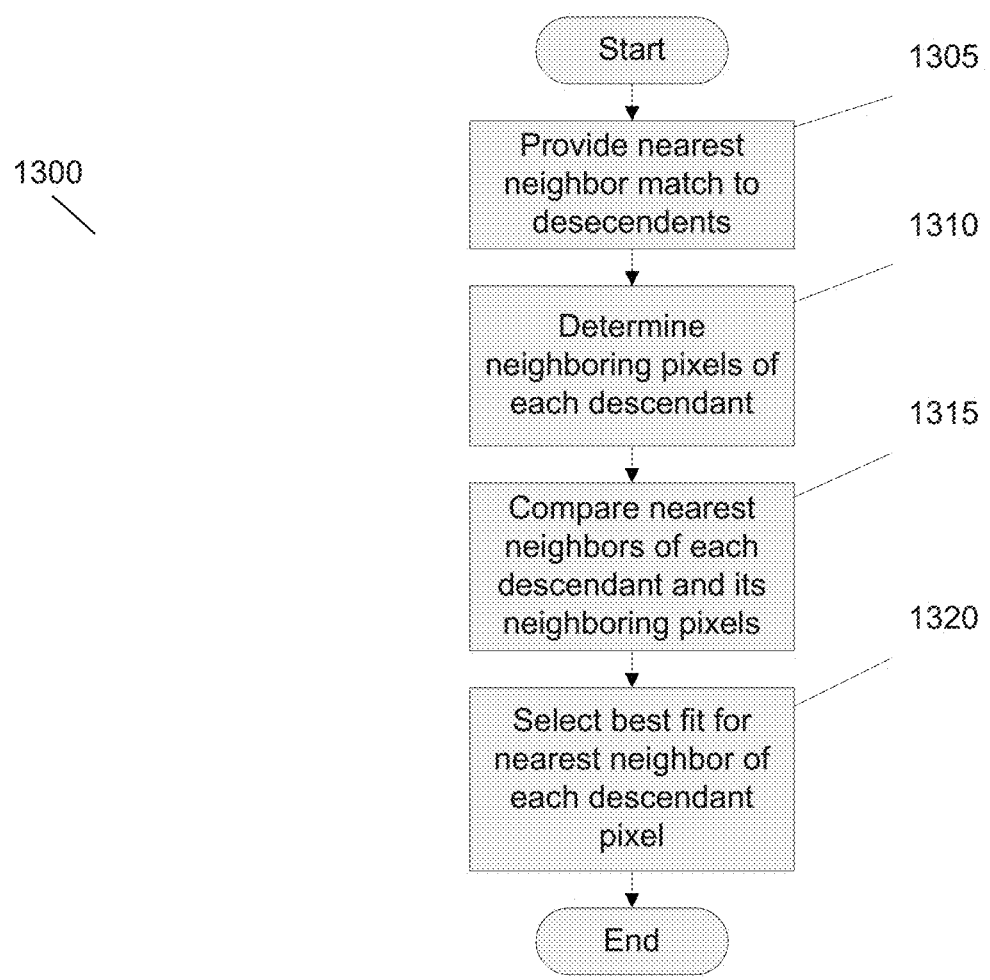
FIG. 13 is an illustration of a flow diagram of an upscaling process performed in an ANNS process in accordance with an embodiment of the invention
Figure 14:
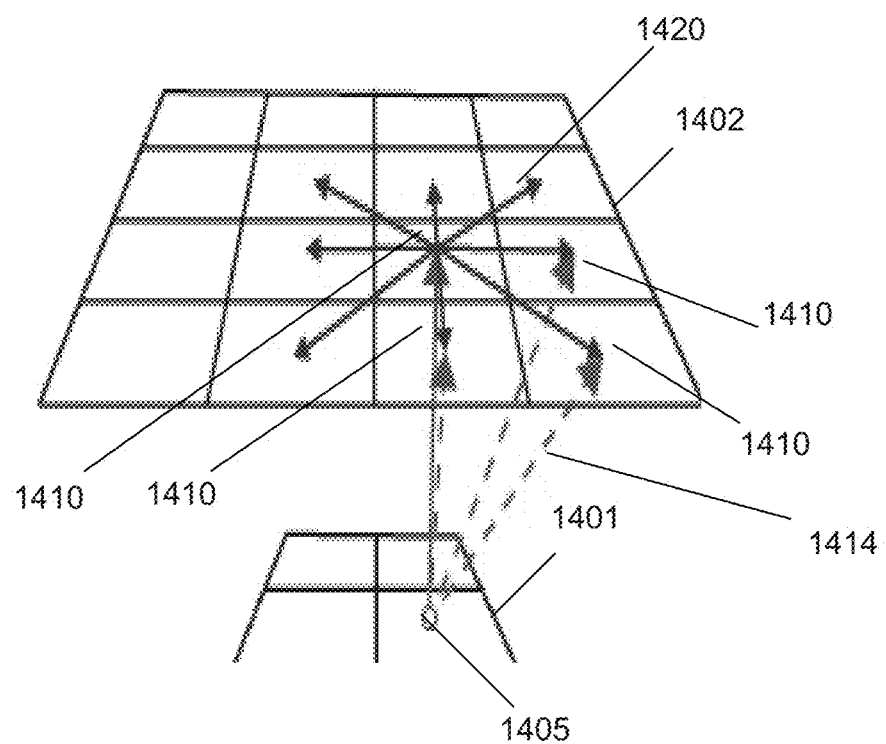
FIG. 14 is an illustration showing the operation of an upscale process in accordance with an embodiment of the invention.

Upscale processes in accordance with some embodiments of the invention can be considered to be utilizing the concept of coherence across scales. An upscale process performed by an ANNS process in accordance with an embodiment of this invention is shown in FIG. 13. The process 1300 includes providing (1305) a nearest neighbor match from a pixel in a course layer to each finer descendant pixel in a finer layer, determining (1310) neighboring pixels for each descendant pixel, comparing (1315) the nearest neighbor of each descendant pixel to the nearest neighbor of each neighbor pixel, and selecting (1320) a best fit for the nearest neighbor from the best fit. A conceptual diagram of the operation of an upscale process in accordance with an embodiment of the invention is shown in FIG. 14. In FIG. 14, red arrows 1414 point from a pixel 1405 in a coarse network layer 1401 to descendant pixels 1410 in a finer network layer 1402 and blue arrows 1420 show the comparison against the 8 surrounding candidates in order to check for a more optimal match.

Although various embodiments of upscaling processes performed in ANNS processes in accordance with various embodiments of the invention are described above, any of a number of processes that involve adding removing, and/or combining steps of the upscaling process described above as appropriate to refinements of a specific application in accordance with other embodiments of the application are possible.

Referring back to FIG. 7, the ANNS process 700 performs the above described processes in the following manner. The ANNS process 700 begins by performing (705) a bootstrapping process at the finest level. Given n being the minimum of the height and width of the network layer, the ANNS process can loop (710) through log(n) passes going from p=log(n) to 0, where each pass includes a random window search followed by a propagation iteration with $2^p$ distance between surrounding pixels. After all log(n) passes are finished from the current layer, either the same loop is performed through the next layer if the next layer is the same resolution as the current layer or an upscaling process is performed (715) if the next most shallow convolution layer has higher resolution than the current layer. At the final layer, another loop over random window search and propagation process can be performed in order to finish the ANNS process.

While this ANNS process is described as searching most similar feature vectors within a convolutional neural network architecture, one skilled in the art will recognize that ANNS in accordance with many embodiments of the invention can be performed in conjunction with many different architectures such as (but not limited to) a Gaussian Pyramid and other image pyramid (or stack).

Although an ANNS process for convolutional neural network based texture synthesis in accordance with an embodiment of the invention is discussed above, any of a number of processes that involve adding removing, and/or combining steps of the ANNS process described above as appropriate to refinements of a specific application in accordance with other embodiments of the application are possible.

Unique Feature Detection

Figure 15:
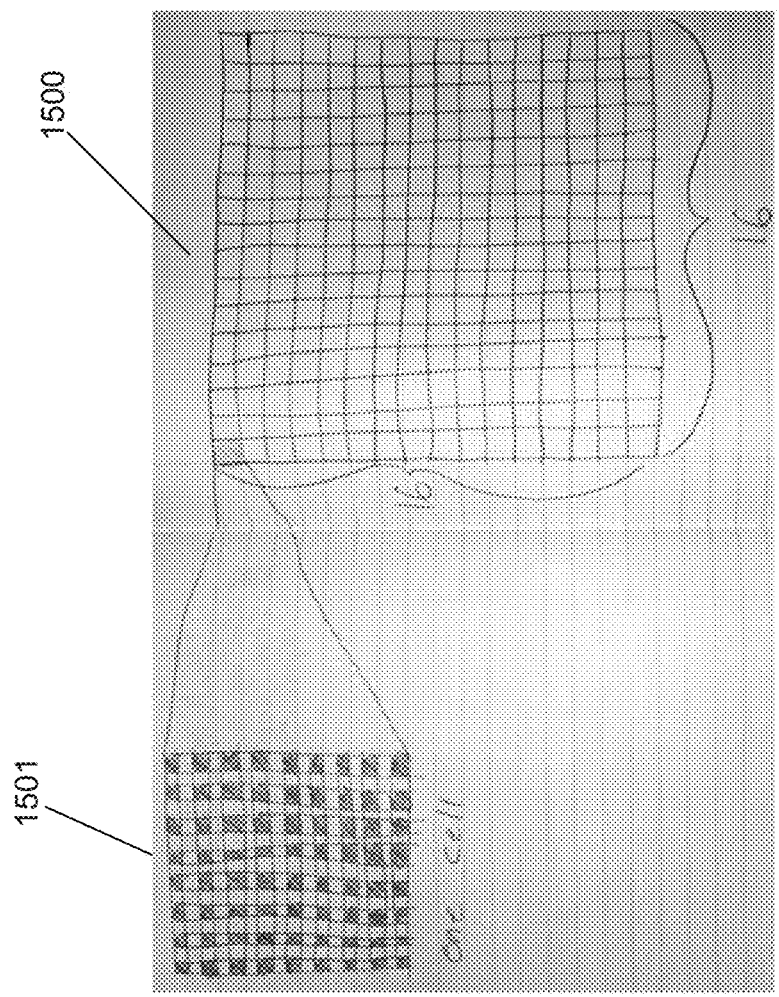
FIG. 15 is an illustration a cell neighborhood sampling map generated by a filter process in accordance with an embodiment of the invention.

Unique feature detection processes in accordance with some embodiments of the invention were inspired by an approximate nearest neighbor search (ANNS). In an ANNS, the goal is to find a single "most similar" match for each pixel in the image (or K most similar matches). In unique feature detection, the goal is to get a score showing how similar a feature is, on average, to the rest of the image as a whole. More specifically, processes in accordance with many embodiments of the invention determine the similarity for regions of the image (which can also be referred to as "cells") relative to the rest of the image. To do so, processes in accordance with several embodiments of the invention divide the image into a grid of cells. In some embodiments, the image is divided into a grid of 16×16 cells because it can be desirable to find links that are 5% of the image away from each other, which requires a 20×20 grid. However, 20 is not a power of two and would not be optimal for synthesis processes (since the majority of real world inputs are in powers of two). Therefore, 16×16 is used in many embodiments of the invention, as 6.25% distance is effectively the same as 5% and a power of two number of cells is more convenient for synthesis. An example of the 16×16 unique feature grid is shown in FIG. 15.

In accordance with some embodiments, unique feature maps are generated in the following manner. Dimensionality reduction is performed on an input image as discussed above. For each cell of an input image, a neighborhood of pixels spans the region of the cell. This neighborhood sampling is shown in the FIG. 15. In FIG. 15, the 16×16 cell grid 1501 and the magnified top left cell 1500 are shown. In many embodiments, dimensionality reduction is performed on the image as a first step. In dimensionality reduction, each particular pixel can be a high dimensional vector that represents the information stored in a 5×5 patch (or similarly sized patch) around the particular pixel. Therefore, it is not necessary to include every pixel in a neighborhood because the pixels are an information dense representation. Instead, a neighborhood contains every other pixel in each dimension (so ¼th of the total pixels). This sampling of dark pixels shown in the FIG. 15 is the "target neighborhood" that represents the feature contained in this cell.

Figure 30:
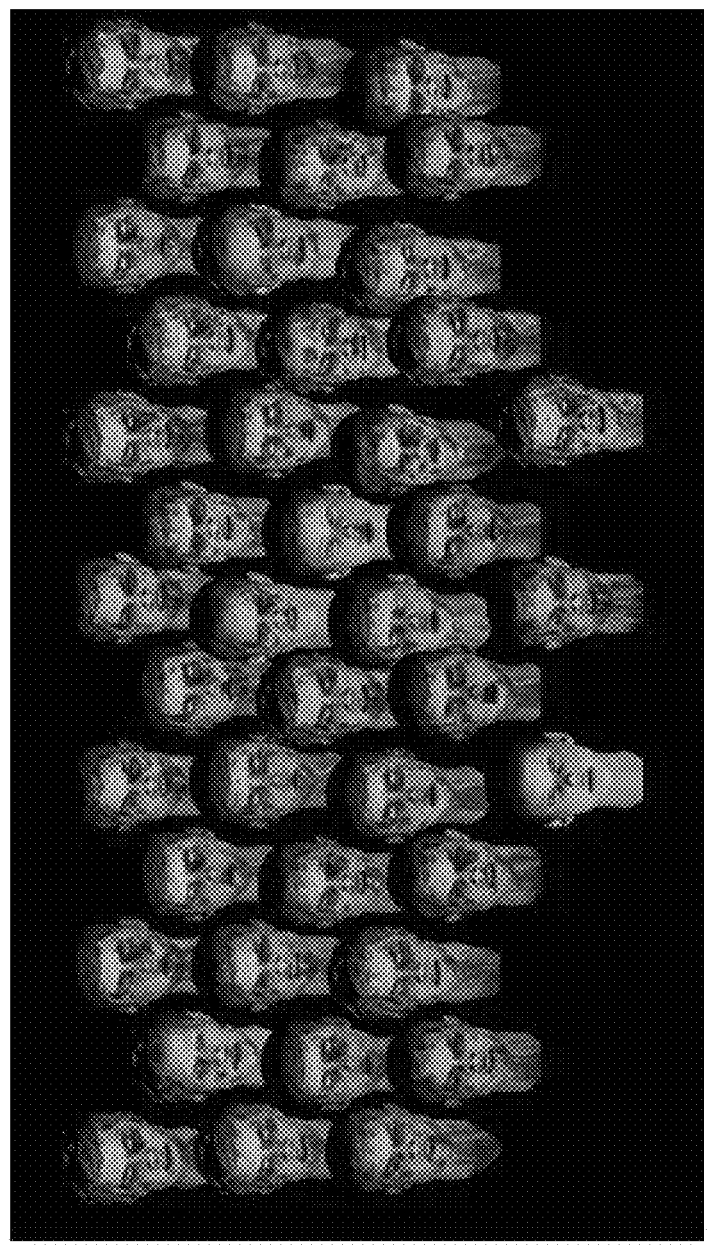
FIG. 30 is an illustration of an image of various zombie heads generated from the same mesh using a filter process in accordance with an embodiment of the invention.

In order to quantify how unique a target cell ("t") is compared to the other cells in the image (all "n" cells in the set "N", which is every cell in the 16×16 grid), processes in accordance with several embodiments of the invention can perform a nearest neighbor test with every other cell in the image, or with a subset of the cells in the image. When finding the similarity between two cells, processes in accordance with some embodiments of the invention use one sampling for cell t as shown in FIG. 30 and compare the sample with every possible translation within cell n. Neighborhood sampling in accordance a number of embodiments of the invention includes pixels from other cells. Once a full nearest neighbor search between cells t and n has been performed, processes in accordance with many embodiments of the invention calculate a Euclidean distance between the best matching neighborhoods. In certain embodiments, an ANNS can then be performed for each cell n in N, giving a closest feature distance between cell t and every other cell in the image. A test between cell t and itself will return 0.

In several embodiments, the average of the 16*16−1 best distances is determined as the uniqueness rating of cell t as compared to the rest of the image. Cells that have a high average distance to their best matches in all other cells are considered to be very unique. Because different materials have varying overall degrees of uniqueness, once a score is computed for every cell, the scores for the resulting image can be normalized between 0 and 1.

Figure 41:
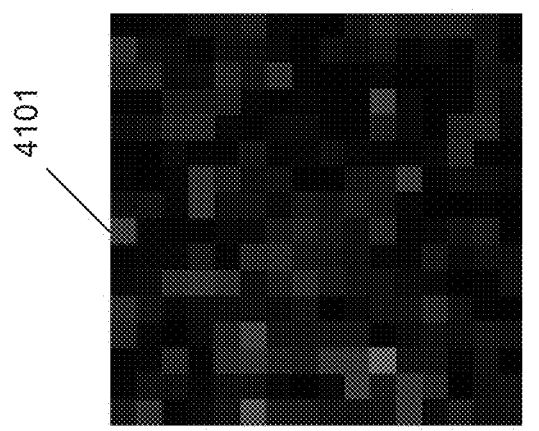
FIG. 41 is an illustration of a unique feature map generated by a filter process in accordance with an embodiment of the invention.

To account for noise that can arise during such processes, processes in accordance with some embodiments of the invention can take the square root of the uniqueness rating for each cell to de-emphasize homogeneous cells in the map. An example of a unique feature map 4101 generated by a filter process in accordance with an embodiment of the invention is illustrated in FIG. 41. Although, the above unique feature detection process is described with particular cell sizes and particular distance measures, any of a number of processes may use different cell sizes and distance steps as appropriate to refinements of a specific application in accordance with other embodiments of the application.

Synthesis

Figure 16:
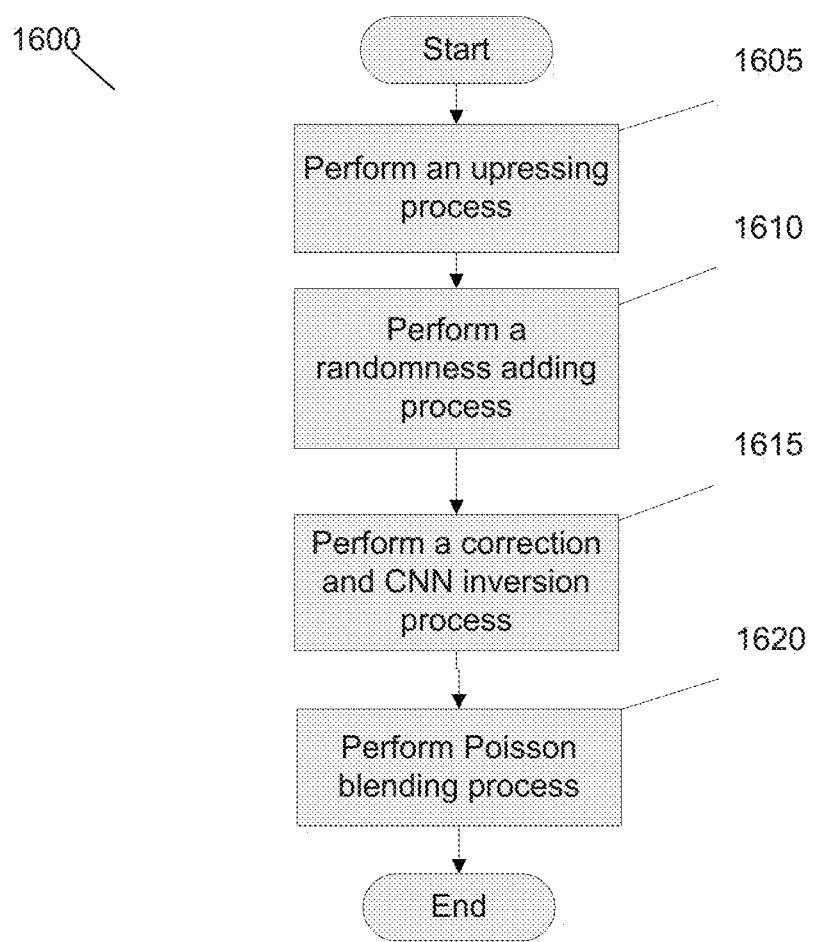
FIG. 16 is an illustration of a flow diagram of a synthesis portion of a texture synthesis process in accordance with an embodiment of the invention.

In many embodiments, the synthesizing portion of a texture synthesis process uses the analysis data generated and relationships determined in the analyzing portion of the texture synthesis process to generate a new image that includes similar features to those of an input exemplar set. A flow diagram of processes performed in a synthesis portion of a texture synthesis process in accordance with an embodiment of the invention is shown in FIG. 16. A synthesis portion 1600 of a texture synthesis process includes performing (1605) an up-ressing process, performing (1610) a randomness adding process, performing (1615) a correction and a CNN inversion process, and/or performing (1620) a Poisson blending process. In accordance with various embodiments of the invention, one or more the processes of the synthesis portion discussed in detail below may be used to improve a texture synthesis process.

Generating an Image Pyramid

Figure 17:
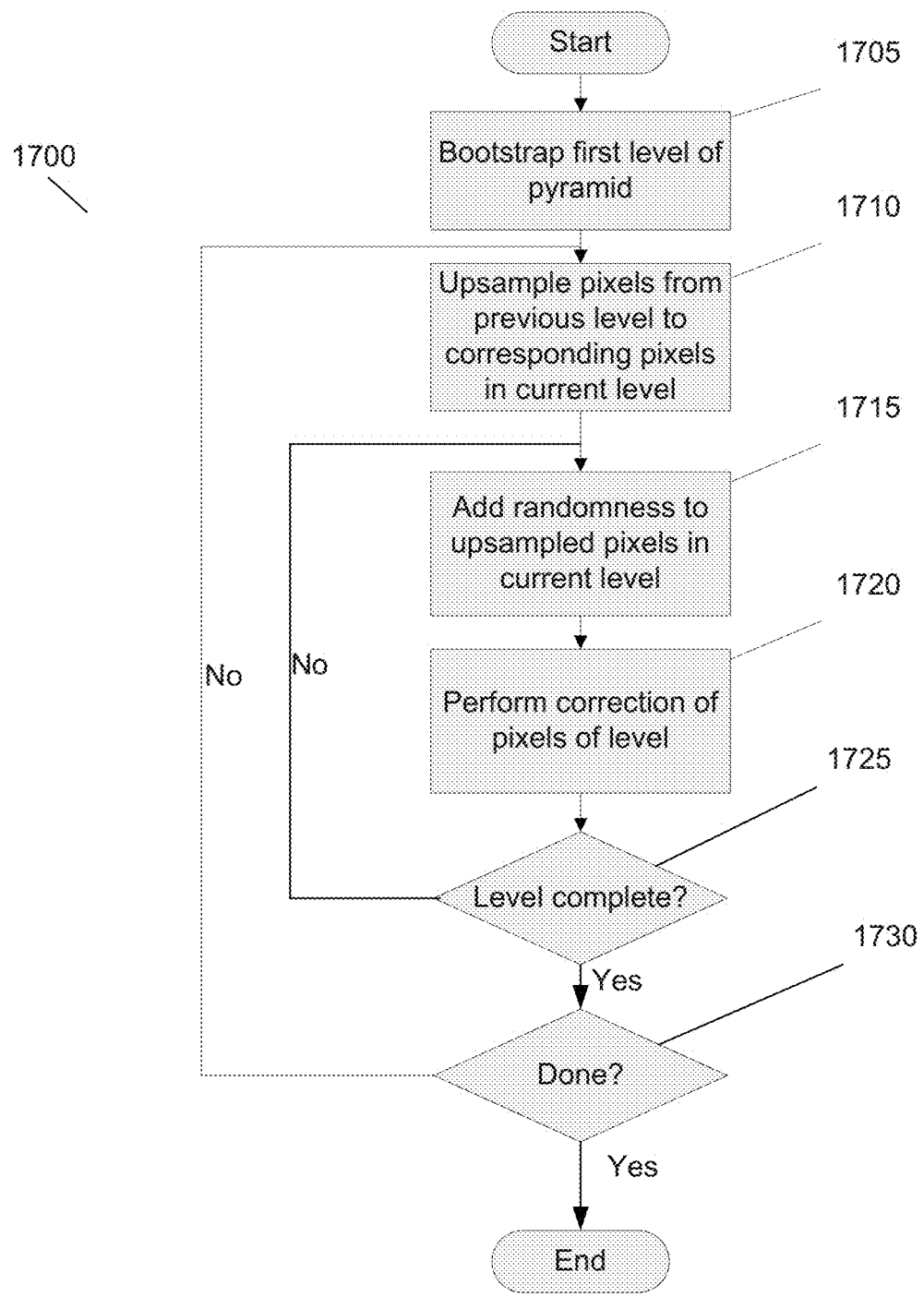
FIG. 17 is an illustration of a flow diagram of a process for generating an image pyramid in accordance with an embodiment of the invention.

In accordance with some embodiments of the invention, a texture synthesis process generates an image pyramid or a set of image pyramids that reproduce the appearance and shape of an exemplar object. A process for generating an image pyramid in accordance with an embodiment of the invention is shown in FIG. 17. A process 1700 bootstraps (1705) the pixel of the image at a first level. The process 1700 iteratively moves up the pyramid synthesizing each new level based upon the previous level. Each iteration of process 1700 to create each level in the pyramid involves three steps: upscaling pixels (1710) in the current level from the previous level of the pyramid, adding (1715) randomness to pixels in the current level, and correcting (1720) the pixels.

In each iteration, upscaling of the pixels of the current level of the pyramid from a previous level can generate the values by sampling the values from the previous level in accordance with some embodiments. Adding randomness in accordance with many embodiments of the invention can mutate or morph the pixels of the current level into something new. Correcting the mutated pixels in accordance with several embodiments of the invention can convolve the synthesized output image to more closely reflect the input image. In accordance with many embodiments, adding randomness and correction are repeated (1725) until the level is completed. The repeated steps of adding randomness and correction allows for a "tug-of-war" between the steps, where the addition of randomness pushes the feature statistics of the synthesis objects away from those of the exemplar object, while the correcting stage pulls the newly mutated synthesis object back towards matching the exemplar object (locally). The iterations are repeated (1730) until all of the levels of the pyramid(s) are synthesized.

Although a process for synthesizing a synthesis pyramid for texture synthesis of arbitrary shape and/or material data in accordance with an embodiment of the invention is discussed above, any of a number of processes that involve adding removing, and/or combining steps of the process described above as appropriate to refinements of a specific application in accordance with other embodiments of the invention are possible.

Upsampling

Figure 18:
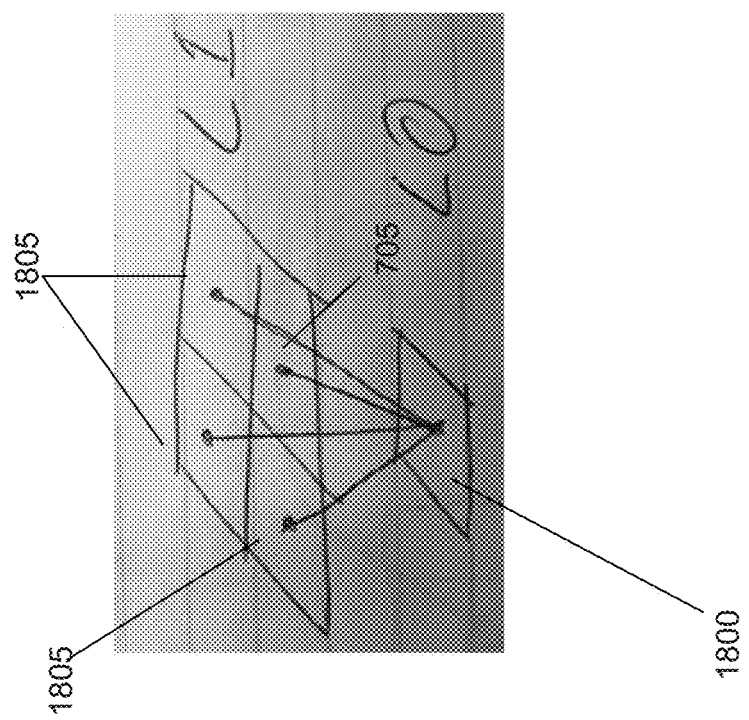
FIG. 18 is an illustration of upsampling a pixel in a lower level of an image stack into four pixels in a higher resolution level of the image stack in a filter process in accordance with an embodiment of the invention.

In accordance with some embodiments, the upsampling process performed (1710) is the standard practice of using one pixel at the previously synthesized pyramid level into four pixels (2×2) in order to bootstrap the next pyramid level. An example of upscaling is shown in FIG. 18. In FIG. 18, pixel 1800 in level 0 is synthesized into 4 pixels 1805 in level 1. In accordance with many embodiments, every pixel being synthesized keeps a link to its nearest neighbor in the exemplar in order to take advantage of a pre-computed nearest neighbor list in subsequent processing steps. When constructing an image hybrid stack from the exemplar object, each pixel at a coarser level (L0) is defined by averaging a number of pixels from the next finer level (L1).

Figure 19:
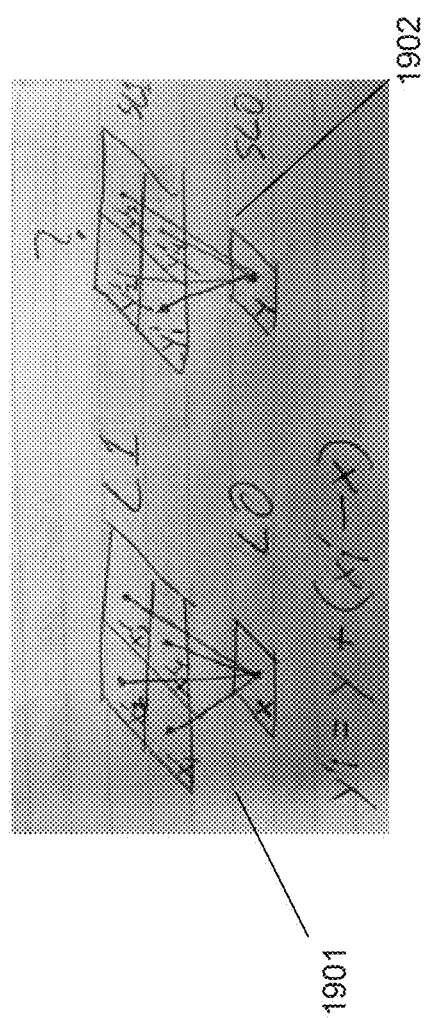
FIG. 19 is an illustration of nearest neighbor links between related pixels in lower resolution level and a higher resolution level of an image stack in a filter process in accordance with an embodiment of the invention.

In accordance with many embodiments, the upscaling process for the synthesis object is the reverse of the downscaling process during hybrid stack creation. In upscaling, one "averaged" pixel from the coarser level is deaveraged into the four contributing pixels. An upsampling process in accordance with many embodiments of the invention is similar to other upsampling processes with a key difference. Some other upsampling processes only synthesize a pointer map where final texture colors are just sampled from the exemplar object at the coordinates stored in the pointer map as is explained in "Parallel Controllable Texture synthesis", Lefebvre and Hoppe, (2005), which is hereby incorporated by reference in its entirety. In accordance with some embodiments of the invention, arbitrary pixel values are synthesized that better mimic an exemplar patch. In many embodiments, the improvement may be provided by mimicking local gradients around a pixel. The mimicking of local gradients can be especially useful for synthesizing displacement maps where extreme gradients between adjacent pixels may appear as artifacts. An example of levels of an exemplar image pyramid and levels of an image pyramid in accordance with an embodiment of the invention is shown in FIG. 19. As shown in the FIG. 19, the synthesized pixel y from the previous level SL0 (1902) has a link to a nearest neighbor x in the corresponding exemplar level L0 (1901). For example, if the value for x is known, in the next level L1 x'1-4 can be sampled. If it is desired to find values for y'1-4, which mimic the same change in local gradients as x'1-4, the difference between level colors from the exemplar set is added into the synthesis pixel in order to get a new estimate.

Although a process for upsampling in convolutional neural network based texture synthesis process in accordance with an embodiment of the invention is discussed above, the process may be modified, by adding, removing, and/or combining steps of the process in accordance with other embodiments of the inventions to meet system and/or application requirements.

Adding Randomness

Many texture synthesis strategies bootstrap the output of the synthesis with noise and attempt to iteratively replace individual pixel values with new values that contribute to a small local neighborhood around the individual pixel in the synthesized output to better match a corresponding small local neighborhood from the input (using some image feature descriptor, usually a 5×5 or 7×7 L2 distance between patches of pixels that may be, but are not limited to, an unmodified CNN feature vector or CNN feature vectors projected onto a new basis). The randomness adding process performed (1715) during texture synthesis in accordance with many embodiments of the invention may use a different approach where a variable amount of fresh randomness is injected during synthesis of each pyramid level. The fresh level dependent randomness gives the user control over the amount of mutation that will occur between large, medium and/or small features in the synthesis object. In accordance with some techniques, this may be termed "structure-preserving jitter". In structure-preserving jitter, randomness is introduced without breaking the fundamental structure of the image feature being mutated.

There are other many ways of introducing randomness into a synthesizing object. Some other processes for adding randomness in accordance with various embodiments of the invention include, but are not limited to, adding random noise to color values in an image. However, the above mentioned process adds randomness that is orthogonal to the structure of image features in the exemplar set. Thus, the randomness added may break recognizable features. To reduce the probability of the breaking of features, systems in accordance with many embodiments introduce the concept of injecting randomness in "feature space". For purposes of this discussion, "feature space" is the space that an object is transformed into once the object has been filtered through a CNN to produce feature vectors. As such, feature vectors are single points in "feature space".

In accordance with various embodiments of the invention, "structure-preserving jitter" processes for adding randomness are used; whereby adding randomness in feature space may be performed. Randomness adding processes in accordance with many embodiments of the invention are performed for each data point being synthesized whereby a set of nearest neighbors may be collected from the input exemplar based on L1 distance in feature space. The set of neighbors in accordance with some embodiments of the invention can cover an even spread of L1 values up to a user defined jitter amount. In several embodiments, for each pixel, a random neighbor is chosen from the set of nearest neighbors of a pixel and the feature vector of the nearest neighbor replaces the current feature vector of the pixel.

Processes in accordance with many embodiments of the invention implement novel GPU accelerated processes whereby, for each pixel location for some synthesis object scale level, the link indexing a location in the exemplar object is updated to a new location where the exemplar feature vector is less similar to the synthesis feature vector by some semi-random amount. In some embodiments, processes sample a 3×3 neighborhood around the synthesis location of interest and gathers the nine exemplar links, applying the inverse transform of the 3×3 sampling pattern on the exemplar links. Of these nine exemplar samples, two pre-computed nearest neighbor candidates can be added for each location, summing the total number of candidates to 27. One skilled in the art will recognize that different numbers of nearest neighbor candidates can be added in accordance with different embodiments of the invention. The structure-preserving jitter process in accordance with certain embodiments of the invention computes a feature vector distance between the current synthesis feature vector and the 27 candidates, storing the list of 27 errors and corresponding locations. A jitter range in accordance with some embodiments of the invention can be defined as the maximum error in the list minus the current exemplar links error, where all links that have a lower error are ignored. In certain embodiments, the user can define a "jitter" value between 0 and 1 for each pixel where 0 is the current link and 1 is the maximum error. All links above the jitter value are ignored. In a number of embodiments, a random number generator (encoded in a texture) can be used to select a new random value (e.g., 0-1) that determines which of the links within the remaining range is selected.

Although processes for adding randomness for texture synthesis of arbitrary shape and/or material data in accordance with an embodiment of the invention are discussed above, any of a number of processes that involve adding removing, and/or combining steps of the process described above as appropriate to refinements of a specific application in accordance with other embodiments of the invention are possible.

Correction

The correction process performed (1720) during texture synthesis in accordance with many embodiments of the invention allows for the correction of the added randomness in order to bring the newly mutated synthesis object back towards matching the exemplar object. In many embodiments, correction is a straightforward combination of coherence-based correction augmented with pre-computed nearest neighbor candidates for acceleration. This correction process is an improvement to the processes described in "Parallel Controllable Texture synthesis", Lefebvre & Hoppe (2005) and "Texture Optimization for Example-based Synthesis", Kwatra et al. (2005), the disclosures of which are hereby incorporated by reference in their entirety.

In accordance with a number of embodiments of the invention, the correction process may be performed over several passes that can be thought of as "convolutions". Convolutions in accordance with many embodiments of the invention can globally minimize the collective local patch distances from the output synthesis object to the input exemplar object.

Furthermore, correction processes may include "sub-passes" in accordance with several embodiments. For the use of "sub-passes", an image can be divided up into subsets of pixels. Each pixel in a subset of pixels is updated in parallel during a sub-pass, and then the pixels in a next subset of pixels are updated in the next sub-pass. Early correction processes used sequential scan-line synthesis ordering which produced "banding" in the patch formation. A number of alternative ordering strategies have been proposed over the years that produce better results than scan-line. However, improved results have been achieved using a completely random ordering. It is a problem that random ordering requires sequential processing, which is incompatible with the massively parallel architecture of GPUs.

Figure 20:
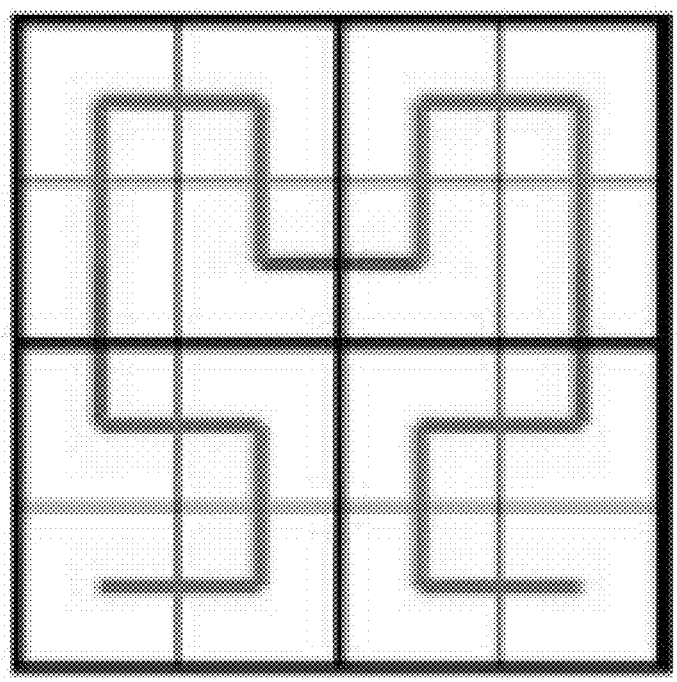
FIG. 20 is an illustration of a Hilbert curve followed for processing pixels in a filter process in accordance with an embodiment of the invention.

To solve this problem, correction processes in accordance with several embodiments of the invention may use a "Hilbert Curve" ordering of the passes and/or sub-passes instead of random ordering. An example of a "Hilbert Curve" is shown in FIG. 20. Because the sub-passes need to run in parallel on the GPU, a Hilbert Curve that repeats in both dimensions across the image is used, and "sub-passes" where all the pixels in a sub-pass exist at the same point along the modulating Hilbert Curve are provided.

Correction processes in accordance with many embodiments of the invention are not straight-forward because GPU processors are very basic relative to a CPU and do not have their own dedicated dynamic branching unit. In fact, a contemporary Nvidia graphics card shares one dynamic branching unit per 32 shader cores. This means that if any two pixels of a coherent 32-pixel group make different branching decisions, then every pixel in the group must run all the code for both branches. Effectively, this means that a naive implementation of a sub-pass that samples every fourth pixel will not be able to "exit early" on the non-sub-pass pixels because the pixels will all belong to the same dynamic branching unit, so each sub-pass will take as long to compute as a full pass, even though the sub-pass is doing $\frac{1}{16}$th the work. It is further noted that while a GPU program is running, fast & thread safe memory can typically only be tagged as readable or writeable, not both. Thus, in order to overwrite a buffer that is being read from, two stages (GPU programs) are needed. In the first stage, the process reads from a full synthesis buffer and writes into a secondary buffer. In the second stage (second GPU program), the read/write roles are reversed and the results from the first stage are copied back from the secondary buffer into the full synthesis buffer. This two-stage approach is known as "ping-pong buffers" and is common practice for GPUs.

It is standard practice for both ping-pong buffers to be the same size. The secondary buffer "repacks" the generated coordinates into a sub-pass region in the full sized image after each sub-pass. The use of two same-size buffers is triply inefficient as (1) it requires a second buffer to be the full size of the image even though the majority of the memory is constantly being ignored; (2) it is also slower to process as it requires extra math to index into and out of the quadrant representation and regions of unwanted quadrants will inevitably fall into the same branching unit as a wanted region, resulting in unnecessary pixels being synthesized just to be discarded; and (3) it is inefficient from a development and maintenance perspective as this quadrant packing approach adds an extra layer of complication over the whole system which inevitably results in more bugs.

Figure 21:
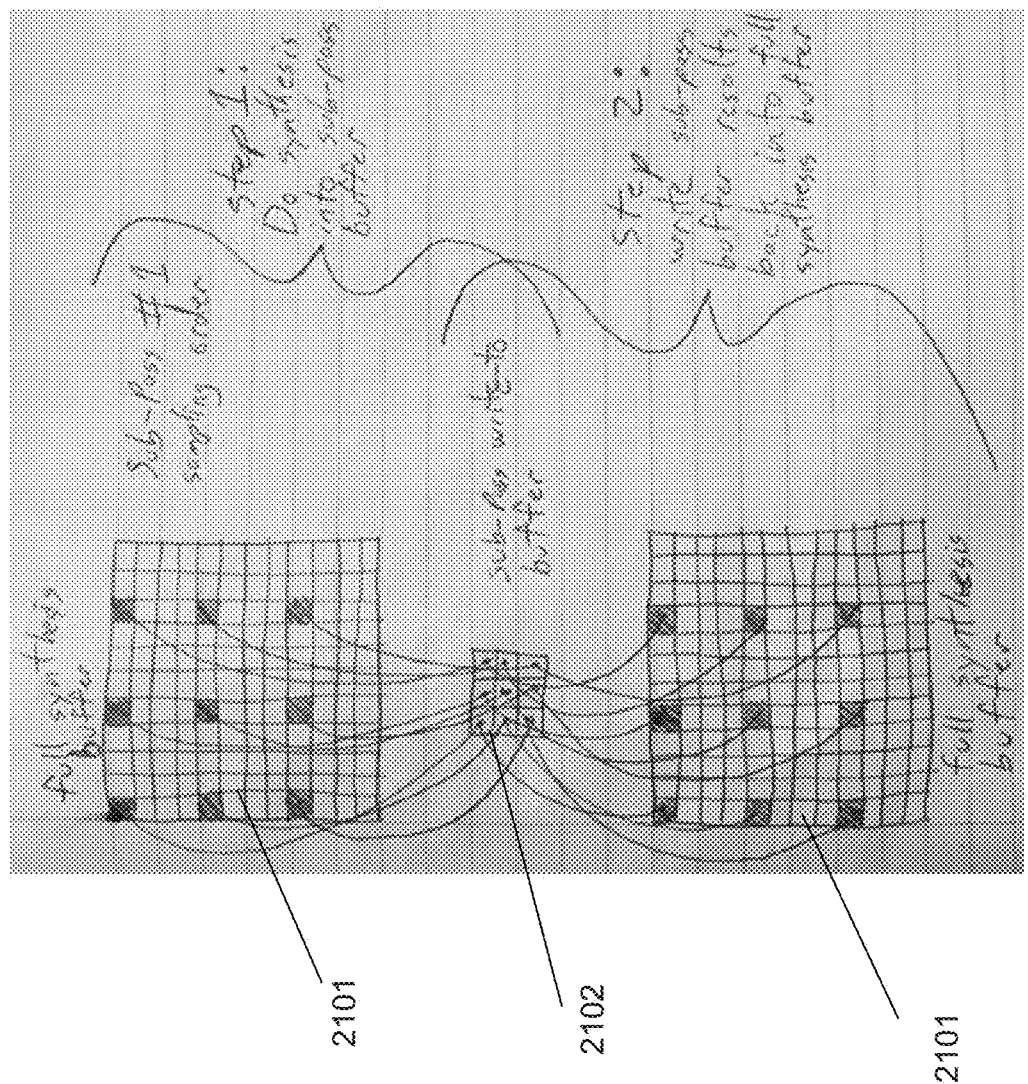
FIG. 21 is an illustration of a full buffer and a sub-pass write-to buffer for use in a filter process in accordance with an embodiment of the invention.

In order to be faster, to use less memory, and to be easier to maintain, different sized buffers are used in accordance with some embodiments of the invention. In accordance with many of these embodiments, a first buffer can be a full size buffer for storing information for the full image being synthesized, and the second buffer is the size of a sub-pass. In some embodiments, all sub-passes can re-use the same buffer. An illustration of the two different sized buffers in accordance with an embodiment of the invention is shown in FIG. 21. In FIG. 21, each pixel in the sub-pass buffer 2102 is read from locations four pixels apart in the full synthesis buffer 2101. This allows the process to multiply the sub-pass pixel location by four and add an offset depending on which sub-pass is being performed.

Figure 22:
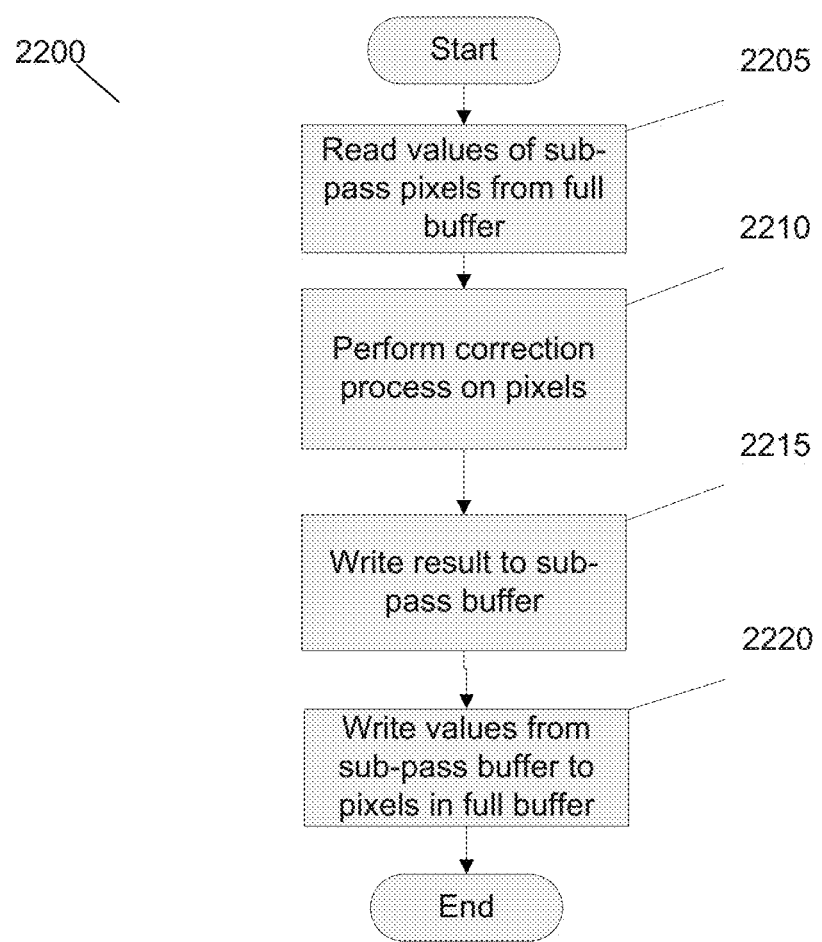
FIG. 22 is an illustration of a flow diagram of a process for using a full buffer and sub-pass buffer in accordance with an embodiment of the invention.

A flow diagram of a process for using the different sized buffers in accordance with an embodiment of the invention is shown in FIG. 22. A process 2200 for using (2205) the buffers includes reading the values of pixels of a sub-pass from the full buffer, performing (2210) the correction process on each of the read pixels, writing (2215) the results of the correction process of each pixel in the sub-pass group into the sub-pass buffer and writing (2220) the values of the pixels in the sub-pass buffer over the values of the pixels in the full buffer with no additional processing. In accordance with some embodiments, the writing of the values of the pixels of the sub-pass to the full buffer may include dividing each pixel location by four and doing a texture read. This is such a cheap operation that the inability to efficiently early exit is trivial.

In several embodiments, processes can update an exemplar link for each synthesis object location with a new, more similar match. Such processes in accordance with many embodiments of the invention utilize a jump flooding style process to search for better exemplar matches and follow the synthesis locations exemplar link into the exemplar. In a number of embodiments, processes check the pixels surrounding the link in the exemplar some power of two distance away from the link. In a number of embodiments, processes can run for some log(n) iterations where n can be the minimum width or height of the exemplar object. The sampling distance in accordance with many embodiments of the invention is 2^(log(n)−iteration), where iteration is a variable that increments from 1 to log(n). During each iteration, if one of the surrounding pixel candidates has a more similar feature vector to the synthesis feature vector, the exemplar link is updated. In this manner, search processes in accordance with a number of embodiments of the invention are able to perform a gradient descent type process to help the exemplar link find its local minimum.

In several embodiments, processes can then follow a strategy similar to the structure-preserving jitter process where the nearest neighbor candidates for a sampling pattern (e.g., 27 candidates for 3×3 sampling pattern) are sampled and then the exemplar link is updated to the candidate with the lowest feature distance to the synthesis feature vector. In this manner, the process is able to search for new global minimums.

Correction processes in accordance with various embodiments of the invention are described above. However, any of a number of processes that involve adding removing, and/or combining steps of the process described above as appropriate to refinements of a specific application in accordance with other embodiments of the invention are possible.

Adaptive Correction

In accordance with some embodiments of the invention, an adaptive correction that improves the speed of texture synthesis running in a parallel manner on GPUs is performed. To understand the improvement of such adaptive correction processes, the problems with conventional correction processes need to be understood. One problem in conventional correction processes is that the generation of a new image by texture synthesis involves all the pixels in an image going through several iterations of an optimization process known as "correction" where a single correction pass can change any pixel in the image so that all the pixels more closely resemble the input image statistically. This is the key idea in texture optimization, where an expectation maximization algorithm globally reduces the sum of individual patch distances between every pixel in the output with its nearest patch in the input. It is observed that this type of algorithm has a number of problems. First, the algorithm is subject to the law of diminishing returns where the first few iterations drastically improve the global fitness metric and subsequent iterations have relatively little impact compared to the first few. Second, correction passes do not improve patch distances evenly across the entire image. Instead, large coherent regions in the output often become optimal in the first few iterations and no longer improve in subsequent iterations. These results can be observed because texture synthesis tends to form coherent patches that are directly copied from the input or have only a slight modification. These coherent patches leave the border regions around the patches that are able to continue improving through the later correction iterations. These border regions are also typically where visual artifacts exist. As such, it can be beneficial to perform the later correction passes on these regions to fix broken features. In summary, even though correction yields diminishing returns, a minimum number of passes (for example, ten passes) should be performed to fix the few problematic areas. This is inefficient as many pixels in an image converge to an optimal value early in the process, and only a small set of pixels continue optimizing through the later correction passes leading to an overall wasteful process as most pixels are finished correcting but still require long wait times.

There are two aspects to this problem: (1) correctly identifying which pixels have reached their final state and will no longer continue to improve; and (2) the correction process runs on a Graphics Processing Unit (GPU) that is an inherently parallel computer with basic processing cores that have limited flexibility for "early opt out".

In order to overcome the above identified problems, an adaptive correction process that identifies which pixels need to continue optimizing and is capable of executing on one or more GPUs efficiently is performed in accordance with some embodiments of the invention.

Figure 23:
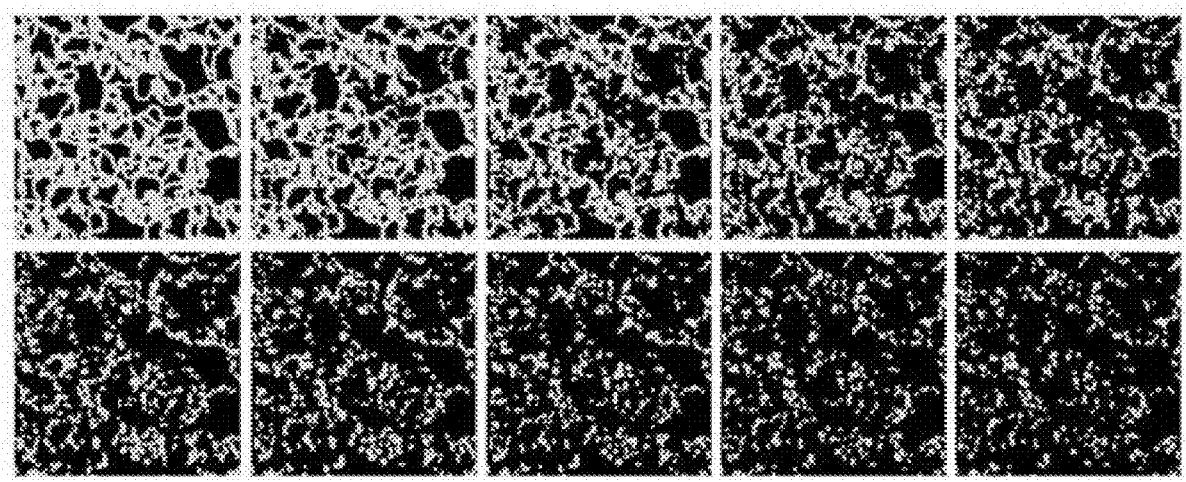
FIG. 23 is an illustration of a visualization of fully optimized pixels over 10 correction passes using a filtering process in accordance with an embodiment of the invention.

An adaptive correction process in accordance with some of these embodiments of the invention identifies which pixels are fully optimized. The process in accordance with many of these embodiments maintains two buffers that are the same size as the current synthesis level. The two buffers contain a distance value for each pixel in the output to a most similar patch in the input. One buffer may store the previous iterations distance map (initialized to float.Max for the first iteration) and the other buffer may store the distance map resulting from the current iteration. FIG. 23 illustrates various optimization masks generated from information in the buffers where the earliest passes are on the top left and the later passes are on the bottom right. An optimization mask is computed using these two errors where a black pixel (i.e., one that is fully optimized) is chosen if the current iterations distance value is equal to 0 (e.g., the 5×5 patch of pixels around the pixel of interest is identical to a 5×5 patch in the input), or the difference in patch distance between the previous iteration and the current iteration is 0 (e.g., none of the 25 pixels in the 5×5 patch have changed between iterations). Otherwise, the pixel is considered non-optimal, illustrated in yellow in the example of FIG. 23.

Figure 24:
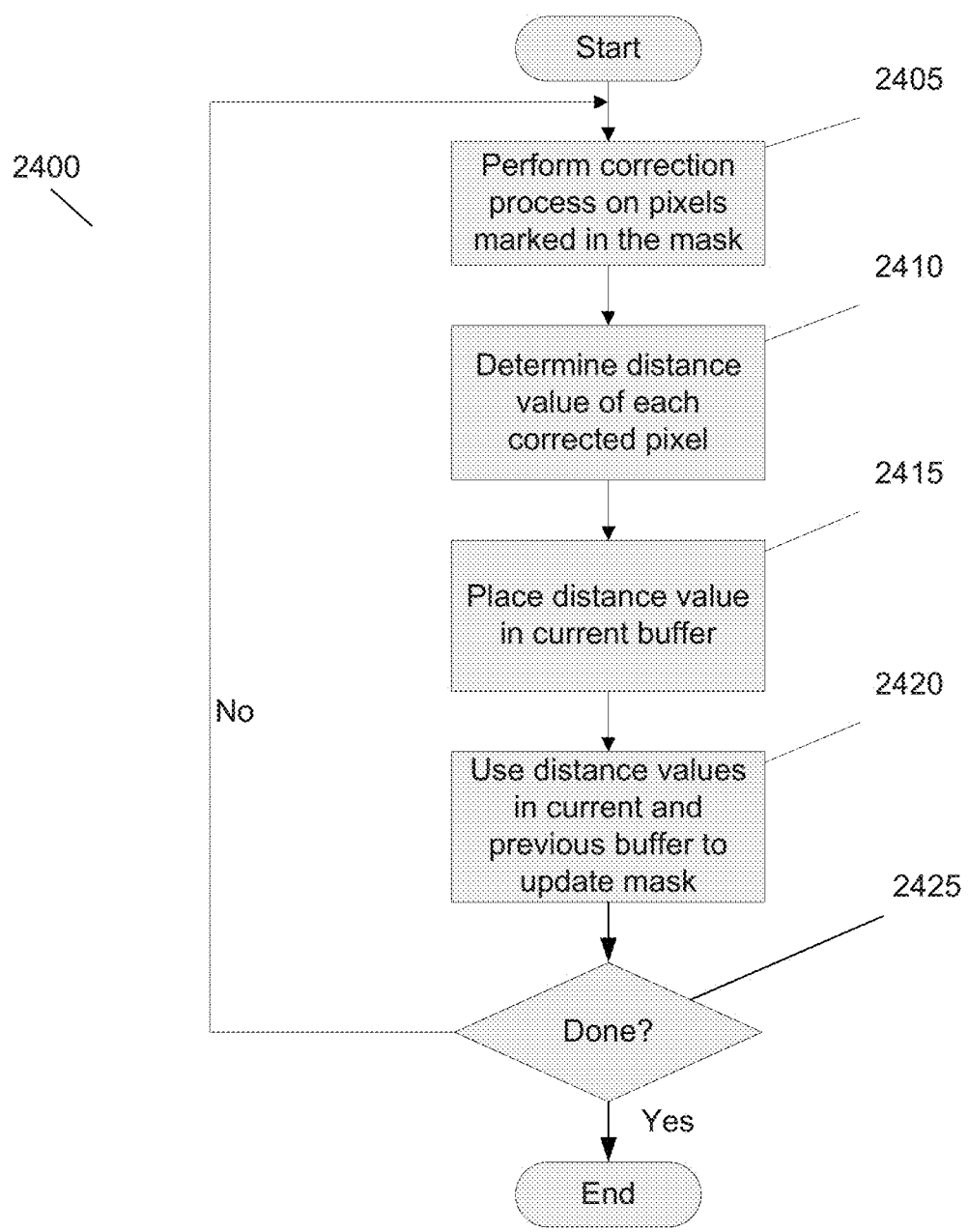
FIG. 24 is an illustration of a flow diagram of an adaptive correction process in accordance with an embodiment of the invention.

An adaptive corrective process performed during a texture synthesis process in accordance with an embodiment of the invention is shown in FIG. 24. Process 2400 performs (2405) a correction process on each of the pixels marked as not optimal in the optimization mask. A current distance value for each pixel correct is determined (2410). The determined current distance value of each pixel is placed (2415) in the current distance buffer. The current distance values in the current distance mask and the previous distance value stored in the previous distance value map are used (2420) to update the optimization mask. Process 2400 is then repeated (2425) until the iterations of the correction process are complete.

In many embodiments, the mask can be bootstrapped to fully yellow for the first correction pass and is then updated at the end of each subsequent correction pass. A correction pass may use the mask to determine whether a pixel in question should continue being corrected or not. If the pixel is set to black then an early opt out may be performed. Despite blocks of pixels sharing a single dynamic branching unit (e.g., 6×6 blocks of pixels on a typical Nvidia GPU), the clustering nature of the black pixels makes the sharing of a branching unit a minor inefficiency. Thus, a process in accordance with some embodiments of the invention offers significant performance gains.

A problem with some implementations of these processes in accordance with many embodiments of the invention is that a fully optimized pixel may become less optimized by further iterations. For example, a fully optimized pixel may become less optimal when one of the pixels in a surrounding 5×5 patch neighborhood changes in such a way that the change increases the distance to the closest input patch. This type of change can only happen when a pixel in the 5×5 patch neighborhood is itself non-optimal and still changing each iteration. With reference to FIG. 23, this can only happen to black pixels that are 1 or 2 pixels away from a yellow pixel. Because optimal and non-optimal pixels each tend to cluster together, pixels where this situation can occur are a minority. It is also noted that a correction process changes pixels that are being synthesized so that the 5×5 patch neighborhood of a pixel more closely resembles a patch in the output. Therefore, it is extremely unlikely that a yellow pixel within 1 or 2 pixels from a fully optimal pixel is itself not optimal. However, the process may need to wait until the next iteration through the process before the process can confirm the pixel is fully optimal. With further reference to FIG. 23, this means that each iteration of the process should remove more of the yellow pixels leaving more black pixels in the mask. Because a black pixel stops correction of the pixel, the distance measure stops updating when the pixel is black in the mask. Therefore, if an optimized pixel becomes non-optimal, processes in accordance with a number of embodiments of the invention would not re-start correcting the pixel. This situation is extremely rare and visual artifacts are not usually a result of it.

Adaptive correction processes in accordance with various embodiments of the invention are described above. However, any of a number of processes that involve adding removing, and/or combining steps of the adaptive correction process described above as appropriate to refinements of a specific application in accordance with other embodiments of the invention are possible.

Fixing Global and Local Repeats

Figure 25:
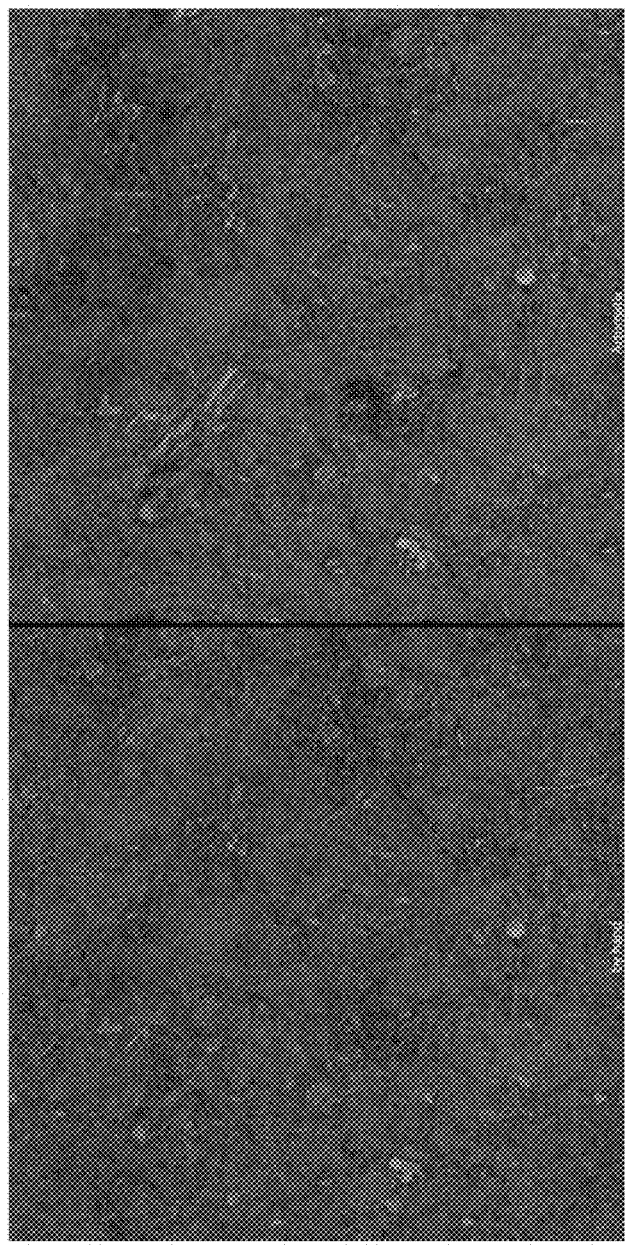
FIG. 25 is an illustration of a manually synthesized image and an image generated using a filtering process in accordance with an embodiment of this invention showing artifacts in the image synthesized using the filtering process.

Non-parametric example based texture synthesis techniques suffer from repeat artifacts to some extent. The reason for repeat artifacts is that synthesized features in the output are inspired or copied from features in the input example. The copying leads to synthesis quality that is subpar compared to images groomed manually. A comparison of an image generated by texture synthesis compared to a hand groomed image is shown in FIG. 25.

There are several factors in texture synthesis that contribute to both global and local repeating artifacts. As such, several extensions to the process address these problems in accordance with various embodiments of the invention. These extensions may be divided into "Global" and "Local" fixes. The fixing of global and local repeats in accordance with several embodiments of the invention can be performed in any order, or in a cooperative manner. In some embodiments, when a new exemplar candidate nearest neighbor is being evaluated, a repeat fixing process determines a local error value based purely on feature similarity to the synthesis location and a global error value based on global features such as (but not limited to) the global usage histogram, the local proximity check and the unique feature histogram. In many embodiments, the local and global errors can then be used to direct the synthesis process.

Global Repeats Fix

When doing the ANNS in a texture synthesis process in accordance with some embodiments of the invention, each pixel finds a most similar doppelganger based exclusively on local feature appearance with the one restriction that the two pixels must be at least a predetermined percentage (x %) away from each other in terms of the image size. In this formulation, every pixel chooses its nearest neighbors independently of the other pixels. This independent selection makes the process highly parallel and very attractive to run on a GPU. Unfortunately, an unintended but frequent result of the independent selection strategy is that a few "popular" features (and thus locations) end up being chosen by a large percentage of the pixels. Thus, many features will be underrepresented or completely passed over. The result is a nearest neighbor mapping that, when used for synthesis, naturally overproduces certain features while never or rarely producing many features from the exemplar. Ideally, all of the features in the input exemplar are equally represented in a synthesized texture output.

The standard solution is to maintain a histogram that represents how many times each pixel in the exemplar has been linked to a pixel in the output image. Histograms have previously been used in texture synthesis to assure that all patches from the exemplar were represented with no concern for spatial uniformity of samples. Histograms have also been used to introduce a spatial uniformity constraint that enforces sampling the exemplar in equal amounts. In each implementation, a histogram is maintained that counts the number of times each pixel from the exemplar is sampled. The histogram may sometimes be referred to as an "occurrence map".

Texture synthesis processes in accordance with some embodiments of the invention gather an occurrence map and use the occurrence map as feedback during the correction process in order to dampen a likelihood of a particular pixel being chosen if the particular pixel is already popular. This restriction on selection of a pixel enforces spatial uniformity. In some embodiments, processes perform a full ANNS pass between a synthesis level and an exemplar object to further improve synthesis quality. This can be especially relevant when using a control map that anchors where a user wants certain synthesis features to be located. In accordance with many of these embodiments, the occurrence map is different from the histograms maintained by conventional texture synthesis processes. In previous texture synthesis processes, the texture synthesis is built based upon a texture optimization framework that does not have separate analysis and synthesis phases to the process. Thus, these processes do not create pre-computed candidate sets. Instead, these previous texture synthesis processes iteratively perform the ANNS process as part of the synthesis process. Therefore, the use of the occurrence map in processes in accordance with some embodiments of the invention is very different from previous texture synthesis processes in terms of how the occurrence map is utilized. Processes in accordance with many embodiments of the invention are also different in terms of how the occurrence map is used as feedback. Some previous texture synthesis processes have an ad-hoc method for adding link occurrences to the feature distance error for that pixel. However, processes in accordance with some embodiments of the invention simply use it as a scalar on the error.

Figure 26:
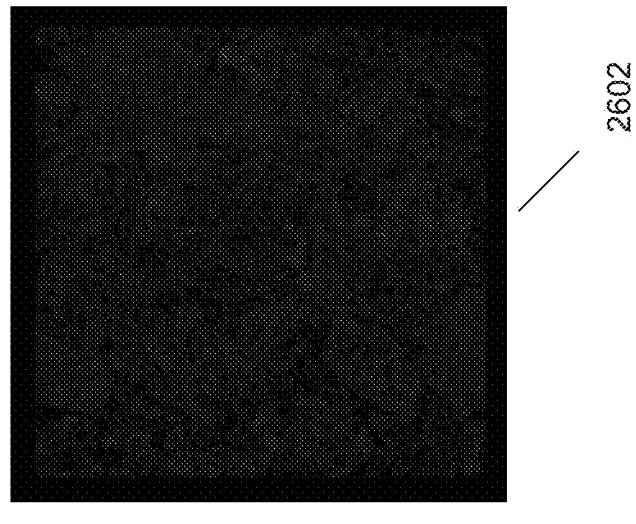
FIG. 26 is an illustration of an occurrence map generated by a conventional filter process and an occurrence map generated by a filter process in accordance with an embodiment of the invention.
Figure 26:
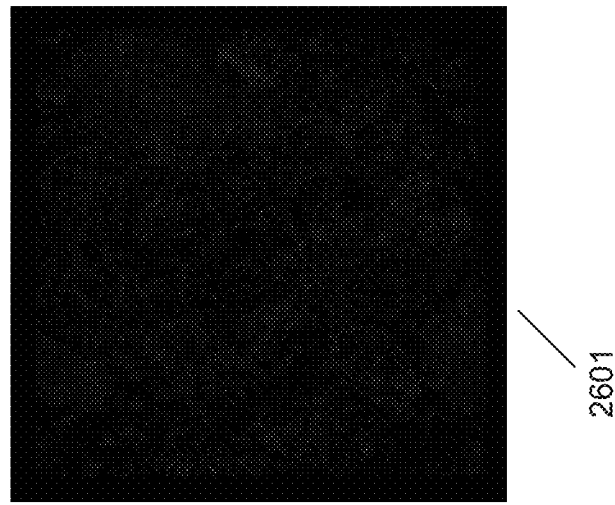

Two different occurrence maps are shown in FIG. 26. Map 2601 is an occurrence map generated from the standard ANNS that does not use the occurrence map as part of the ANNS process and map 2602 is an occurrence map generated using an ANNS process in accordance with an embodiment of the invention where the occurrence map is used as part of the ANNS process. In each map, the images have been normalized so that the most popular link is set to 1 and the rest are scaled linearly. From maps 2601 and 2602, it is clear that an ANNS process in accordance with some embodiments of the invention produces a more uniform feature distribution and dampens the over selection of popular features.

The same issue that occurs during the ANNS process also occurs in synthesis during the correction phase. As such, texture synthesis processes in accordance with some embodiments of the invention reproduce the same process in the correction phase with one caveat. The caveat being that an occurrence map no longer has the same number of links as pixels (because the exemplar links into itself or another similarly sized exemplar during ANNS). Instead, occurrence maps, in accordance with a number of embodiments of the invention, generated during the correction phase are generated by counting the number of links from the current level of the synthesis pyramid to the exemplar. The generated occurrence map can be a very sparse occurrence map for low levels of the synthesis pyramid. The sparseness of the occurrence map may break the process (e.g., at level 2 the synthesis pyramid is 4×4 or 16 pixels while the exemplar can still be 512×512 or larger that leads to an occurrence map with mostly 0 values). As a result, processes in accordance with some embodiments of the invention create an occurrence map that is the same resolution as the synthesis pyramid at the current level being synthesized. A "scale factor" can also be computed as the relative scale difference between the current exemplar object and synthesis level when the occurrence map is generated. As discussed above, in some embodiments, the data structure for synthesis is an image pyramid and the data structure for the exemplar object is a stack/pyramid hybrid. As such, the synthesis image pyramid and exemplar stack/pyramid hybrid have the same relative scale at the upper levels where they are both pyramids. However for a level, L, below the stack to pyramid border B, the scaling factor is $2^{B-L}$ that can be expressed as $SF=2^{B-L}$. When using an exemplar link of a pixel in the synthesis pyramid as an index into the occurrence map, a scale factor is needed. The scale factor may be determined by dividing the value of the exemplar link by SF. This can be thought of as creating a "coarse" version of the occurrence map.

A process for providing a global repeat fix in a texture synthesis process in accordance with embodiments of the invention is described above. However, any of a number of processes that involve adding removing, and/or combining steps of the process described above as appropriate to refinements of a specific application in accordance with other embodiments of the application are possible specific application in accordance with other embodiments of the invention.

Local Repeats Fix

The global repeats fix described above helps to some extent with local repeats of features from the exemplar set and "feature smearing" in the generated synthesis object as the global repeat fix decreases the overall chance of repeats (which includes local repeats). However, some local repeats and feature smearing may still occur and are especially damaging to the overall quality of the output synthesis object. To reduce these problems, texture synthesis processes in accordance with some embodiments of the invention introduce an additional "fix."

During the correction phase of texture synthesis processes in accordance with some embodiments of the invention, there is a point in some processes where each synthesized pixel attempts to find a pixel in the exemplar set that has the closest possible feature to the one being synthesized. In this way, the correction phase of these processes in accordance with some embodiments transforms the local features in the synthesized object to closer match with the local features in the exemplar object. During this correction phase of the processes, several potential new best matches are compared against the current best match and the one with the lowest feature distance or "error" is chosen.

The comparison may indicate that two adjacent pixels in the synthesized object reference pixels in the exemplar object that are less than the scaling factor (SF) apart from one another and/or possibly the same pixel. This is because adjacent pixels in the synthesized object may have an overlapping receptive field and have similar positions in feature space. If the features represented by the adjacent pixels are sufficiently far from the closest set of exemplar features, the adjacent pixels will all likely point to the same feature. The adjacent pixels pointing to the same feature forces the process to get stuck in a local minimum causing a smearing artifact across the synthesis object where the same exemplar feature is shared across a coherent patch of pixels in the synthesis object.

In accordance with many embodiments of the invention, an additional error term may be injected into this process. For each new potential best exemplar match being tested, processes in accordance with these embodiments also perform a check to determine whether the new best exemplar match creates a local repeat or smearing artifact. The check that is added to the correction process can be that each pixel in the synthesis object searching for a new best exemplar match also tests whether a new exemplar match is less than a predetermined pixel distance multiplied by the scaling factor (SF) away from the exemplar links of any of the eight immediate adjacent pixels under test. If the exemplar links for the adjacent pixels are more than this distance apart, the feature error is left unchanged. However, as the exemplar link distance gets closer to 0 for any one of the adjacent pixels, the process in accordance with many embodiments of the invention can increase the feature matching error exponentially.

In many cases, using a fixed neighborhood size for every synthesis level produces non-optimal results. The reason that the results are non-optimal is that repeating artifacts are much worse when the artifacts occur at low levels of the pyramid where features are very coarse and produce large regions in the output. As such, it is desirable to have larger neighborhoods for lower levels and relatively smaller neighborhoods for higher resolutions. Therefore, processes in accordance with some embodiments of the invention use a large neighborhood at the coarse level and decrement the neighborhood at each level as the process progresses up the pyramid, capping the neighborhood at a minimum of three pixels so that the pixels immediately surrounding the pixel of interest are always included in a neighborhood. Large neighborhoods increase the number of computations needed for testing a pixel of interest. Thus, using decrementing neighborhood sizes as a process in accordance with some embodiments of the invention travails up the levels in a synthesis pyramid has a performance benefit. The total number of pixels is very low at the low levels of the pyramid and high at the higher levels.

Figure 27:
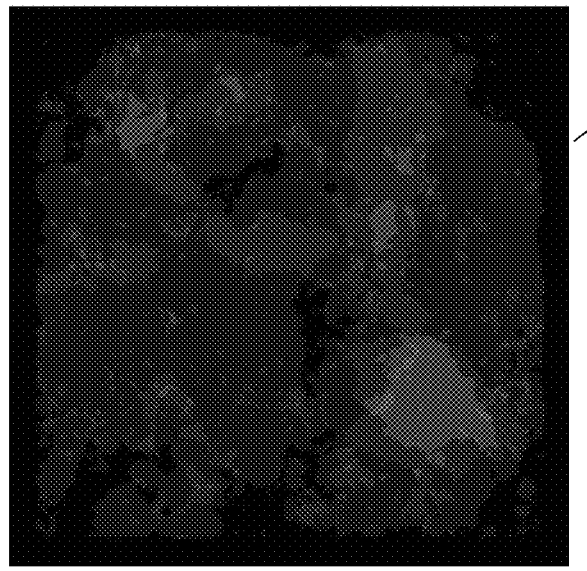
FIG. 27 illustrates an occurrence map produced without the local repeats fix processes and an occurrence map produced with the local repeats fix processes in accordance with an embodiment of the invention.
Figure 27:
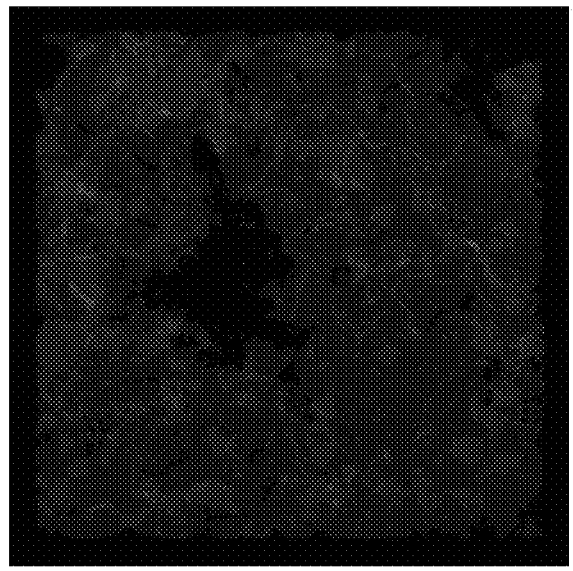

FIG. 27 illustrates an occurrence map 2701 produced without the local repeats fix and an occurrence map 2702 produced with the local repeats fix. Without the local fix, "vein" features are seen forming in the occurrence map 2701 where a band of features in the exemplar are repeated over and over again right next to each other. This is an example of a "smearing artifact" that is particularly undesirable. While the occurrence map does not show the global distribution of the occurrences, this approach also greatly diminishes the local repeats highlighted above in the maps 2701 and 2702.

Although the above is a discussion of various processes that provide local repeat fixes in accordance with various embodiments of the invention, any of a number of processes that involve adding removing, and/or combining steps of the process described above as appropriate to refinements of a specific application in accordance with a variety of embodiments of the invention are possible.

Per-Level Full Correction

It is a problem that texture synthesis processes can be susceptible to getting stuck in local minima. As neighborhoods are upscaled, features that were previously too low frequency to be perceivable in a lower resolution image can become dominant features in a higher resolution image. When finding new exemplar neighborhoods to match with a current set of synthesis locations, there are only a limited number of features that can be chosen from the exemplar. Thus, there is a high probability that the optimal match does not exist in the limited number of features. To account for the limited number of features to match, processes in accordance with some embodiments of the invention perform a full nearest neighbor search from the synthesis image over to the exemplar in order to update the link map to a globally ideal state after each upscale pass.

This ANNS is an optional pass that improves quality at the expense of extra computation. Optional ANNS passes can be used strategically based on the user's requirements for speed vs. quality. This approach can be performed at every level or periodically (e.g., every two or three levels) depending on the desired tradeoff in accordance with various embodiments.

Although various correction processes using ANNS for texture synthesis in accordance with various embodiments of the invention are discussed above, any of a number of processes that involve adding removing, and/or combining steps of the process described above as appropriate to refinements of a specific application are possible in accordance with other embodiments of the invention.

The above synthesis portion of the texture synthesis processes can improve image quality by adding processes for generating an image pyramid, adding randomness into the generation of each pyramid level, performing a correction process using a "Hilbert Curve", reducing local and global repeats by using an occurrence map, and/or using an ANNS process after a predetermined number of iterations to reduce the number of local minima reached.

Although various synthesis processes performed for texture synthesis of arbitrary shape and/or materials in accordance with an embodiment of the invention are discussed above, any of a number of processes that involve adding removing, and/or combining steps of the processes for synthesizing described above as appropriate to refinements of a specific application are possible in accordance with other embodiments of the invention.

Extensions of Core Synthesis for Arbitrary Shape and Material Data

Extensions of the processes described above, in accordance with many embodiments of the invention, are described below. These extensions build upon the concepts described above to enable the synthesis of arbitrary appearance information, including shape, within a single unified texture synthesis framework. Shape information is an open problem in texture synthesis with no commercial or academic solution.

Displacement Map Synthesis

Figure 28:
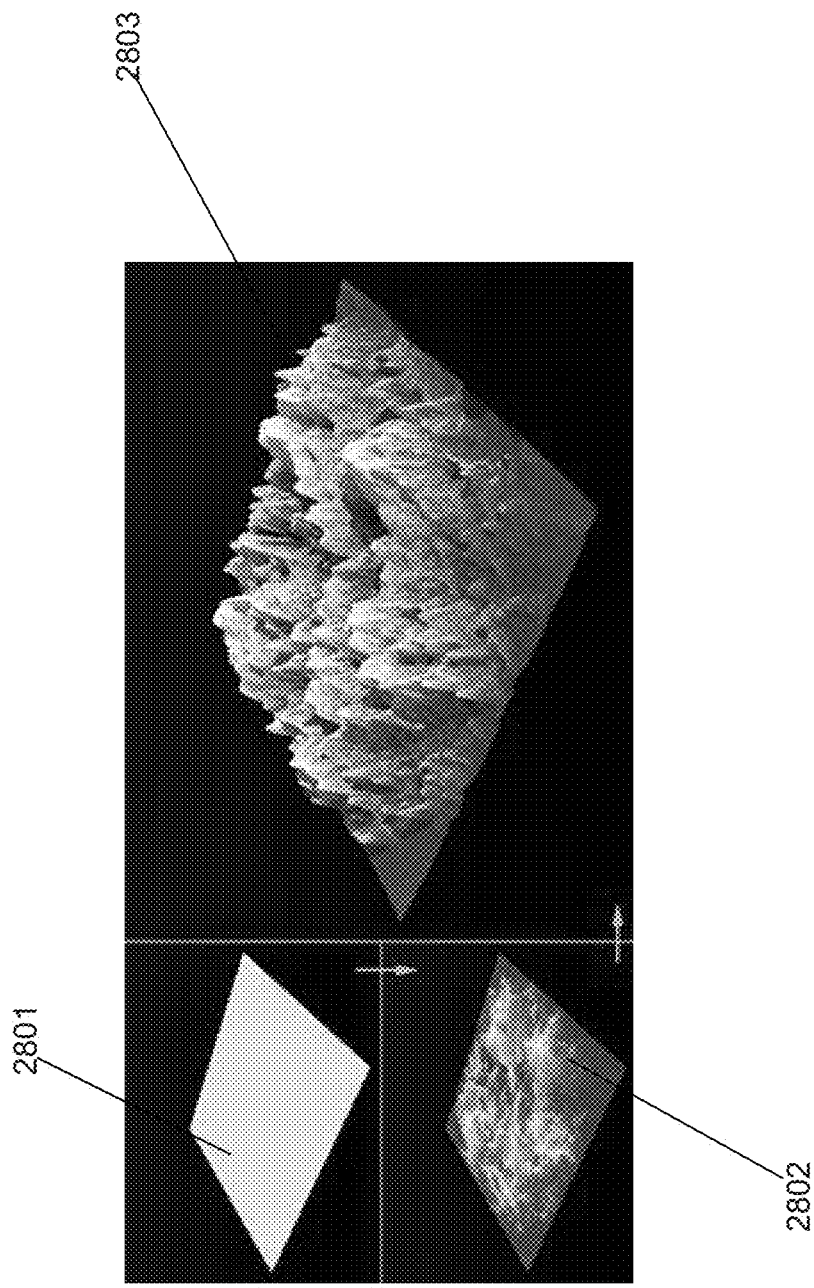
FIG. 28 is an illustration of various displacement maps generated by a filter process in accordance with an embodiment of the invention.

Displacement maps are a basic and constrained form of shape synthesis, they are an approach for encoding and rendering fine scale geometric detail that exists on the surface of a manifold (e.g., a 3D model). Texture mapping traditionally adds lighting information to the surface of a manifold in the form of colors and reflectance properties. Displacement maps extend this concept to adding geometric deformation information to the local shape of the surface. Displacement maps come in two varieties, 1D and 3D. Examples of 1D and 3D displacement maps are shown in FIG. 28. In FIG. 28, displacement maps or "relief maps" 2891-2803 displace a manifold along the normal direction (perpendicular to the surface). As shown in FIG. 28, where a flat plane of geometry 2801 has a gray scale image representing the 1D function mapped over the surface of the plane. In the final image 2803, these displacements are applied to each point on the surface resulting in a complicated 3D shape.

Displacement maps cannot be synthesized in the same manner as other types of material data. The difference is color/lighting values at the pixel level should be mimicked between the input and the output as closely as possible in texture mapping. In contrast, displacement maps should mimic local gradients around the pixel as closely as possible. If displacement values were synthesized directly in the same manner as color, then small variations (that would be unnoticed in other maps) in absolute values between patches of pixels in displacement maps taken from the input would appear as sharp cliffs and ridges manifesting in the final output. Instead, the goal of processes in accordance with some embodiments of the invention during synthesis is to reproduce the local height gradient between adjacent pixels so that the synthesized output most closely matches the input in this regard.

Each pixel being synthesized has 8 adjacent "neighbor" pixels. Thus, each pixel has 8 gradients or "relationships" that contribute to the shape of the displacement map around the pixel. Keep in mind that for each pixel in the synthesis map generated in accordance with an embodiment of the invention there is also a link to an archetype in the exemplar set. Therefore, each pixel being synthesized has a set of 8 "synthesis relationships" and 8 "exemplar relationships". Processes in accordance with some embodiments of the invention change the height value of a target pixel so that the 8 synthesis relationships most closely match their corresponding exemplar relationships.

Figure 29:
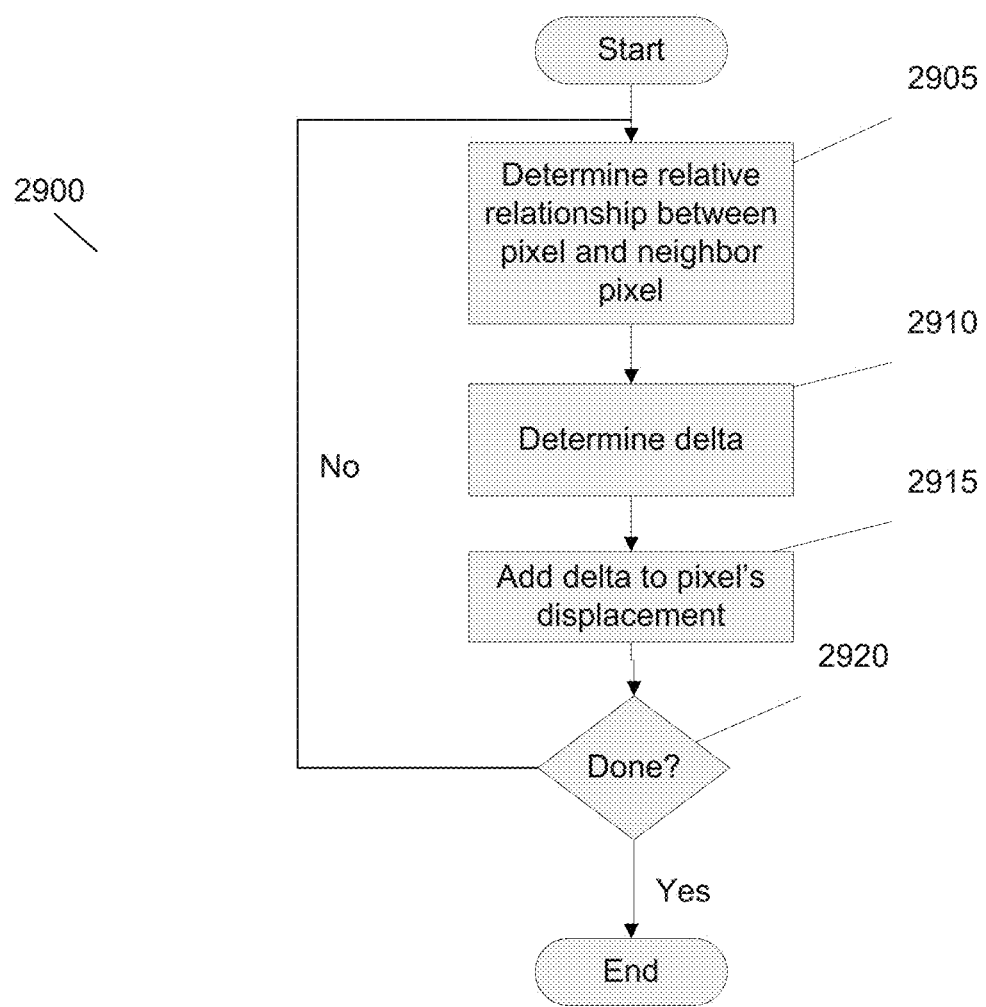
FIG. 29 is an illustration of a flow diagram of a locals fix process performed in a texture synthesis process in accordance with an embodiment of the invention.

To do so, the processes loop through the 8 neighbors, find the target displacement minus the neighbor's displacement to determine a relative relationship between these pixels, subtract the synthesis relationship from the exemplar relationship to get a delta that when added to the synthesis pixel's displacement forces the synthesis pixel to mimic the exemplar set. A process for using a displacement map in a correction process in accordance with an embodiment of the invention is shown in FIG. 29. The process 2900 determines (2905) a synthesis relationship between a pixel from the synthesized graphic object and a neighbor pixel from the synthesized graphic object, determine (2910) the delta by subtracting the determined synthesis relation from the exemplar relationship of the pixel, and adds (2915) the determined delta to the pixel's displacement forces. The process is then repeated (2920) for the other neighboring pixels in the synthesis image. By looping through all 8 neighbors, the processes may find the optimal value for the full neighborhood. The following is pseudo-code describing the processes in accordance with an embodiment of the invention:

```
Function findDelta(buffer displacement_map)
{
Float Delta = 0;
for(int index = 1 to 8)
    {
    Synth_Relationship = Synth_Target_Disp –
    Synth_Neighbor_Disp[index];
    Exemp_Relationship = Exemp_Target_Disp –
    Exemp_Neighbor_Disp[index];
    Delta += Exemp_Relationship – Synth_Relationship;
    } //end index
} //end function
```

In accordance with a number of embodiments, the processes cannot fully correct each pixel because changing the displacement of a target pixel, while optimizing its relationships, can hurt the gradients for neighbors of the target pixel. Therefore, processes in accordance with some certain embodiments optimize every pixel together in order to get a globally optimal displacement map for all pixels. To achieve this, processes in accordance with some of these embodiments, run multiple iterations of the process (in an example embodiment, 20 is selected as an arbitrary number that seems to work well) in order to reduce the displacement to 5% of what it would normally be. This lets the entire displacement function optimize as a complete system. It is understood that when performing each iteration of the process for the entire image, the new displacements should be stored into a temporary buffer that is separate from the buffer containing values that are being read. Otherwise, the order in which pixels are updated will affect the final result in undesirable ways. The following is pseudocode for the above identified process in accordance with an embodiment of the invention:

```
Function optimizeDisplacements(buffer displacement_map)
{
for(int iteration = 1 to 20)
    {
    Buffer new_displacement_map;
    for(every pixel in the displacement map)
    {
    new_displacement_map += findDelta(displacement_map)/20;
    } //end w
    Displacement_map = new_displacement_map;
    } //end iteration
} //end function
```

Although various processes for generating a displacement map through an arbitrary shape and/or material texture synthesis process in accordance with various embodiments of the invention are discussed above, any of a number of processes that involve adding removing, and/or combining steps of the processes for synthesizing described above as appropriate to refinements of a specific application are possible in accordance with other embodiments of the invention.

On-Model Texture Synthesis

Figure 31:
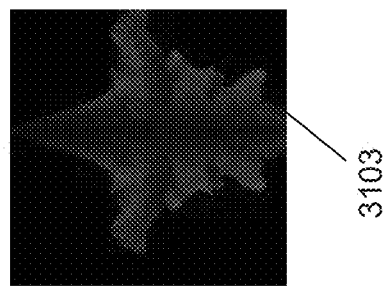
FIG. 31 is an illustration of a textured mapped model and components used to form the textured mapped model using a filter process in accordance with an embodiment of the invention.
Figure 31:
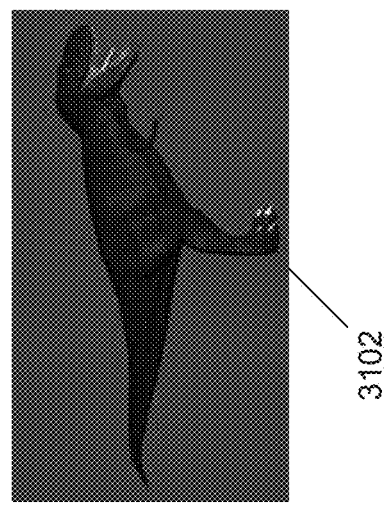
Figure 31:
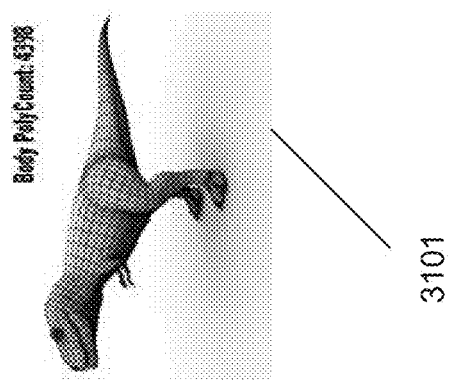

In computer graphics, a 3D model is typically "texture mapped". For purposes of this discussion, "texture mapped," means an image is wrapped over the surface of the 3D shape as shown in FIG. 31. 3D models contain UV coordinates at each vertex, which define the 2D parameterization of the 3D surface. In FIG. 31, the image 3101 displays the underlying geometry of the mesh, the image 3102 shows the geometry with a texture mapped over the mesh and the image 3103 shows what that texture looks like as a 2D mapping of a 3D surface. The process of synthesizing texture maps for a 3D surface may be referred to as "on-model texture synthesis".

There are many processes for synthesizing a texture directly on the surface of a model. A first example of a process for synthesizing a texture directly on the surface of a model operates on models directly by synthesizing vertex colors and then extracting a texture map as a final step. Another approach synthesizes the texture in image space, utilizing a Jacobian field that follows the model and creates a local direction and scale field in the image space so a texture can be synthesized using image-based methods while conforming to the shape of the model onto which the texture is to ultimately be mapped. Processes in accordance with some embodiments of the invention follow a similar approach.

On-model texture synthesis processes in accordance with some embodiments of the invention follow a similar approach to "Texture and Shape Synthesis on Surfaces" by Ying et al. 2001, the disclosure of which is hereby incorporated by reference in its entirety. However, these processes take the concept of on-model texture synthesis a step farther and produce textures that conform to geometric shapes and the feature contents of the texture that are guided by the underlying shape. A texture synthesis approach in accordance with some embodiments relies on the process of convolution in which each pixel of a synthesis kernel is filtered based on a neighborhood of surrounding pixels. On-model texture synthesis introduces two complications on top of the standard texture synthesis approach in image space: (1) a flow field is generated over the 3D model using curvature properties of the model along with user guidance. The flow field in accordance with some embodiments of the invention may then be projected as a 2D vector field in the parameterized texture space. The flow field contains both directional components and scale components along each axis. Rather than convolving the neural network along the image x-axis and y-axis unit vectors globally, each pixel now has a local coordinate frame and scale. (2) Since an arbitrary 3D surface cannot be mapped to a single plane, UV texture space may be broken up into a set of "charts" where each chart covers a relatively flat portion of the model. These charts add another level of complication because texture colors that are coherent along the surface of the model are not coherent in texture space where convolutions may be performed.

To accommodate this, processes in accordance with many embodiments of the invention add a gutter space of a few pixels in radius around each chart. The gutter space pixels store pointers to other charts in texture space that encode coherent pixels along the models surface. The gutter space pixels in accordance with a number of embodiments of the invention can be stored as an additional pointer buffer that can be referred to as a "jump map". When performing convolution, rather than sampling directly from the image, the jump map that points to the image pixel that should be sampled can be sampled first. Because texture space might have tightly packed charts, a pre-process can be performed in accordance with a few embodiments to spread out the charts so that there is a gutter space of at least two pixels around each chart at the coarsest synthesis pyramid level.

On-model texture synthesis processes in accordance with many embodiments can be used in conjunction with a Convolutional Neural Network Architecture to apply CNN image generated or assisted image synthesis directly in a models UV space. On Model synthesis relies on an underlying vector field that frames the local orientation around each pixel. As a CNN works by performing convolution across an image, the vector field directs the local orientation of the convolution. These processes have to bi-linearly interpolate sampling of neural activations from the previous layer where the convolution kernel extends beyond the scope of an atlas chart and the gutter space of pointers redirects the process to another atlas chart.

During a back-propagation phase of a process in accordance with some embodiments, inverse mapping can be used in a manner similar to the manner described above with respect to convolution. The inverse mapping allows these processes to perform CNN texture synthesis and style transfer directly in UV space for on-model texture synthesis.

On-Model Exemplars

Processes in accordance with several embodiments of the invention can take the on-model synthesis concept a step farther and produce textures that conform to geometric shapes and the feature contents of that texture are guided by the underlying shape itself as shown in the FIG. 30. In FIG. 30, the bottom row shows three input zombie meshes with materials mapped over the surface. The rest of the zombies were generated by synthesizing the same materials using the underlying geometry properties to guide synthesis in accordance with an embodiment of this invention.

Figure 32:
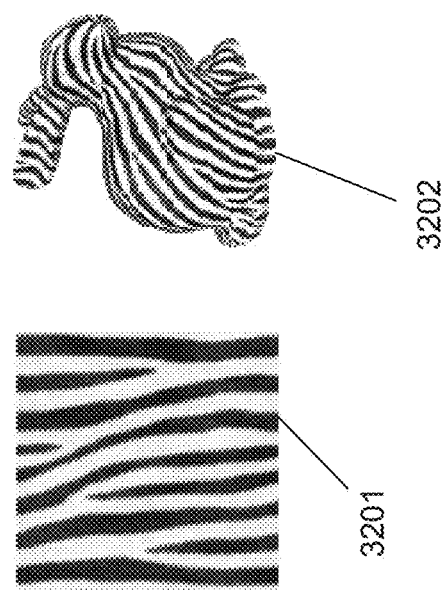
FIG. 32 is an illustration of a texture and the texture applied to a surface of a mesh by a filter process in accordance with an embodiment of the invention.

Previous on-model texture synthesis processes have been designed to use a texture and a single model (with no relationship between the two) as input and synthesize a new image which maps into the model's unwrapped texture space, as shown in the FIG. 32 where texture 3201 is wrapped around mesh 3202.

The goal of on-model texture synthesis processes in accordance with some embodiments of the invention is to go one step farther and provide an on-model texture synthesis scheme that lets the user supply a fully textured model as the input exemplar (for example textured mapped mesh (3102) instead of just a texture (3103) and apply that texture from the model onto a different untextured model. The advantage to this approach is that a lot of useful information is represented by a textured mesh. Specifically, the relationship between varying texture features and the underlying geometric shape upon which the texture features exist. Texture and shape are often not independent. Instead, texture and shape are related. Thus, by learning the relationships between a texture and a shape to which the texture is applied, processes in accordance with some embodiments of the invention can provide artists with more powerful and convenient tools. As an example, if there was a textured model of an alligator and a user had an untextured model of a dragon that the user would like to texture, an on-model texture synthesis process in accordance with some embodiments of the invention could build a mapping from the alligator model to the most similar shapes on the dragon and synthesize the local alligator textures to similar features on the dragon. Thus, the scales on the belly of the dragon will be the same as the scales on the belly of the alligator, the scales on the back of the dragon will be the same as the back of the alligator, and the dragon's head will resemble the alligator's head.

Another example is shown in FIG. 30. The bottom row of FIG. 30 shows three input zombie meshes with materials mapped over the surface. The rest of the zombies were generated by synthesizing the same materials using the underlying geometry properties to guide synthesis using processes in accordance with an embodiment of this invention. The key behind this approach for texture synthesis of arbitrary shape and material data in accordance with some embodiments of the invention is to find a shape descriptor that is both effective as well as compatible with an image descriptor maintained by the system and the image based GPU accelerated framework upon which the system is built, this is a key factor for a "unified framework" where shape and material properties can be amalgamated into a single "appearance feature". A key insight is that geometric shape information can be projected onto an image (i.e., a regular grid) and the shape descriptor is able to work by sampling patches from this grid in order to maintain compatibility with the GPU framework. Because it is desirable that geometric neighborhoods correspond to texture neighborhoods, it makes sense that the geometric projection into image space should match the texture unwrapping. The only issue is that texture information can map to multiple portions of a single mesh. As such, processes in accordance with a number of embodiments of the invention utilize a texture parameterization that provides a 1-to-1 mapping between points on a model and pixels in a texture image. Thus, processes in accordance with several embodiments amount to processes that simply make copies of charts or chart regions that are pointed to from multiple polygons so that each polygon maps to its own region in texture space.

Given this model representation, an effective shape descriptor can be found in accordance with some embodiments of the invention. For purposes of these processes, it is assumed that no single shape descriptor is appropriate for correlating texture features with positions on a model. In the real world, the location of material properties on a surface can result from a plethora of factors. Therefore, processes in accordance with use embodiments of the invention may use a plethora of different shape descriptors in conjunction with a data reduction approach to keep strong correlations and discard spurious relationships.

In accordance with a number of embodiments of the invention, the texture mapping processes can incorporate one or more of the following four different descriptors: a global normal direction, a local curvature, an Ambient Occlusion (AO) and a volumetric shape. The global normal direction is a common indicator of where certain materials will exist on a model. For example, snow always accumulates on parts of a model with a global normal that points mostly up (i.e., snowfalls on mostly level surfaces). Scratches and chips on a wall or object usually accumulate at sharp corners that may be indicated by the local curvature. AO indicates the extent to which exposure to a light source of a point on the geometry can be a revealing factor for weathering. While AO is information commonly used for rendering, the observation that overall exposure to the elements (sun, rain, and wind) can be a strong influencer on how a surface becomes eroded and/or corroded. This makes AO useful in determining that exposure. Finally, the volumetric shape itself is important as matching shapes tend to have matching textures. For example, in the zombie images shown in FIG. 30, eye materials remain mapped on eye geometry and lip material belongs on lip shaped geometry regardless of the mesh to which the textures are applied.

In accordance with some embodiments of the invention, the volumetric shape of a 3D mesh is encoded as a Gaussian Mixture Model (GMM). Each point on the 3D mesh projects onto some point in texture space. As such, each pixel also points to a position in 3D space where coherent pixels in texture space (when taking jump maps into account) also correspond to a coherent region along the manifold of the 3D mesh surface. For each pixel in texture space, processes in accordance with a number of embodiments can encode a small spherical Gaussian function with a mean value corresponding to the mesh position for the point in texture space of the pixel. The new GMM based volumetric representation of the model can be downscaled simply by averaging a small patch of Gaussian functions together into a single new Gaussian function. The downscaling process for the GMM volumetric representation in accordance with many embodiments is similar to the downscaling process for image based pyramids used in texture synthesis. However, in an on-model texture synthesis process, Gaussian functions rather than color values are averaged.

As a small neighborhood of Gaussian functions combine together into a GMM, a GMM can be used as a local shape descriptor in accordance some embodiments of the invention. The use of a GMM allows volumetric shape information to be gathered and compared along with other appearance information such as surface color or reflectance properties. Thus, a GMM effectively offers a unified "super feature vector" that contains both shape and material in one single vector allowing a single unified synthesis approach for both shape and appearance. Furthermore, feature distances between two points on a 3D mesh can be measured as the total variation distance between two GMM that are comprised of some neighborhood of Gaussian functions around a point (a pixel in texture space). In accordance with various embodiments, any total variation distance algorithm between GMMs may be used including, but not limited to, Bregman divergence, Kullback-Leibler divergence, Hellinger distance, cross-entropy and a-divergence. For non-symmetric distance metrics, processes in accordance with a few embodiments simply accumulate the distance from neighborhood A to B and from B to A.

In addition, CNN models may be trained using the Gaussian Mixture Model based shape descriptor presented in the previous section. This allows the processes to train the CNN on 3D models and perform improved shape synthesis as well.

Figure 33:
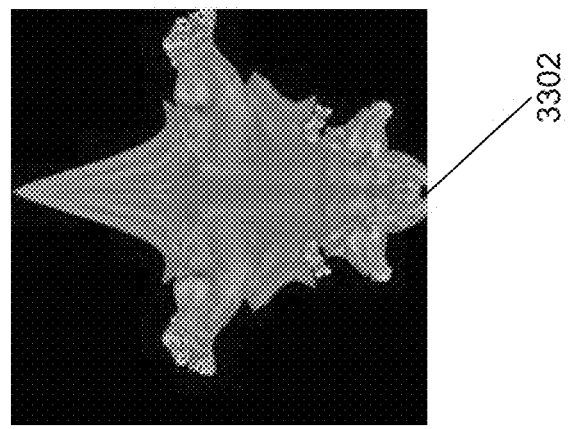
FIG. 33 is an illustration of mesh description maps determined by a filter process in accordance with an embodiment of the invention.
Figure 33:
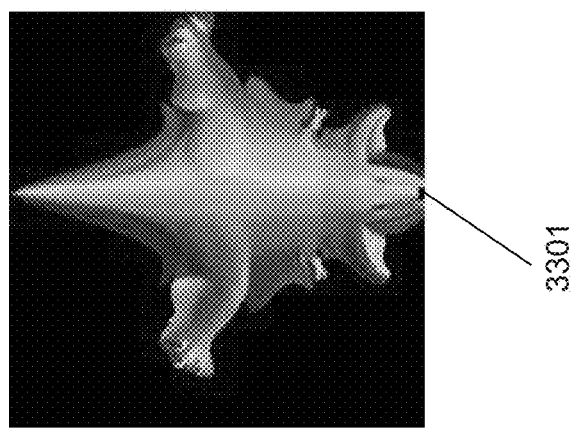

Maps indicating the global normal, local curvature, and AO are straightforward maps that are used commonly for rendering. Examples of a global normal map 3301 and a local curvature map 3302 are shown in FIG. 33. A volumetric shape map of Gaussian functions at each pixel is a new and novel shape map generated in accordance with several embodiments of the invention. When comparing two 3D shapes, it is desirable to compare the shapes as volumes. However, 3D models are represented as manifolds, or thin surfaces that are hollow.

Voxelization is the typical approach for converting a 3D mesh into a volumetric representation. A voxel is a 3D pixel, or a box that is a 3D grid of points that either has volume or does not have volume. Voxels are not ideal for two reasons: (1) they are extremely memory inefficient and (2) they are typically lower fidelity than the polygonal manifold, which can introduce discretization errors. The core problem is that a 3D mesh is actually a 2D surface (that represents a manifold in 3D space), so the 2D information is being converted into a 3D representation. This inherently increases the memory and processing times.

To reduce the memory and processing times needed, processes in accordance with some embodiments of the invention use a volumetric representation that maintains the mesh in a 2D form while representing a 3D volume. In addition, the processes of building a multi-resolution pyramid from the geometry information for it to work with a synthesis framework can be similar to the synthesis framework described above.

A key issue for geometric description maps is downscaling for the pyramid/stack. There are two issues to take into account. The first issue is that global normal, local curvature and ambient occlusion values cannot be downsampled as these values are derived from the true shape of the mesh, which is being averaged by the GMM representation. Therefore, many processes downscale the GMM and then re-compute the other representations (global normal, local gradient, and AO) from the new shape the GMM produces. The second issue is with the downsampling of the GMM itself. The problem is not specific to downscaling a GMM. Rather, downsampling in general causes the information to be broken up into a set of charts in texture space that have varying local coordinate frames. These processes can take into account jumps across chart boundaries as well as the local coordinate frame when downsampling the GMM.

Although various processes for generating a geometric description map for convolutional neural network based texture synthesis in accordance with various embodiments of the invention are discussed above, any of a number of processes that involve adding removing, and/or combining steps of the above described processes as appropriate to refinements of a specific application are possible in accordance with other embodiments of the invention.

Geometry Synthesis (3D Displacement Maps)

Geometry synthesis combines the ideas implemented by various embodiments of the invention in the previous two sections. In the first section, various methods for correctly synthesizing 1D displacements from a surface were presented. In the second section, a number of methods by which 3D volumes and surfaces can be described in an effective and computationally effective manner for the purpose of guiding image synthesis were presented. An extension of these ideas in accordance with some embodiments of the invention is to include the deformation of the geometry as a part of the synthesis process. In the first section, a system that synthesizes height displacements on a grid was described. In accordance with some of these embodiments, the synthesis of full 3D shapes is treated as a 3D vector extension of this idea. Processes in accordance with many embodiments of the invention encode the 3D model as an image in a manner presented in the previous section. These processes are a straightforward implementation.

Although various processes for geometry synthesis in accordance with various embodiments of the invention are discussed above, any of a number of processes that involve adding removing, and/or combining steps of the processes for geometry synthesis described above as appropriate to refinements of a specific application are possible in accordance with other embodiments of the invention.

On-Model+Geometry Synthesis

In accordance with some embodiments of the invention, geometry synthesis is performed on 3D meshes through its UV projection. In accordance with many of these embodiments, in order to extend these concepts to a framework that is compatible with texture synthesis on a GPU, a process for encoding a GMM into texture space in accordance with various embodiments of the invention described above can be used.

Synthesizing the shape of a 3D mesh in accordance with some embodiments of the invention relies on all of the underlying shape descriptions and comparison approaches for on-model analysis and synthesis described above. The key extension in accordance with many embodiments is that the mean of each Gaussian function comprising a GMM is allowed to change through the upscale, randomization, and correction processes defined for image synthesis when synthesizing shape. As such, in addition to the three synthesis steps common to all synthesis procedures, 3D model synthesis shares an additional step in common with displacement map synthesis where a new position is found for a pixel based on a relative position of the pixel as compared to neighboring pixels. Each pixel being synthesized has 8 adjacent "neighbor" pixels. Thus, a pixel has 8 gradients or "relationships" that contribute to the shape around the pixel. As such, each pixel in the synthesis map generated in accordance with an embodiment of the invention also has a link to an archetype in the exemplar. Therefore, each pixel being synthesized has a set of 8 "synthesis relationships" and 8 "exemplar relationships". Processes in accordance with several embodiments of the invention change the relative position of a target pixel so that the 8 synthesis relationships most closely match the corresponding exemplar relationships of the target pixel.

Processes for matching synthesis and exemplar relationships in accordance with some embodiments of the invention loop through the 8 neighbors, find the target position minus the neighbor's position to determine a relative relationship between these pixels, subtract the synthesis relationship from the exemplar relationship to get a delta that when added to the synthesis pixel's position forces the synthesis pixel to mimic the exemplar. By looping through all 8 neighbors, the processes may find the optimal value for the full neighborhood. These processes are performed in a manner similar to the processes described above with respect to displacement map synthesis. One important difference for 3D geometry synthesis being that instead of synthesizing 1D displacements, a full 3D position is optimized.

In some embodiments of the invention, a total variation distance process is used to compare shape similarity. To do so, either classic GMM distance metrics can be used, or a CNN is trained on the same GMM data in accordance with many embodiments and through feed-forward convolution of neighborhood GMMs, the CNN may extract feature vectors that can be used directly to find shape distance between two points on a mesh.

Although various texture synthesis processes that integrate on-model synthesis with full model synthesis in accordance with various embodiments of the invention are discussed above, any of a number of processes that involve adding removing, and/or combining steps of the above described processes as appropriate to refinements of a specific application are possible in accordance with various embodiments of the invention.

Extraction of Synthesis Outputs from Synthesis Object

The synthesis object is a pyramid of 2D arrays where each array element contains an appearance vector. This appearance vector is of variable and arbitrary length but of the same length as the exemplar's appearance vector, acting as an amalgamation of all the shape and material information given to the system as input. Therefore, it is necessary as a final step of the process to transform this appearance vector back into a set of images and 3D meshes that match the collection of data types given as input.

Images are a straightforward data type to extract. Image data in the appearance vector can be efficiently stored as a contiguous set of 1, 2, 3 or 4 elements within the vector. An image when stored on a computer is typically of 24 bits (three 8-bit channels encoding red, green and blue colors) or 32 bits (four 8-bit channels encoding red, green and blue colors with an additional 8 bits for transparency). In the case of a 1, 2 or 3 element image, they are encoded as a 24-bit image where the unused channels in the case of a 1 or 2 element image are set to 0 as a default. In the case of a 4 element image, it is stored as a 32-bit image on the computer. In some special cases (such the case with displacement maps on some occasions), it is desirable to process the synthesis object and then store the resulting synthesis output in higher than 8-bit precision, such as 16-bit or full floating point 32-bit precision. In this case it is possible to do so, leveraging image formats such as PNG that can encode 16-bit color channels and/or TIFF or EXR that can encode 16 or 32-bit color channels.

3D mesh information is less straight-forward to extract from the finest level of the synthesis pyramid and save as a synthesis output. While the synthesis object can contain global normals, curvature and geometry AO information, when exporting shape information out into a 3D mesh, the Gaussian's mean is the only information that is used, as it encodes the position in 3D space for every point on the surface of the mesh. Note that when an exemplar object is being created from an exemplar input, the input 3D mesh data is projected onto its parameterized UV space. This is a 1-to-1 mapping between the points on the surface of the 3D mesh and a 2D array. Note that there is no restrictions on the ratio between the number of vertices in the 3D mesh and the number of pixels in the parameterization, so depending on this ratio, there could be many Gaussian means for each vertex, or vice-versa.

The collection of 3D points form a point-cloud which could be reconstructed into a new mesh in a number of ways, such as through the famous Marching Cubes algorithm, or by using the correspondence between points defined by the 2D parameterization. That said, in most cases it is desirable to have the synthesis output mesh match the same topology and UV parameterization as the mesh that was supplied as an exemplar input. In this case it is a simple matter to create a copy of this input data structure and update each vertex position to reflect the average Gaussian means coming out of the synthesis object. This can be done by sampling the UV coordinate at each vertex on the finest level of the synthesis pyramid, utilizing bi-linear interpolation where the vertex's UV coordinate samples between "pixel" locations.

Wang Tile Synthesis

Processes in accordance with some embodiments of the invention have extended the basic texture synthesis approach to generate Wang tile sets. A Wang tile is a set of textures that share common borders. A procedure is then used to build unique aperiodic collections of these tiles. Several papers have been written about utilizing texture synthesis to generate Wang tile sets. However, the previous Wang tile synthesis research is based on outdated texture synthesis frameworks. Therefore, processes in accordance with many embodiments of the invention provide an approach that utilizes our faster and higher quality synthesis method. Wang tiles are described in "Tile-Based Texture Mapping on Graphics Hardware", Wei (2004), the disclosure of which is hereby incorporated by reference in its entirety.

Figure 34:
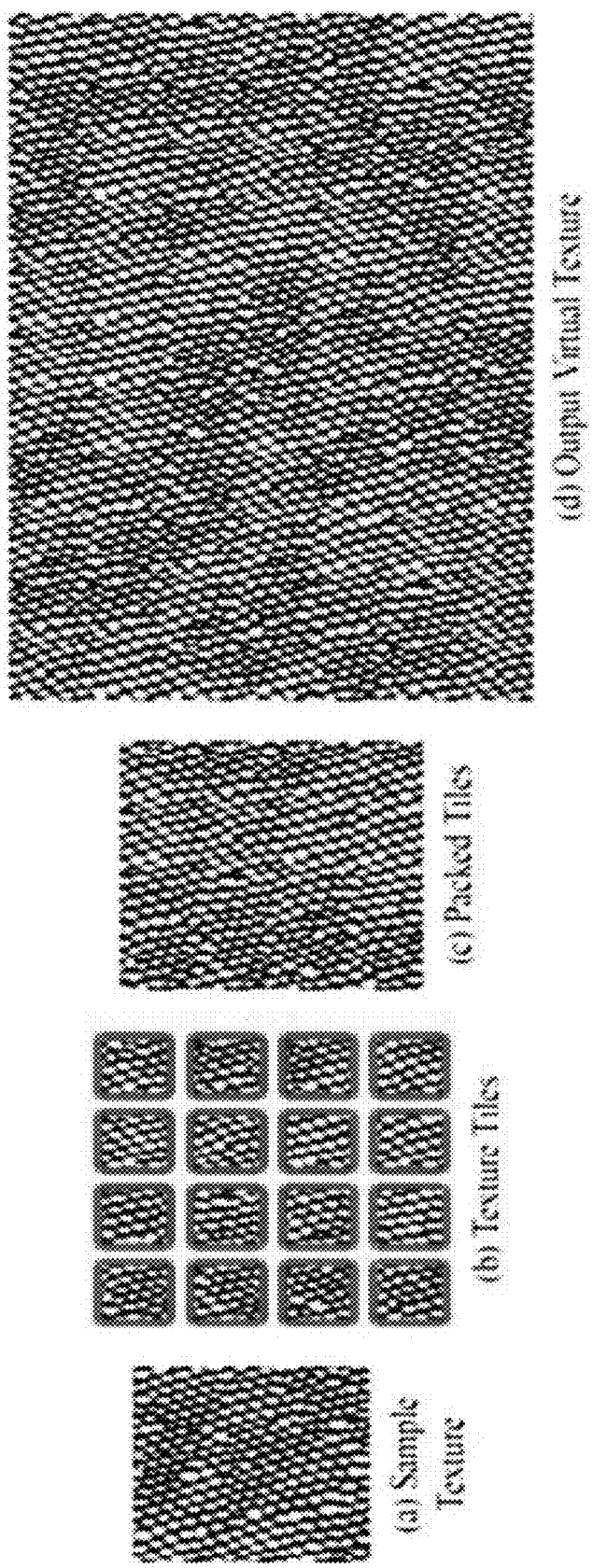
FIG. 34 is an illustration of texture tiles and structures generated using texture tiles generated by a filter process in accordance with an embodiment of the invention.

It should be noted that many different Wang tile set configurations exist. However, a process in accordance with a number of embodiments of the invention use a 2-border, 16 tile set configuration as shown in the FIG. 34. This configuration is used because it can be packed into a square power of 2 texture (important for GPUs) and it is self-tiling. For purposes of this discussion, self-tiling means it will mipmap properly on GPU hardware. Thus, self-tiling is desirable for use in real-time rendering on GPUs.

Figure 35:
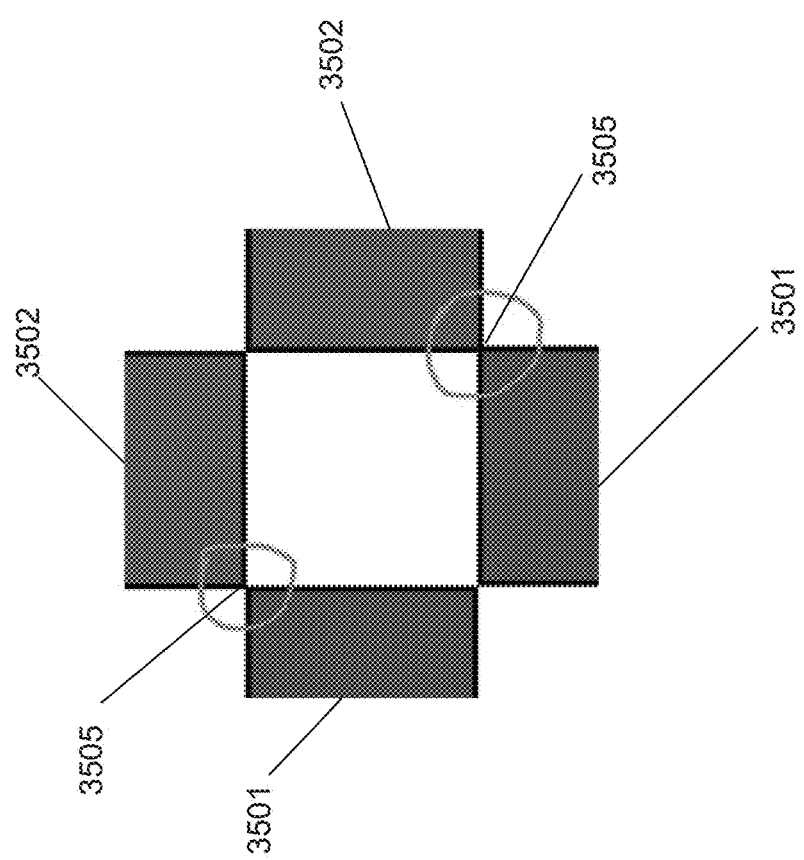
FIG. 35 is an illustration of a Wang tile used by a filter process in accordance with an embodiment of the invention.

All Wang tiles share two or more sets of common borders where the resulting Wang tile set contains the same number of tiles, as there are possible combinations of the four borders. An example Wang tile in accordance to an embodiment of the invention is shown in FIG. 35. The tile in FIG. 35 has two sets of borders 3501 and 3502 hereafter referred to as "red" (3502) and "blue" (3501). In this example, the illustrated tile 3500 can be matched with other tiles of the tile set that share a border of the same color without creating discontinuities.

Processes in accordance with some embodiments of the invention begin the generation of a Wang tile set by synthesizing a red tile 3502 first. This can be done using the synthesis methods described above. Next, a blue tile 3501 is synthesized. The synthesis of the blue tile 3501 utilizes a custom solution that takes the content of the red tile 3502 into account. "Red" and blue tiles in accordance with several embodiments of the invention are tiles in which each of the edges are red and blue, respectively. If the blue tile is generated using the standard approach, discontinuity may arise where the two corners intersect. This discontinuity can appear because the content in the corner of one tile needs to spill over into the corner of the other tile or there is a chance that when combined two quarters of the image feature that spans the intersection will not match anything from the input.

Figure 36:
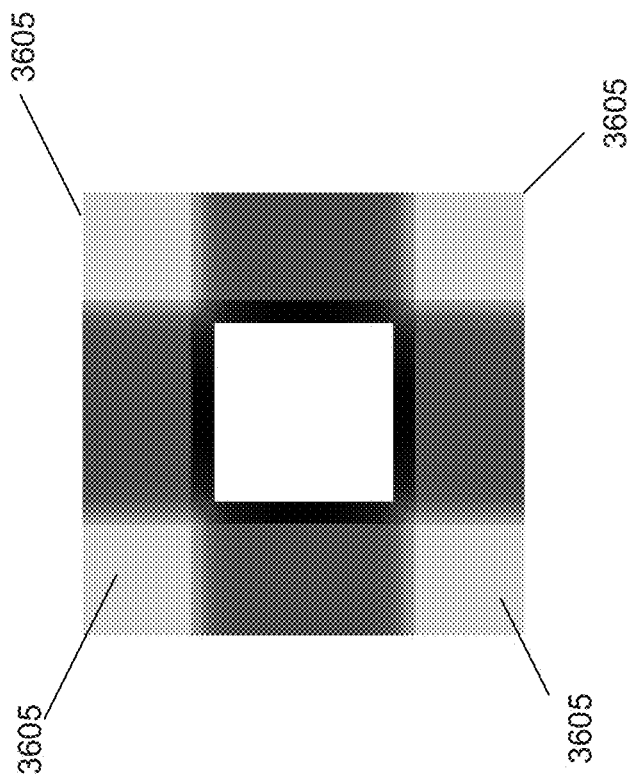
FIG. 36 is a partially synthesized Wang tile in accordance with an embodiment of the invention.

To reduce the likelihood of these artifacts, processes in accordance with many embodiments use a mask to guide synthesis of the blue tile. An example of a mask used in accordance with an embodiment of this invention is shown in FIG. 36. These processes divide the red tile up into four quadrants and pack quadrants into the yellow portions 3605 of the mask. Bleeding out of the yellow boxes is a gradient in the green channel. The green channel is a patch formation weighting term. Thus, greener pixels will have more strength in terms of their patch formation over the blacker pixels. During correction, the features in greener portions (note yellow contains full green) of the image will push their features into the less green regions. The white/black region is the part of the image where the blue tiles are synthesized (the black part is ignored for now and will be explained below). Finally, the blue region signifies that there is a need to modulate or "wrap around" the white/black region such that a blue tile tiles with itself.

The "red" and "blue" tiles define border regions that all tiles will share in common. An image has four sides and each side a corresponding border area. Each border area can have two states, corresponding to a continuation of the contents taken from either the red or the blue tile. Our goal is to synthesize 16 unique textures that conform to the 4×4=16 combinations of red and blue borders. In accordance with some embodiments, the construction of these tiles is done using a mask twice the size of the original tiles. An example of a mask used to generate the remaining tiles is shown in FIG. 37.

Figure 37:
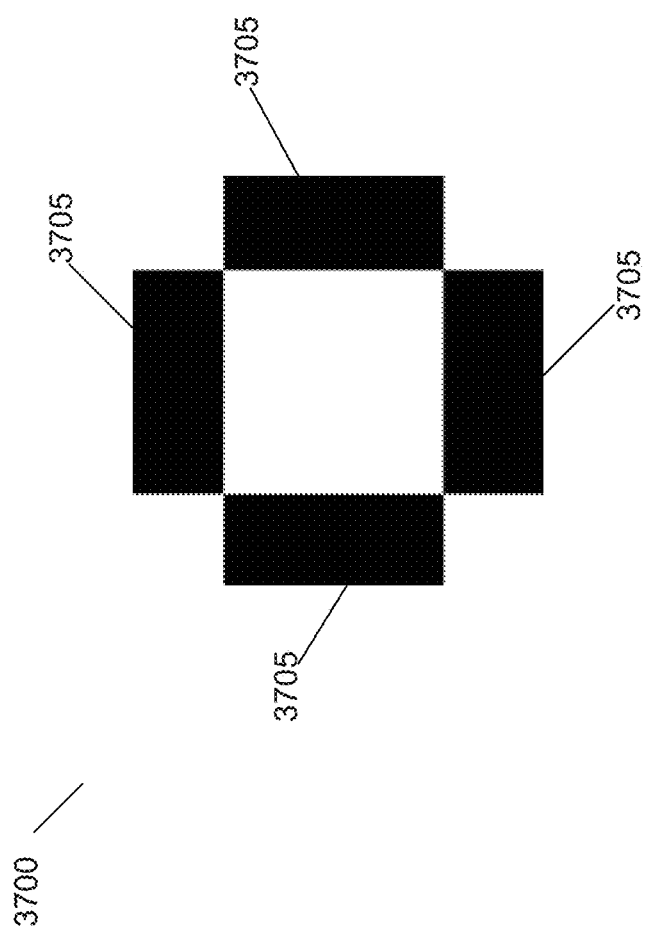
FIG. 37 is an illustration of a Wang tile synthesis mask in accordance with an embodiment of the invention.

In reference to FIG. 37, the black bars 3705 of mask 3700 are regions where synthesis is not performed. In these regions, the border tiles are chopped up and copied into these bars across all pyramid levels. This means that during synthesis, the border regions act as anchors that frame the synthesis of the new tile in the center (Note that the four white quadrants at the corners are not necessary and discarded). This approach is superior to previous methods that copy border patches into the tile being synthesized. Instead, a completely unique tile is synthesized that will then seamlessly merge into its borders.

Figure 38:
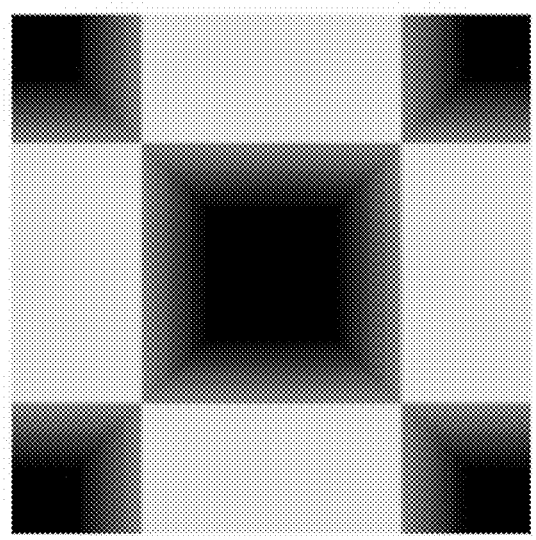
FIG. 38 is an illustration of an infinity synthesis guide map in accordance with an embodiment of the invention.

In accordance with some embodiments of the invention, a Wang tile synthesis guidance map is used. An example of a Wang tile synthesis guidance map is shown in FIG. 38. In FIG. 38, the red channel is the binary border mask shown, the green channel contains a patch formation weighting term, and so greener pixels will have more strength in terms of their patch formation over the blacker pixels. Note that yellow is just fully red and green.

To help enable that the new tiles merge into its border constraint, an extra term can be added into the synthesis process that favors matches closer to a bar over matches further away. Instead of favorably weighting patch formation in all directions, the underlying gradient in the green channel of the image is relied upon to direct the weighting. This is performed by subtracting the neighbor value from the current target value and adding the resulting term into the coherent patch weighting term.

Figure 39:
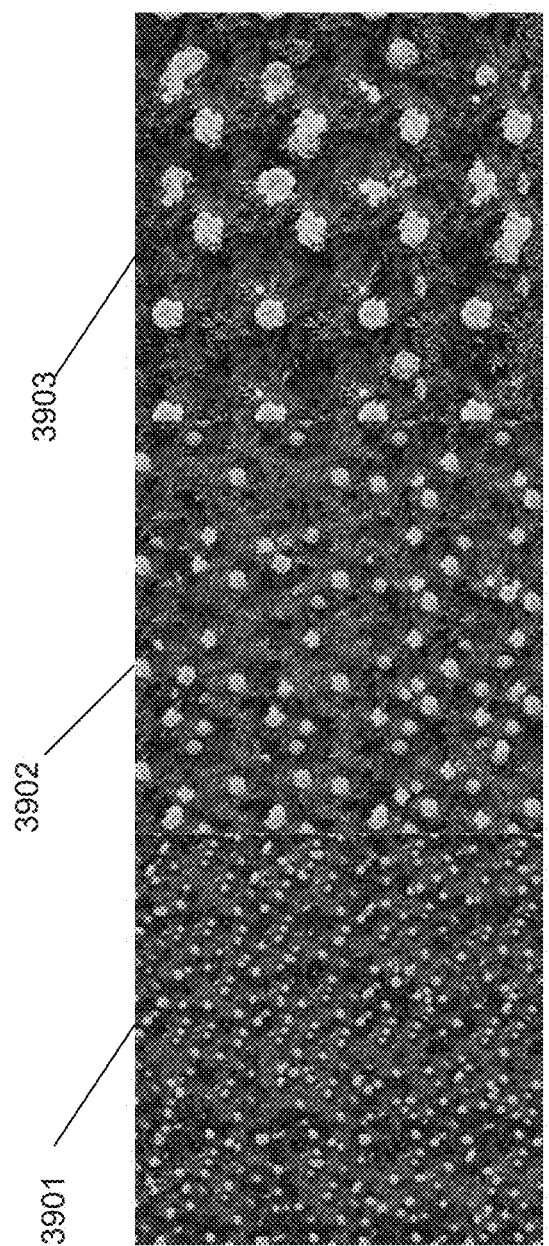
FIG. 39 is an illustration of images generated by a texture synthesis process using infinity synthesis guidance in accordance with an embodiment of the invention.

In accordance with some embodiments, Wang tile sets are generated at resolutions that are multiples of the original image. In some particular embodiments, 1×, 2× and 4× tiles are supported. Given the nature of the content inside the image, the quality can vary among the tile sets. The reason is that large and distinct features can be synthesized across a border region of a tile resulting in all subsequent tiles that merge into that border regions are generating a very similar and distinct feature at the same location, causing a "grid" effect as shown in images 3901-3903 in FIG. 39. In FIG. 39, the grid artifacts become more pronounced as size decreases.

Figure 40:
FIG. 40 is an illustration of an image and a unique feature map generated for the image by a filter process in accordance with an embodiment of the invention.
Figure 40:
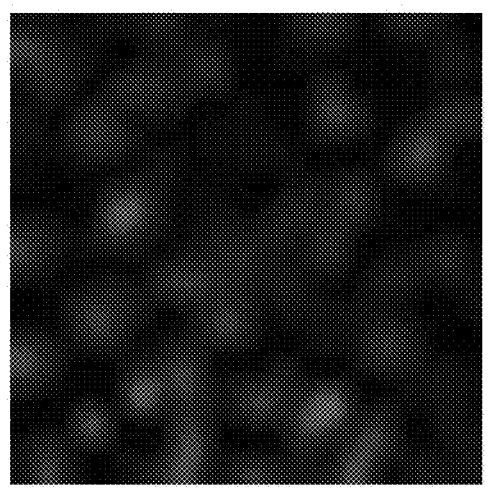

To reduce and/or prevent grid artifacts, a "unique feature" detector can be used by some embodiments of the invention. A unique feature detector identifies regions in an image where strong features exist in a minority to the underlying homogeneous texture as seen in the FIG. 40. Improved synthesis quality can be achieved by using the unique feature map during the synthesis of the red and blue borders of the first tile. The region of the synthesized tile within 5% of a border is checked for unique features (red as seen above) and replaced with a homogeneous feature (black). This pushes more unique and visually catching features to the center of the 16 tiles, leaving the border region more homogeneous and indistinctive to the eye.

Although various processes for generating Wang tile sets in accordance with various embodiments of the invention are discussed above, any of a number of processes that involve adding removing, and/or combining steps of the above described processes as appropriate to refinements of a specific application are possible in accordance with other embodiments of the invention.

In-Painting

Processes in accordance with some embodiments of the invention have extended the basic texture synthesis approach to in-paint specified regions of a texture. In-painting is a specific use case of a general texture synthesis process, whereby regions of an input exemplar are marked for deletion and a texture synthesis process is used to replace the marked regions with information seen in the unmarked region of the exemplar, keeping the unmarked region unmodified.

An in-painting system in accordance with many embodiments of the invention follows the strategy described for Wang tile synthesis where a distance field is generated from the borders of the unmarked regions into the marked regions. Distance fields in accordance with several embodiments of the invention can then weight the correction process to "push" features inward. In several embodiments, a user can specify the distance and weight that this additional constraint has during correction.

Although various processes for in-painting in accordance with various embodiments of the invention are discussed above, any of a number of processes that involve adding removing, and/or combining steps of the above described processes as appropriate to refinements of a specific application are possible in accordance with other embodiments of the invention.

The above descriptions includes only some exemplary embodiments and do not include all of the embodiments that may be covered by this invention and are for illustrative purposes only and are not intended to limit the scope of this invention.

What is claimed is:

1. A system for performing synthesis mimicking input exemplar data, in a single unified framework comprising:
   one or more processors;
   memory readable by the one or more processors; and
   instructions stored in the memory that when read by the one or more processors direct the one more processors to:
   receive a set of one or more exemplar objects, wherein the set of exemplar objects comprises a set of one or more mesh objects represented in parameterized UV space;
   determine geometric information for each mesh object of the set of mesh objects;
   generate a set of one or more appearance vectors based on the determined geometric information;
   generate a set of one or more feature vector maps comprising a plurality of feature vectors, wherein each feature vector is generated for a location of at least one exemplar object of the set of exemplar objects based on the determined geometric information and the generated set of appearance vectors; and
   synthesize an output based on the generated set of feature vector maps.

2. The system of claim 1, wherein the set of exemplar objects further comprises a set of one or more source graphic objects, wherein each source graphic object comprises pixels at locations in the source graphic object,
   the instructions further direct the processors to determine appearance information for each source graphic object of the set of source graphic objects, and
   the generated appearance vectors are generated further based on the appearance information.

3. The system of claim 2, wherein the determined appearance information comprises at least one of surface color, surface deformation, and reflectance properties.

4. The system of claim 1, wherein the instructions further direct the processors to render shape information from the mesh object as a 2D representation of the mesh object, wherein the location of the at least one exemplar object is a location within the 2D representation of the mesh object, and the shape information comprises at least one of global normal, curvature, ambient occlusion and Gaussian Mixture Models (GMM).

5. The system of claim 1, wherein the instructions further direct the processors to:

determine a Gaussian Mixture Model (GMM) for each vertex of the exemplar set, where the GMM stores geometric shape information for each point on a mesh object, that is then projected onto each pixel of the exemplar set; and downscale the GMM through a multi-scale process, wherein properties of the geometric shape can be recomputed from the resulting positions of the GMM.

6. The system of claim 1, wherein the instructions further direct the processors to generate a multi-scale representation of each exemplar object of the exemplar set, wherein different scale levels encode different frequencies of the exemplar data.

7. The system of claim 6, wherein at least one multi-scale representation comprises a hybrid stack that modulates between the characteristics of a Gaussian stack and a Gaussian pyramid at different scale ranges of the hybrid stack.

8. The system of claim 1, wherein generating the set of feature vector maps comprises using a convolutional neural network (CNN) to generate a feature vector for each pixel.

9. The system of claim 1, wherein the instructions further direct the processors to generate a unique feature map that comprises a 2D histogram that identifies a degree of feature redundancy for each feature vector within at least one feature vector map of the set of feature vector maps; and wherein synthesizing the output comprises synthesizing the output based on the generated unique feature map to distribute unique features within the output.

10. The system of claim 1, wherein generating the set of feature vector maps comprises performing a dimensionality reduction process to reduce the dimensions feature vectors of the set of feature vector maps.

11. The system of claim 1, wherein the instructions further direct the processors to generate a nearest neighbor candidate list for each pixel of each image stack based on the set of generated feature vector maps, wherein the nearest neighbor candidate list is used to direct the synthesis of the output.

12. The system of claim 11, wherein the nearest neighbor candidate list comprises nearest neighbor candidates for each pixel in a first exemplar object from a second exemplar object.

13. The system of claim 11, wherein the nearest neighbor candidate list comprises nearest neighbor candidates for each pixel in a first exemplar object from the first exemplar object.

14. The system of claim 11, wherein generating the nearest neighbor candidate list comprises determining a distance between each pixel and a set of pixels from an exemplar object, wherein the distance comprises at least one of a L0 distance, a L1 distance, a L2 distance, a Bregman divergence, a Kullback-Leibler divergence, a Hellinger distance, a cross entropy, Jensen Shannon, f-divergence, Wassertein distance, and a divergence.

15. The system of claim 11, wherein generating the nearest neighbor candidate list comprises:

initializing a set of one or more nearest neighbor fields (NNF) for pixels of the exemplar set;

performing an iterative candidate improvement process; and performing an upscaling process.

16. The system of claim 15, wherein initializing the set of NNFs comprises computing a plurality of multi-scale NNFs for a set of scale levels of a multi-scale data structure.

17. The system of claim 16, wherein the initialized set of NNFs are for a first level of the multi-scale data structure, and computing the plurality of multi-scale NNFs comprises:

initializing a second NNF for a second finer level of the multi-scale data structure using results of the upscaling process; and updating the NNFs of the first level to point to the second NNF for the second level.

18. The system of claim 15, wherein initializing the set of NNFs comprises:

building a histogram for each element of a feature vector;

finding a match for an arbitrary pixel in the histogram based on values of the arbitrary pixel; and linking the arbitrary pixel with the matched value in the histogram.

19. The system of claim 16, wherein the multi-scale data structure is a hybrid stack, wherein each level is processed through a CNN and a NNF is computed for each CNN at each level.

20. The system of claim 15, wherein performing the iterative candidate improvement process comprises:

determining a distance from a particular pixel to a nearest neighbor candidate; and when the distance is less than a current distance from the particular pixel to a nearest neighbor of the nearest neighbor list, replacing the nearest neighbor with the nearest neighbor candidate.

21. The system of claim 20, wherein the nearest neighbor candidate is selected from surrounding neighbors of the particular pixel multiplied by some power of two away from the particular pixel.

22. The system of claim 20, wherein the nearest neighbor candidate for a first pixel in a first level of the multi-scale data structure is selected from a second finer level of the multi-scale data structure.

23. The system of claim 1, wherein synthesizing the output comprises:

maintaining an optimization mask that indicates each pixel in the output that has reached an optimal value;

determining whether each pixel in the output has reached an optimal value;

changing a status in the optimization mask of each pixel in the output determined to have reached an optimal value; and performing a correction process on pixels determined not be optimal based on the optimization mask during each iteration of the correction process.

24. The system of claim 1, wherein synthesizing the output comprises modifying each particular location of the synthesized output to mimic a location from an exemplar object of the set of exemplar objects.

25. The system of claim 1, wherein synthesizing the output comprises:

generating a set of at least one synthesis object pyramids for at least one output element of the output, wherein the set of synthesis object pyramids are based on at least one exemplar object; and generating a nearest neighbor field (NNF) linking each synthesis feature with at least one exemplar object.

26. The system of claim 1, wherein synthesizing the output comprises:

upscaling an image from a first coarse level of a synthesis object pyramid to a second finer level of the synthesis object pyramid; and performing a correction process to the upscaled image.

27. The system of claim 26, wherein synthesizing the output further comprises adding randomness to the upscaled image by:

gathering a collection of exemplar candidate locations for each synthesis location, wherein each exemplar candidate location has a similar feature to that of the synthesis location; and choosing a new candidate location from the collection of exemplar candidate locations using a user-defined jitter value.

28. The system of claim 26, wherein performing the correction process comprises performing an iterative correction process for each portion of a plurality of portions of the output using a first buffer having a size of the portion of the output, and a larger second buffer having a size of the output.

29. The system of claim 1, wherein the set of exemplar objects comprises a 3D mesh and a texture, and the output applies the texture to a different, 3D mesh.

30. The system of claim 1, wherein synthesizing the output comprises finding a more optimal exemplar link to an exemplar object by evaluating surrounding neighbors of a particular pixel multiplied by some power of two away from the particular pixel.

31. The system of claim 1, wherein the instructions further direct the processors to generate a nearest neighbor field (NNF) linking each synthesis feature with at least one exemplar object, wherein generating the NNF comprises maintaining a minimum distance between exemplar links in the at least one exemplar object.

32. The system of claim 1, wherein synthesizing the output comprises:
synthesizing a displacement map comprising a plurality of local gradients of the output; and
computing a difference between the local gradients of the displacement map and local gradients from the set of exemplar objects.

33. The system of claim 1, wherein synthesizing the output comprises:
generating a jump map for edges of the set of mesh objects parameterized in UV space;
generating a flow field comprising local orientation based on the set of mesh objects; and
utilizing the jump map and the generated flow field to synthesize the output.

34. The system of claim 1, wherein the output comprises a 3D mesh, wherein synthesizing the output comprises:
maintaining a local shape for each location of the 3D mesh; and
optimizing the synthesized output at the locations of the 3D mesh based on the local shapes.

35. The system of claim 1, wherein the output is an in-painted copy of an input comprising an area to be in-painted, wherein synthesizing the output comprises:
generating a distance field from a border of the area to be in-painted going inwards; and
using the generated distance field to incentivize the propagation of features along the border towards the center of the area to be in-painted.

36. A method for performing synthesis mimicking input exemplar data in a single unified framework comprising:
receiving a set of one or more exemplar objects, wherein the set of exemplar objects comprises a set of one or more mesh objects represented in parameterized UV space;
determining geometric information for each mesh object of the set of mesh objects;
generating a set of one or more appearance vectors based on the determined geometric information using a set of one or more processors of a synthesis system;

generating a set of one or more feature vector maps comprising a plurality of feature vectors, wherein each feature vector is generated for a location of at least one exemplar object of the set of exemplar objects based on the determined geometric information and the generated set of appearance vectors using the set of processors; and
synthesizing an output based on the generated set of feature vector maps using the set of processors.

37. The method of claim 36 further comprising:
determining a Gaussian Mixture Model (GMM) for each vertex of the exemplar set, where the GMM stores geometric shape information for each point on a mesh object, that is then projected onto each pixel of the exemplar set; and
downscaling the GMM through a multi-scale process, wherein properties of the geometric shape can be recomputed from the resulting positions of the GMM.

38. The method of claim 36 further comprising generating a multi-scale representation of each exemplar object of the exemplar set, wherein:
different scale levels encode different frequencies of the exemplar data, and
at least one multi-scale representation comprises a hybrid stack that modulates between the characteristics of a Gaussian stack and a Gaussian pyramid at different scale ranges of the hybrid stack.

39. The method of claim 36 further comprising generating a unique feature map that comprises a 2D histogram that identifies a degree of feature redundancy for each feature vector within at least one feature vector map of the set of feature vector maps; and
wherein synthesizing the output comprises synthesizing the output based on the generated unique feature map to distribute unique features within the output.

40. A non-transitory machine readable medium containing processor instructions for performing synthesis mimicking input exemplar data in a single unified framework, where execution of the instructions by a processor causes the processor to perform a process comprising:
receiving a set of one or more exemplar objects, wherein the set of exemplar objects comprises a set of one or more mesh objects represented in parameterized UV space;
determining geometric information for each mesh object of the set of mesh objects;
generating a set of one or more appearance vectors based on the determined geometric information;
generating a set of one or more feature vector maps comprising a plurality of feature vectors, wherein each feature vector is generated for a location of at least one exemplar object of the set of exemplar objects based on the determined geometric information and the generated set of appearance vectors; and
synthesizing an output based on the generated set of feature vector maps.

41. The non-transitory machine readable medium of claim 40, wherein the process further comprises:
determining a Gaussian Mixture Model (GMM) for each vertex of the exemplar set, where the GMM stores geometric shape information for each point on a mesh object, that is then projected onto each pixel of the exemplar set; and
downscaling the GMM through a multi-scale process, wherein properties of the geometric shape can be recomputed from the resulting positions of the GMM.

42. The non-transitory machine readable medium of claim 40, wherein the process further comprises generating a multi-scale representation of each exemplar object of the exemplar set, wherein:
- different scale levels encode different frequencies of the exemplar data, and
- at least one multi-scale representation comprises a hybrid stack that modulates between the characteristics of a Gaussian stack and a Gaussian pyramid at different scale ranges of the hybrid stack.

43. The non-transitory machine readable medium of claim 40, wherein the process further comprises generating a unique feature map that comprises a 2D histogram that identifies a degree of feature redundancy for each feature vector within at least one feature vector map of the set of feature vector maps; and
- wherein synthesizing the output comprises synthesizing the output based on the generated unique feature map to distribute unique features within the output.

* * * * *